United States Patent
Ono et al.

(10) Patent No.: US 7,260,037 B2
(45) Date of Patent: Aug. 21, 2007

(54) INFORMATION-PROCESSING APPARATUS, INFORMATION-PROCESSING METHOD AND INFORMATION-PROCESSING PROGRAM

(75) Inventors: Takaya Ono, Kanagawa (JP); Hideki Ando, Kanagawa (JP); Satoshi Katsuo, Kanagawa (JP); Takashi Furukawa, Kanagawa (JP); Hisao Tanaka, Tokyo (JP); Takayoshi Kawamura, Kanagawa (JP); Motohiro Terao, Kanagawa (JP); Masaki Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 10/738,779

(22) Filed: Dec. 17, 2003

(65) Prior Publication Data

US 2004/0131337 A1 Jul. 8, 2004

(30) Foreign Application Priority Data

Dec. 18, 2002 (JP) ............................ P2002-366197

(51) Int. Cl.
*G11B 5/09* (2006.01)
(52) U.S. Cl. ............................ 369/47.28; 369/47.33; 369/47.1
(58) Field of Classification Search ............... 369/47.1, 369/47.28, 47.3, 47.33, 53.31, 53.34, 53.35; 345/530; 386/46, 125, 126
See application file for complete search history.

(56) References Cited

U.S. PATENT DOCUMENTS 6,219,311 B1  4/2001 Mitsuno

| 6,392,968 B1 * | 5/2002 | Kageyama et al. ...... 369/47.13 |
| 6,760,292 B1 * | 7/2004 | Sugahara ................. 369/53.31 |

FOREIGN PATENT DOCUMENTS

| EP | 0 932 153 | 7/1999 |
| EP | 1 067 541 | 1/2001 |
| EP | 1 089 275 | 4/2001 |
| EP | 1 328 118 | 7/2003 |
| JP | 11 098447 | 4/1999 |
| WO | WO 02 23896 | 3/2002 |

OTHER PUBLICATIONS

Patent Abstracts of Japan, vol. 2000, No. 16, May 8, 2001 & JP 2001 016543 A (Victor Co of Japan Ltd), Jan. 19, 2001.

* cited by examiner

*Primary Examiner*—Ulka J. Chauhan
*Assistant Examiner*—Joni Hsu
(74) *Attorney, Agent, or Firm*—Frommer Lawrence & Haug LLP; William S. Frommer; Thomas F. Presson

(57) ABSTRACT

A minimum buffer data amount and a minimum reproduction delay time are found from a line approximation graphic form approximating a media read line and used as a basis for determining whether or not data can be reproduced in a real-time manner from a recording medium at a requested reproduction rate. The media read line is a line expressing the change in cumulative amount of data read out from the recording medium. The minimum buffer data amount is the minimum of the amount of data stored in a buffer as data required in reproduction of the data in a real-time manner at the requested reproduction rate. The minimum reproduction delay time is the minimum of a reproduction delay time from the start of an operation to read out the data from the recording medium to the start of an operation to reproduce the data.

13 Claims, 32 Drawing Sheets

F I G. 8
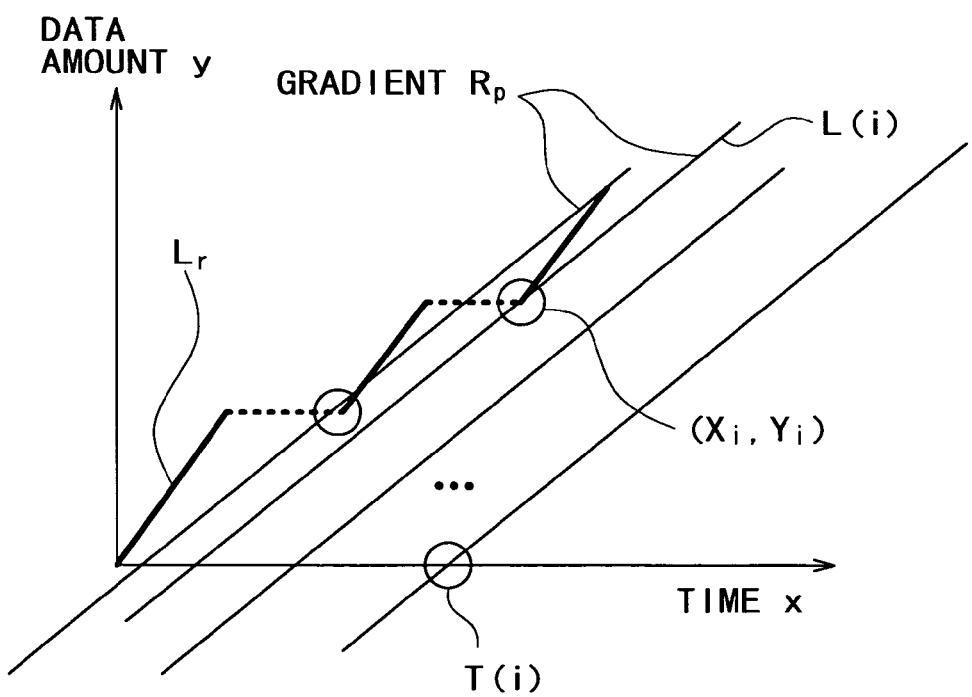

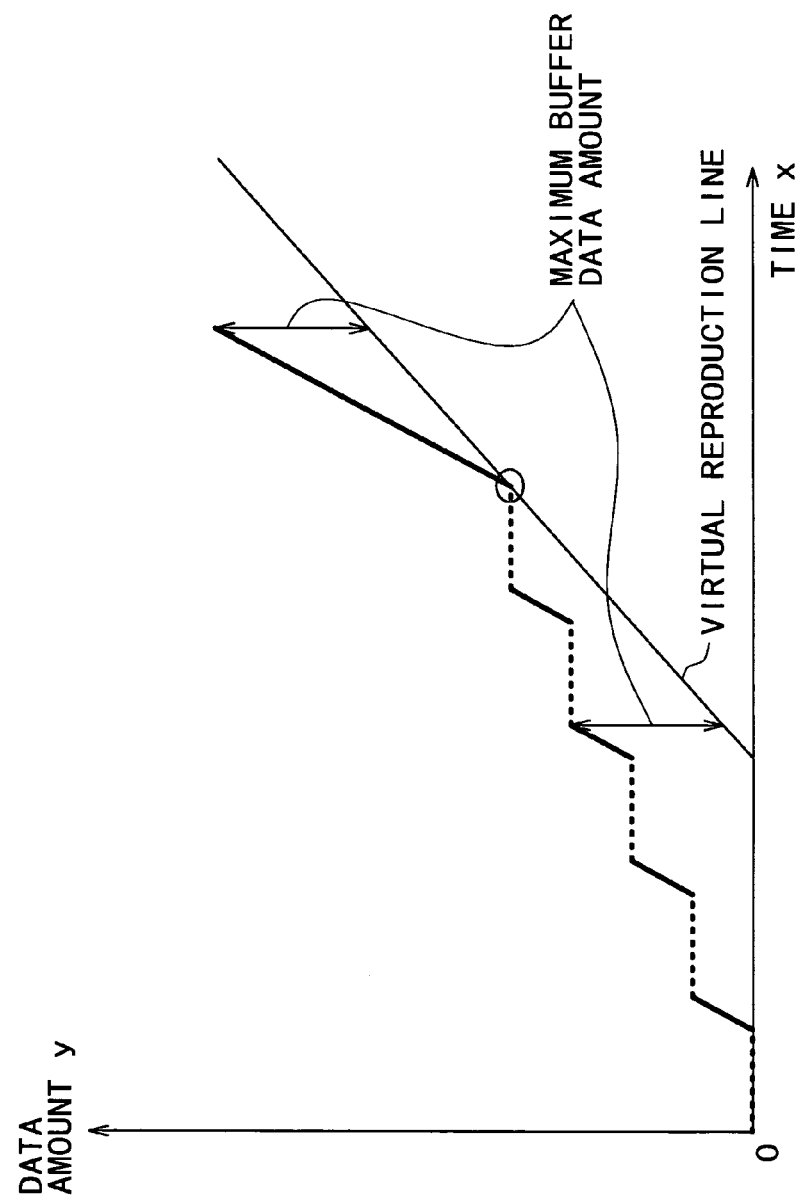

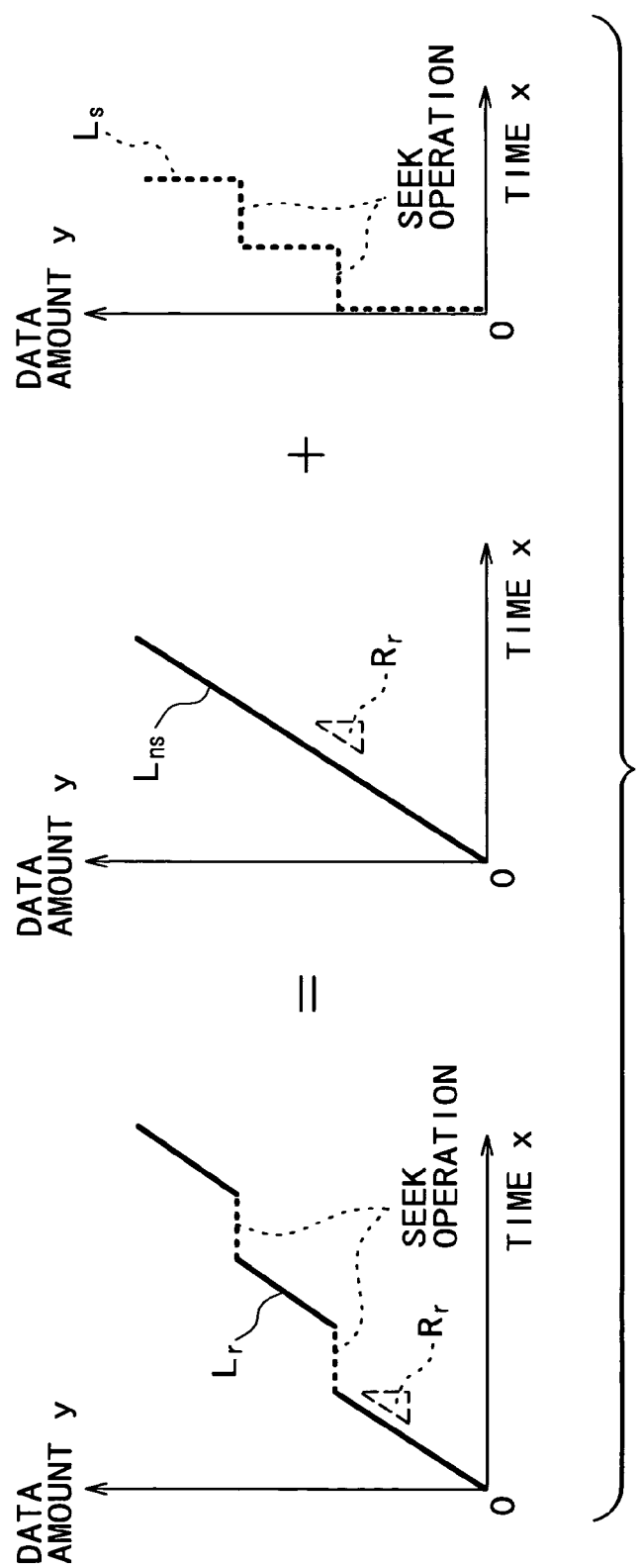

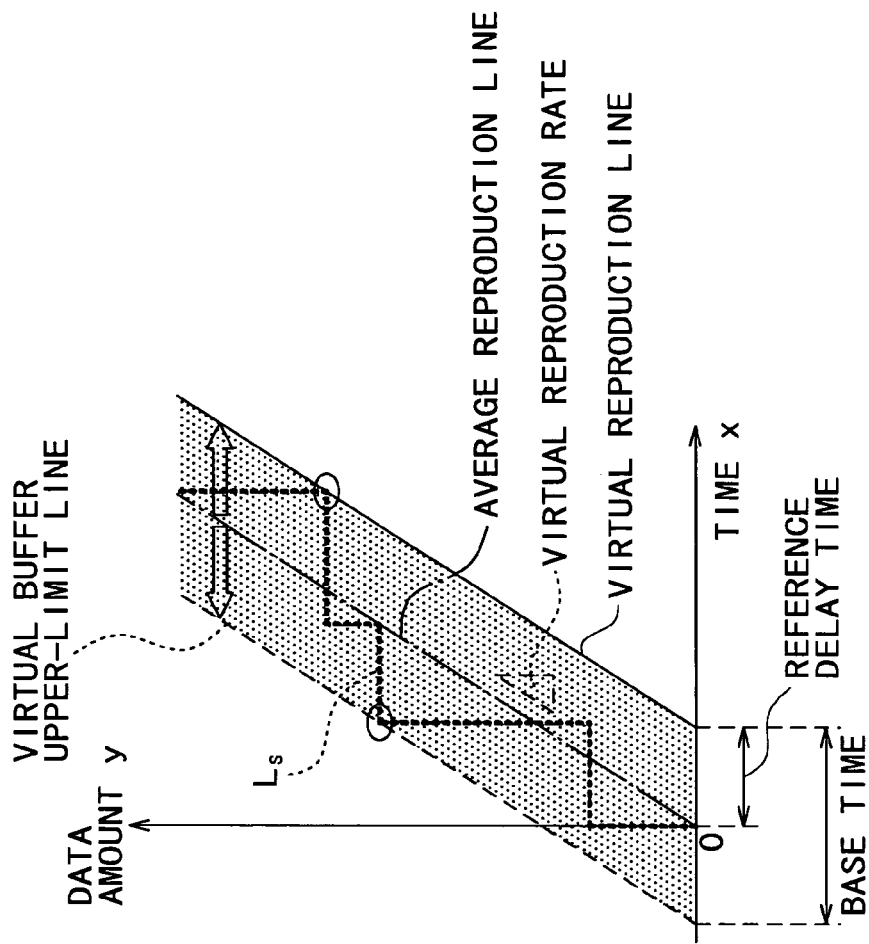
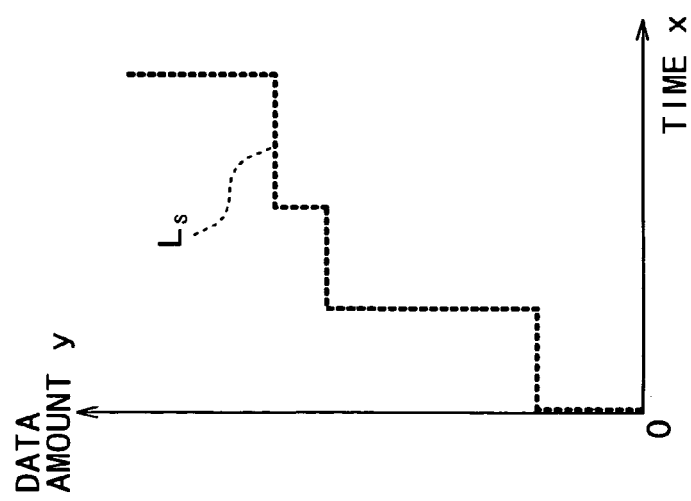

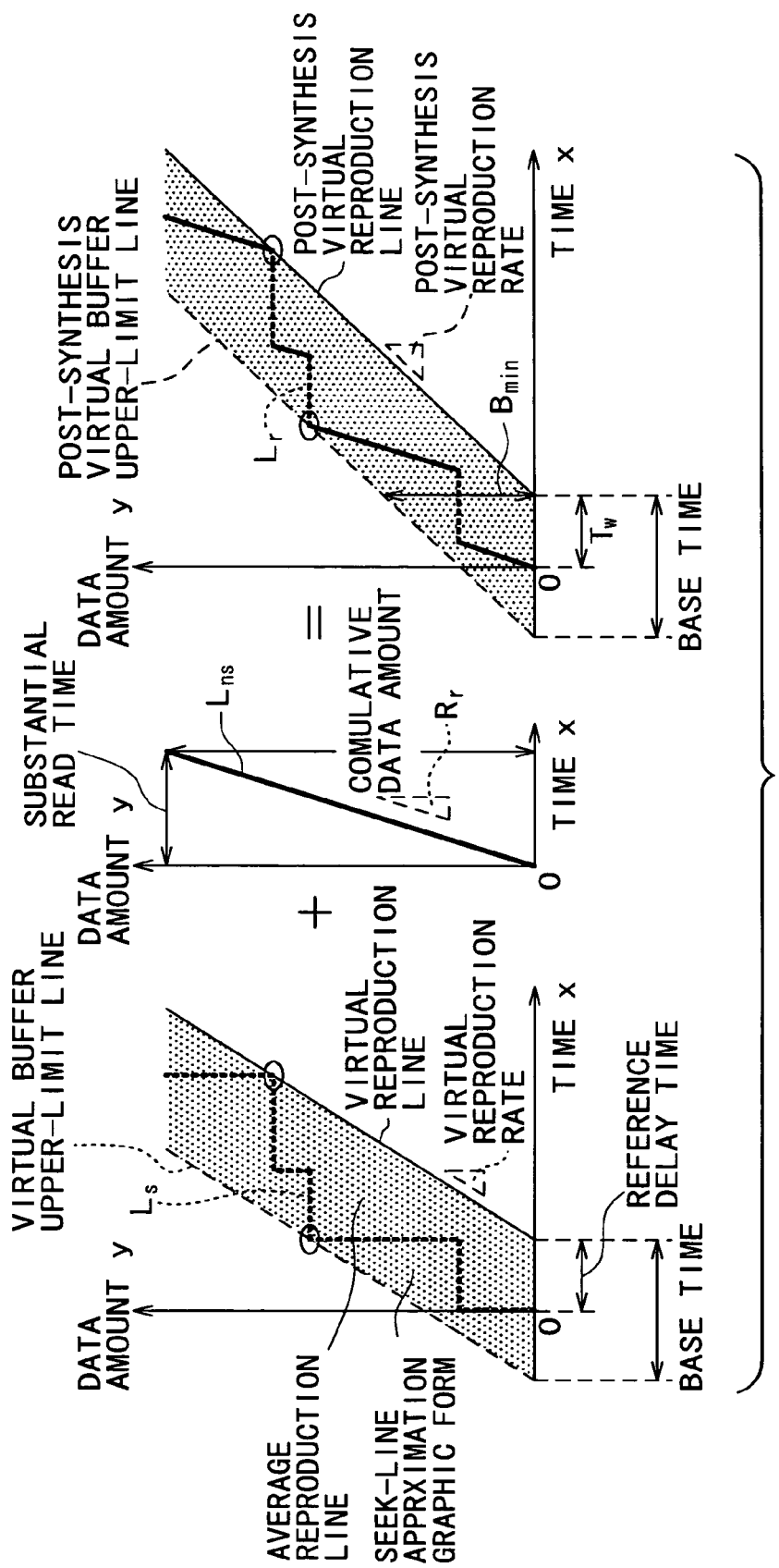

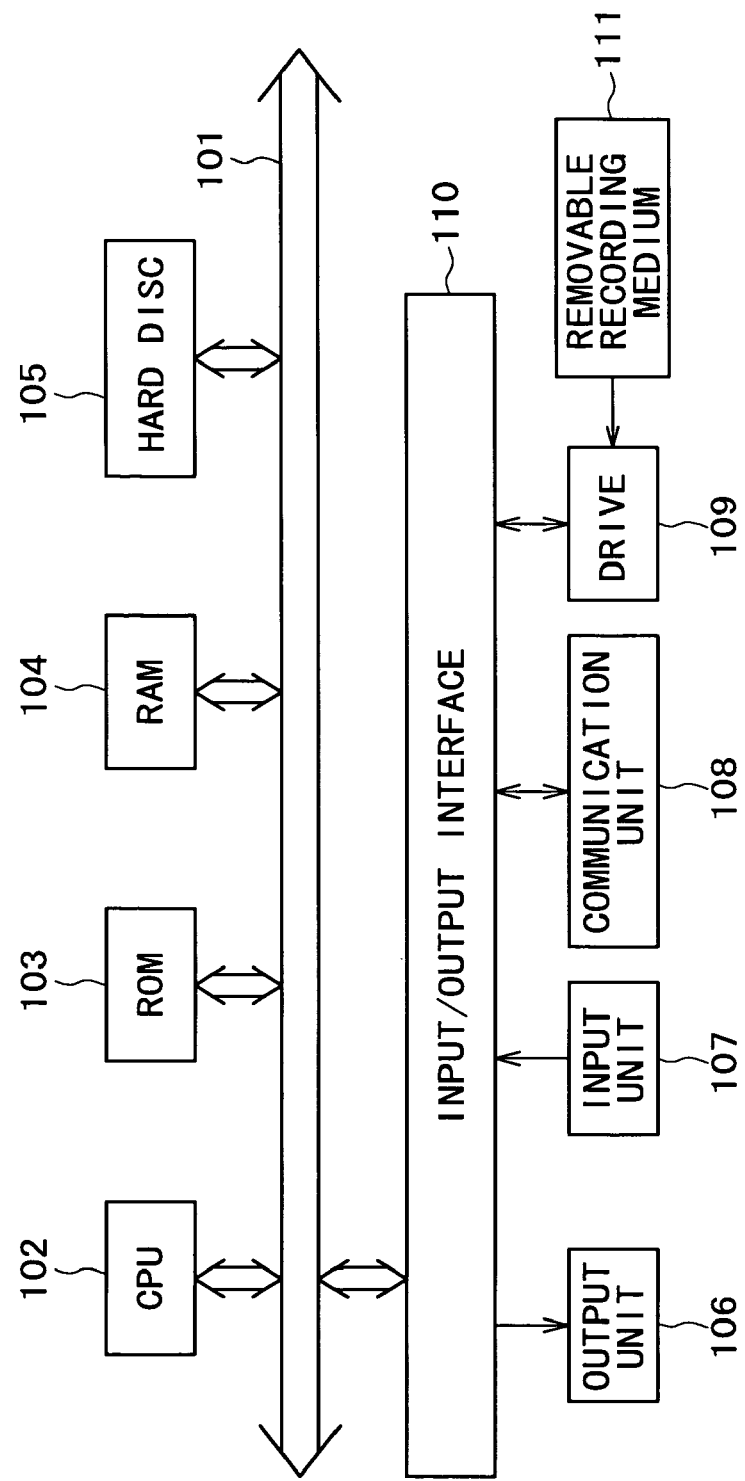

INFORMATION-PROCESSING APPARATUS, INFORMATION-PROCESSING METHOD AND INFORMATION-PROCESSING PROGRAM

BACKGROUND OF THE INVENTION

The present invention relates to an information-processing apparatus, an information-processing method and an information-processing program.

If AV (Audio Visual) data such as video and audio data is written onto and erased from a recording medium such as an optical disc repeatedly, for example, the AV data, which should be reproduced continuously from the optical disc, is recorded in recording areas separated from each other on the disc as a result of inadvertent segmentation of the recording face of the disc.

The AV data, which should be reproduced continuously from the optical disc, is also recorded in such recording areas on an optical disc due to typically an unavoidable defect existing on the disc or recorded typically as a result of a so-called non-destructive editing process.

The non-destructive editing process is an editing process adopting an editing method for merely setting so-called edit points, namely, IN and OUT points, in AV data recorded on an optical disc as an edit material but not editing (or destructing) the edit material itself. In a non-destructive editing process, there is typically created a list of edit points to be set at the edit time. The list of edit points is referred to hereafter as a play list. A result of a non-destructive editing process is then reproduced in accordance with a play list created for the edit material. That is to say, a result of a non-destructive editing process of an edit material recorded on an optical disc is reproduced by reproducing the edit material in accordance with edit points described on a play list created for the edit material. In this way, since a result of a non-destructive editing process of an edit material recorded on an optical disc is reproduced by reproducing the edit material in accordance with edit points described on a play list created for the edit material, consequently, the reproduction of the edit material is equivalent to reproduction of contiguous AV data, which should be reproduced continuously but actually recorded in recording areas separated from each other on an optical disc.

As is obvious from the above description, in the course of an operation to reproduce AV data recorded in recording areas separated from each other on an optical disc as such, in some cases, a specific portion of the AV data is reproduced from a specific recording area after reproduction of a previous portion from a previous recording area separated away from the specific recording area. In such a case, it is necessary to read out the specific portion of the AV data from the specific recording area of the optical disc after the operation to read out the previous portion from the previous recording area so that a seek operation needs to be carried out to search the recording face of the recording medium for the specific recording area separated away from the previous recording.

If it takes much time to carry out the seek operation, the specific portion of the AV data cannot be reproduced on time, resulting in an interruption of the reproduction process. That is to say, the AV data cannot be reproduced in a real-time manner.

In order to solve the problem described above, the AV data is reproduced from the optical disc by typically first storing the AV data read out from the disc in a buffer and then processing the AV data stored in the buffer.

In such a solution, a rate at which the AV data is read out from the optical disc is generally set at a value higher than a reproduction rate for the AV data. By reading out the AV data from the optical disc at such a relatively high rate, the AV data is supplied to the buffer at a rate higher than a rate at which the AV data is output from the buffer. Thus, basically, the AV data read out from the optical disc is gradually accumulated in the buffer. If a seek operation takes place, however, no AV data is read out from the optical disc during the seek operation. Accordingly, the AV data is merely output from the buffer for the reproduction purpose so that the amount of the AV data accumulated in the buffer decreases. If the seek operation is not completed so as to allow AV data to be read out from the optical disc again before all AV data accumulated in the buffer is read out from the buffer, an underflow occurs in the buffer, interrupting the reproduction process.

If the amount of AV data accumulated in the buffer prior to a seek operation is sufficiently large, nevertheless, the seek operation does not cause the reproduction process to be interrupted. If AV data is read out from the optical disc continuously, the amount of AV data accumulated in the buffer increases. If a seek operation is carried out and no AV data is read out from the optical disc, on the other hand, the amount of the AV data accumulated in the buffer decreases. Thus, in order to make the amount of the AV data accumulated in the buffer prior to a seek operation sufficiently large, it is necessary to continuously read out enough AV data from the AV disc before a seek operation occurs. In turn, in order to make it possible to continuously read out enough AV data from the AV disc, it is necessary to continuously record the AV data on the optical disc in contiguous recording areas each having a large size to a certain degree.

Thus, in accordance with a technology disclosed in documents such as Japanese Patent Laid-open No. Hei 11-98447, video data and audio data are recorded in contiguous recording areas of an optical disc wherein the recording areas are obtained by splitting the recording face of the optical disc into concentric circles so that the video data and audio data can be recorded continuously in the recording areas each contiguous to a certain degree.

Nevertheless, even if AV data is recorded continuously on the optical disc in recording areas each contiguous to a certain degree, in dependence on the disc apparatus, a seek operation may still make it impossible to reproduce the AV data in a real-time manner.

That is to say, the buffer used for temporary storing AV data read out from an optical disc has a size varying in dependence on the disc apparatus. In the case of a disc apparatus with a buffer having a large size, the AV data can be reproduced in a real-time manner. In the case of a disc apparatus with a buffer having a small size, on the other hand, the AV data cannot be reproduced in a real-time manner sometimes.

In addition, AV data may need to be reproduced at a high speed instead of a normal speed. Even though the AV data can be reproduced in a real-time manner at the normal speed, the AV data cannot always be reproduced in a real-time manner at the high speed. Here the reproduction in a real-time manner means reproducing the AV data at a requested reproduction rate without interruption.

In addition, interruption of a reproduction process in a disc apparatus after a start of the reproduction process carried out at a reproduction rate requested by the user makes the user feel a sense of incompatibility.

In order to solve the problems described above, it is necessary to determine whether or not the AV data can be reproduced at a reproduction rate requested by the user in a real-time manner and inform the user of an outcome of the determination before reproduction of the AV data is started.

In order to determine whether or not the AV data can be reproduced in a real-time manner, it is necessary to actually read out the AV data from the optical disc and check whether or not the operation to read out the AV data from the disc is in time for the reproduction of the AV data at the reproduction rate requested by the user.

However, the operations carried out to actually read out the AV data from the optical disc and to determine whether or not the AV data can be reproduced in a real-time manner every time the user issues a reproduction command consume much time and are also cumbersome.

SUMMARY OF THE INVENTION

It is thus an object of the present invention addressing the problems described above to provide a capability of easily making a decision on real-time reproducibility of AV data in a process to determine whether or not the AV data can be reproduced in a real-time manner at a reproduction rate requested by the user.

An information-processing apparatus provided by the present invention is characterized in that the information-processing apparatus includes: graphic-data acquisition element for acquiring graphic data representing a line approximation graphic form approximating a media read line expressing changes in cumulative amount of data read out from a recording medium; requested reproduction rate acquisition element for acquiring a requested reproduction rate requested in a process to reproduce the data; computation element for computing a minimum buffer data amount and a minimum reproduction delay time on the basis of the line approximation graphic form represented by the graphic data where the minimum buffer data amount is defined as a lower limit of the amount of data stored in a buffer as data required for reproduction of the stored data in a real-time manner at a requested reproduction rate whereas the minimum reproduction delay time is defined as a lower limit of a reproduction delay time from a start of an operation to read out data from the recording medium to a start of an operation to reproduce the data read out from the recording medium from the buffer; and determination element for determining whether or not reproduction of data in a real-time manner at the requested reproduction rate is possible on the basis of the minimum buffer data amount and the minimum reproduction delay time.

An information-processing method provided by the present invention is characterized in that the information-processing method includes the steps of: acquiring graphic data representing a line approximation graphic form approximating a media read line expressing changes in cumulative amount of data read out from a recording medium; acquiring requested reproduction rate as a reproduction rate requested in a process to reproduce the data; computing a minimum buffer data amount and a minimum reproduction delay time on the basis of the line approximation graphic form represented by the graphic data where the minimum buffer data amount is defined as a lower limit of the amount of data stored in a buffer as data required for reproduction of the stored data in a real-time manner at a requested reproduction rate whereas the minimum reproduction delay time is defined as a reproduction delay time from a start of an operation to read out data from the recording medium to a start of an operation to reproduce the data read out from the recording medium from the buffer; and determining whether or not reproduction of data in a real-time manner at the requested reproduction rate is possible on the basis of the minimum buffer data amount and the minimum reproduction delay time.

A program provided by the present invention is characterized in that the program includes the steps of: acquiring graphic data representing a line approximation graphic form approximating a media read line expressing changes in cumulative amount of data read out from a recording medium; acquiring requested reproduction rate as a reproduction rate requested in a process to reproduce the data; computing a minimum buffer data amount and a minimum reproduction delay time on the basis of the line approximation graphic form represented by the graphic data where the minimum buffer data amount is defined as a lower limit of the amount of data stored in a buffer as data required for reproduction of the stored data in a real-time manner at a requested reproduction rate whereas the minimum reproduction delay time is defined as a lower limit of a reproduction delay time from a start of an operation to read out data from the recording medium to a start of an operation to reproduce the data read out from the recording medium from the buffer; and determining whether or not reproduction of data in a real-time manner at the requested reproduction rate is possible on the basis of the minimum buffer data amount and the minimum reproduction delay time.

The information-processing apparatus, the information-processing method and an information-processing program are each provided by the present invention to as a element for executing the steps of: acquiring graphic data representing a line approximation graphic form approximating a media read line expressing changes in cumulative amount of data read out from a recording medium; acquiring requested reproduction rate as a reproduction rate requested in a process to reproduce the data; computing a minimum buffer data amount and a minimum reproduction delay time on the basis of the line approximation graphic form represented by the graphic data where the minimum buffer data amount is defined as a lower limit of the amount of data stored in a buffer as data required for reproduction of the stored data in a real-time manner at a requested reproduction rate whereas the minimum reproduction delay time is defined as a lower limit of a period of time between a start of an operation to read out data from the recording medium and a start of an operation to reproduce the data read out from the recording medium from the buffer; and determining whether or not reproduction of data in a real-time manner at the requested reproduction rate is possible on the basis of the minimum buffer data amount and the minimum reproduction delay time.

BRIEF DESCRIPTION OF THE DRAWINGS

FIG. 8 is an explanatory diagram referred to in describing a process to find a real-time reproduction line;

FIG. 21 is an explanatory diagram referred to in describing a method to determine a virtual reproduction line;

FIG. 27 is an explanatory diagram referred to in describing the fact that a media read line can be split into a no-seek read line and a media seek line;

FIGS. 28A and 28B are diagrams showing a seek-line approximation parallelogram approximating a media seek line;

FIG. 29 is a diagram showing a line approximation graphic form, which is found from both a no-seek read line and a seek-line approximation parallelogram;

FIG. 34 is a block diagram showing a typical configuration of an embodiment implementing a computer to which the present invention is applied.

DETAILED DESCRIPTION OF THE PREFERRED EMBODIMENTS

Figure 1:
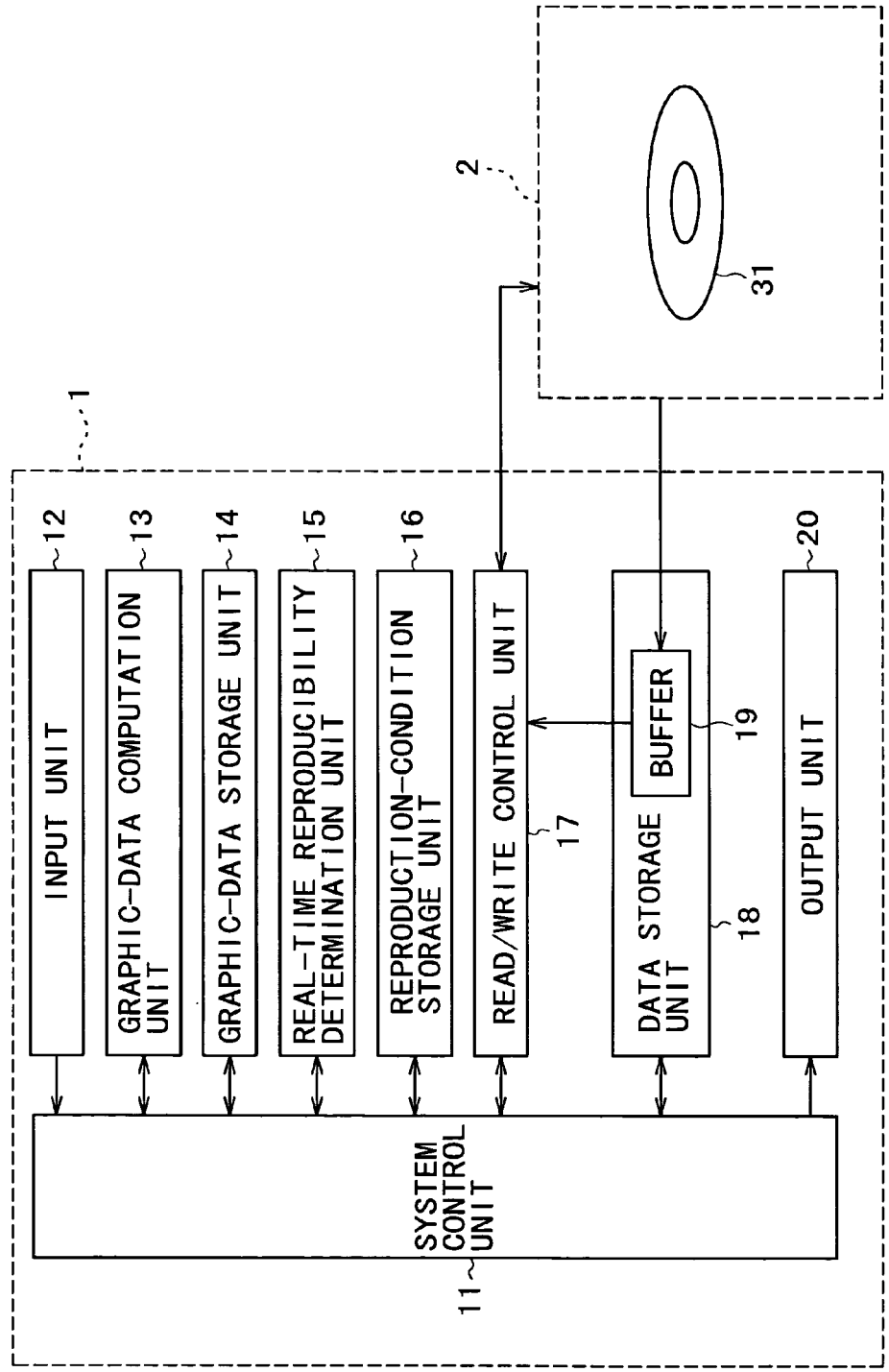
FIG. 1 is a block diagram showing a typical configuration of an embodiment implementing a disc apparatus to which the present invention is applied.

FIG. 1 is a block diagram showing a typical configuration of an embodiment implementing a disc apparatus to which the present invention is applied.

The disc apparatus includes a recording/reproduction control unit 1 and a disc drive 2. The disc apparatus records data onto an optical disc 31 and reproduces data from the optical disc 31.

In the disc apparatus, the recording/reproduction control unit 1 controls operations carried out by the disc drive 2 to record data onto an optical disc 31 and reproduce data from the optical disc 31.

To put it concretely, the recording/reproduction control unit 1 has a system control unit 11 and other functional blocks. The system control unit 11 is a component for controlling the other functional blocks. The other functional blocks include an input unit 12, a graphic-data computation unit 13, a graphic-data storage unit 14, a real-time reproducibility determination unit 15, a reproduction-condition storage unit 16, a read/write control unit 17, a data storage unit 18 and an output unit 20, which are connected to the system control unit 11 so that necessary data can be supplied from any one of the functional blocks to another.

The input unit 12 is a functional block used as an operation unit including a keyboard, switches and buttons, which are operated by the user to enter a command and necessary data to the disc apparatus. The input unit 12 supplies an operation signal representing an operation carried out by the user to the system control unit 11. It is to be noted that the input unit 12 can also be implemented as a remote controller separately from the disc apparatus.

Examples of a command and information, which are entered by the user by operating the input unit 12, are a command making a request for reproduction of data from the optical disc 31 and a reproduction rate requested by the user. A reproduction rate requested by the user is referred to hereafter simply as a requested reproduction rate for the sake of convenience.

The graphic-data computation unit 13 is a functional block for processing graphic data representing a line approximation graphic form approximating a media read line, which represents the change in cumulative amount of data read out from the optical disc 31. The graphic-data storage unit 14 is a functional block for storing the graphic data found by the graphic-data computation unit 13.

The real-time reproducibility determination unit 15 is a functional block for making a decision on real-time reproducibility of data recorded on the optical disc 31 in a process to determine whether or not the data can be reproduced from the optical disc 31 in a real-time manner at a requested reproduction rate on the basis of the line approximation graphic form represented by the graphic data stored in the graphic-data storage unit 14.

The reproduction-condition storage unit 16 is a functional block for storing a variety of reproduction conditions for reproduction of data from the optical disc 31 in the disc apparatus shown in FIG. 1. It is to be noted that the reproduction conditions include the requested reproduction rate cited above, a read rate, an allowable reproduction delay time, an allowable buffer data amount, a seek time function and media access information. The read rate is a speed at which the disc drive 2 reads out data from the optical disc 31.

A requested reproduction rate is supplied from the input unit 12 to the reproduction-condition storage unit 16 by way of the system control unit 11 to be stored in the reproduction-condition storage unit 16 as one of the reproduction conditions. The read rate is typically stored in the disc drive 2 and supplied from the disc drive 2 to the reproduction-condition storage unit 16 by way of the read/write control unit 17 and the system control unit 11 to be stored in the reproduction-condition storage unit 16 as one of the reproduction conditions.

The allowable reproduction delay time is defined as a period of time allowed by the user or a period of time allowed in the disc apparatus as a reproduction delay time between a start of an operation to read out data from the optical disc 31 and a start of an operation to reproduce the data. The allowable buffer data amount is defined as a buffer size allowed by the user or allowable in the disc drive as the storage capacity of a buffer 19 to be described later. It is to be noted that, typically, an allowable reproduction delay time and an allowable buffer data amount are entered by the user by operating the input unit 12. However, maximum values of the allowable reproduction delay time and the allowable buffer data amount are typically stored in the system control unit 11 as specifications of the disc drive or performance data of the drive. If an allowable reproduction delay time entered by the user by operating the input unit 12 is longer than the maximum value of the allowable reproduction delay time stored in the system control unit 11, the maximum value of the allowable reproduction delay time is transferred to the reproduction-condition storage unit 16 to be stored therein as a reproduction condition representing the allowable reproduction delay time. By the same token, if an allowable buffer data amount entered by the user by operating the input unit 12 is greater than the maximum value of the allowable buffer data amount stored in the system control unit 11, the maximum value of the allowable buffer data amount is transferred to the reproduction-condition storage unit 16 to be stored therein as a reproduction condition representing the allowable buffer data amount.

The seek time function is a function expressing a seek time in terms of arguments, which are typically the LBNs (Logical Block Numbers) of logical blocks serving as a seek origin and a seek destination. The seek time is time it takes to carry out a seek operation from a logical block serving as a seek origin to a logical block serving as a seek destination. A logical block serving as a seek origin and a logical block serving as a seek destination are logical blocks on the optical disc 31. Typically, the recording area of the optical disc 31 is segmented into logical blocks each having a predetermined size (or segmented into physical blocks assigned to the logical blocks). The LGNs are sequential numbers assigned to logical blocks in an order pieces of data are read out from and written into the optical disc 31. When two LBNs identifying two specific logical blocks are specified as arguments of the seek time function, the seek time function gives a seek time of a seek operation with the two specific logical blocks serving as a seek origin and a seek destination respectively. It is to be noted that a seek time given by the seek time function as a function of arguments for a seek operation is a worst value expressing the longest time it takes to carry out the seek operation from a logical block represented by one of the arguments as a seek origin to a logical block represented by the other argument as a seek destination. The longest time includes a rotation wait time of the optical disc 31. The seek time function is typically stored in the disc drive 2 and transferred from the disc drive 2 to the reproduction-condition storage unit 16 by way of the read/write control unit 17 and the system control unit 11 to be stored in the reproduction-condition storage unit 16 as one of the reproduction conditions.

The media access information shows an order in which pieces of data recorded on the optical disc 31 are to be read out. That is to say, since a certain sequence of pieces of data is not always recorded in a contiguous recording area on the optical disc 31 as described above, but may instead be recorded in a plurality of contiguous recording areas separated from each other as a result of inadvertent segmentation of the recording face of the optical disc 31, the media access information shows an order in which the contiguous recording areas separated from each other as recording areas for storing the pieces of data are to be accessed. The media access information is determined as a result of scheduling carried out by the system control unit 11 in reproducing data recorded on the optical disc 31. To put it concretely, the system control unit 11 reads out management information of data, which is recorded on the system control unit 11, from the optical disc 31 through the read/write control unit 17 to recognize recording areas on the optical disc 31 as areas for storing specific pieces of data of a file to be reproduced. Then, the system control unit 11 carries out scheduling to arrange the recording areas for storing the specific pieces of data in a reproduction order. The media access information, which typically represents a read order conforming to the reproduction order, is obtained as a result of the scheduling. The read order is an order in which the specific pieces of data are to be read out from the recognized recording areas. The system control unit 11 supplies the media access information to the reproduction-condition storage unit 16 to be stored therein.

The read/write control unit 17 is a functional block for controlling the disc drive 2 in order to control operations to read out and write data from and into the optical disc 31. The data storage unit 18 is typically a semiconductor memory for temporarily storing data necessary in processing carried out by the recording/reproduction control unit 1. It is to be noted that a partial recording area of the data storage unit 18 is allocated as the aforementioned buffer 19 for buffering data read out from the optical disc 31. The size of the buffer 19 can be changed by the user by operating the input unit 12. That is to say, the user enters the size of the buffer 19 via the input unit 12 as an allowable buffer data amount serving as one of the reproduction conditions described above. The system control unit 11 limits the size of the buffer 19 by upper and lower limit values. If an allowable buffer data amount entered by the user via the input unit 12 as a size of the buffer 19 is greater than the upper limit value, the upper limit value is used as the size of the buffer 19. If a buffer data amount entered by the user via the input unit 12 as a size of the buffer 19 is smaller than the lower limit value, on the other hand, the lower limit value is used as the size of the buffer 19.

The output unit 20 is a functional block typically including a display device and/or a speaker for respectively displaying and/or outputting data read out from the optical disc 31 in a reproduction process. The output unit 20 also outputs a result of a real-time reproducibility decision made by the real-time reproducibility determination unit 15. It is to be noted that the output unit 20 can also be implemented separately from the disc apparatus as an external apparatus connected to the disc apparatus.

The optical disc 31 can be mounted and dismounted onto and from the disc drive 2. The disc drive 2 has a pickup not shown in FIG. 1. The pickup is used for writing and reading out data onto and from the optical disc 31 under control executed by the read/write control unit 17.

It is to be noted that, in the following description, the optical disc 31 is regarded as a disc for specially recording AV data to be reproduced in a real-time manner.

In the disc drive having the configuration described above, when the user enters a command to reproduce AV data from the optical disc 31 by operating the input unit 12, for example, the system control unit 11 requests the read/write control unit 17 to reproduce the data from the optical disc 31.

That is to say, the read/write control unit 17 requests the disc drive 2 to read out the AV data from the optical disc 31. At the request made by the read/write control unit 17, the disc drive 2 reads out the AV data from the optical disc 31 and supplies the AV data to the buffer 19 in the data storage unit 18 to be stored in the buffer 19. The read/write control unit 17 then reads out AV data stored in the buffer 19 and carries out a necessary process on the data to generate reproduced data. Subsequently, the read/write control unit 17 supplies the reproduced AV data to the output unit 20 by way of the system control unit 11. The output unit 20 finally outputs the AV data as a displayed picture or a generated sound.

It is to be noted that, in the reproduction processing described above, the AV data read out from the optical disc 31 is supplied from the disc drive 2 to the buffer 19. A rate at which the AV data is supplied from the disc drive 2 to the buffer 19 is typically equivalent to a rate to read out the AV data from the optical disc 31. The AV data buffered in the buffer 19 is output to read/write control unit 17. A rate at which the AV data is output to read/write control unit 17 is typically equivalent to a requested reproduction rate. That is to say, by outputting the AV data from the buffer 19 to read/write control unit 17 at the requested reproduction rate, the AV data can be reproduced in a real-time manner at the requested reproduction rate.

In addition to the reproduction processing to reproduce AV data recorded on the optical disc 31 as described above, in the reproduction processing, the disc apparatus shown in FIG. 1 also makes a decision on real-time reproducibility of AV data in a process to determine whether or not the AV data can be reproduced in a real-time manner. In making the decision on real-time reproducibility of the AV data, the disc apparatus determines whether or not the AV data can be reproduced in a real-time manner on the basis of a line approximation graphic form approximating a media read line expressing the change in cumulative amount of data read out from the optical disc 31 in the disc drive 2. Thus, the disc apparatus shown in FIG. 1 carries out graphic-data processing to find graphic data representing the line approximation graphic form to be used in the process to determine whether or not AV data can be reproduced in a real-time manner.

Figure 2:
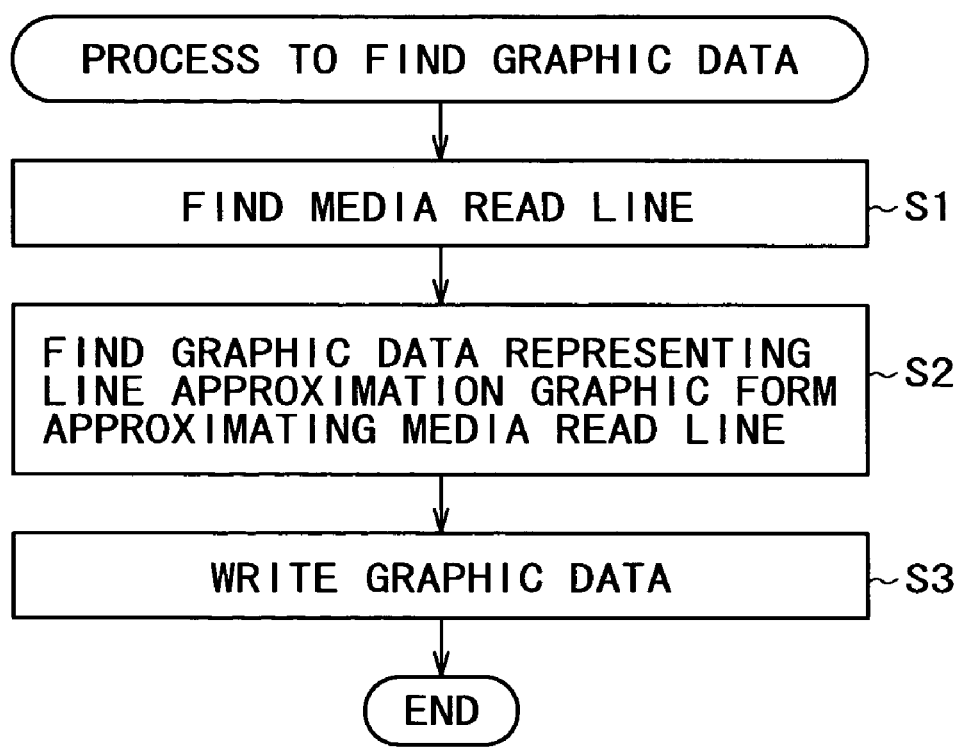
FIG. 2 shows a flowchart representing a process to find graphic data.

Thus, first of all, the graphic-data processing is explained by referring to a flowchart shown in FIG. 2.

The graphic-data processing is started typically when the optical disc 31 is mounted on the disc drive 2 or right after AV data is recorded onto the optical disc 31.

The flowchart representing the graphic-data processing begins with a step S1 at which the system control unit 11 controls the read/write control unit 17 to request the disc drive 2 to read out management information of a file recorded on the optical disc 31 as a file containing AV data from the optical disc 31. Then, by carrying out scheduling to reproduce the AV data from the optical disc 31 on the basis of the management information, the system control unit 11 finds a media read line expressing the change with the lapse of time in cumulative amount of data read out from the optical disc 31 and stores the media read line in the reproduction-condition storage unit 16.

Subsequently, at the next step S2, the graphic-data computation unit 13 finds graphic data representing a line approximation graphic form found as a graphic form approximating the media read line stored in the reproduction-condition storage unit 16. A method to find a line approximation graphic form as a graphic form approximating a media read line will be described in detail later. Then, at the next step S3, the graphic-data computation unit 13 supplies the graphic data found at the step S2 to the graphic-data storage unit 14 by way of the system control unit 11, writing the graphic data into the graphic-data storage unit 14. Finally, the execution of the graphic-data processing is ended.

It is to be noted that, after the graphic data is found in the graphic-data processing described above, the media read line stored in the reproduction-condition storage unit 16 becomes unnecessary and can thus be deleted from the reproduction-condition storage unit 16.

Figure 3:
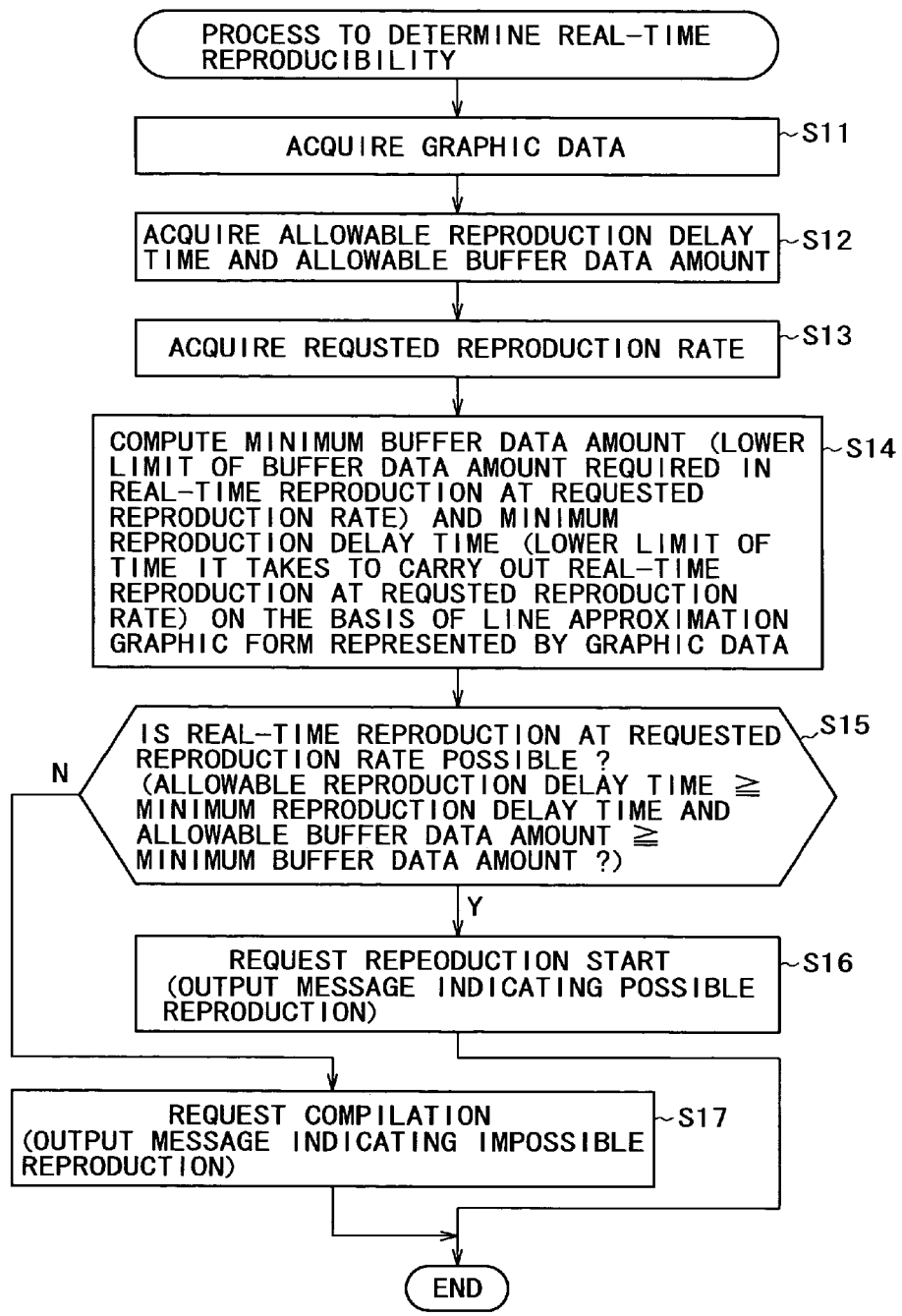
FIG. 3 shows a flowchart representing a process to determine whether or not AV data can be reproduced in a real-time manner.

Next, the process to determine whether or not AV data can be reproduced in a real-time manner is explained by referring to a flowchart shown in FIG. 3.

The process to determine whether or not the AV data can be reproduced in a real-time manner is carried out typically right after the graphic-data processing represented by the flowchart shown in FIG. 2 is completed or when the user enters a command to reproduce the AV data recorded on the optical disc 31 by operating the input unit 12.

The flowchart representing the process to determine whether or not the AV data can be reproduced in a real-time manner begins with a step S11 at which the real-time reproducibility determination unit 15 obtains graphic data by typically reading out the graphic data from the graphic-data storage unit 14 through the system control unit 11.

In the disc apparatus shown in FIG. 1, graphic data found in the graphic-data processing represented by the flowchart shown in FIG. 2 can be recorded for example on the optical disc 31. If the graphic data is recorded on the optical disc 31, the real-time reproducibility determination unit 15 starts the process represented by the flowchart shown in FIG. 3 as a process to determine whether or not the AV data can be reproduced in a real-time manner typically when the optical disc 31 is mounted on the disc drive 2. In this case, at the step S11, the graphic data is obtained by reading out the graphic data from the optical disc 31. If the graphic data can be obtained by the real-time reproducibility determination unit 15 with ease as is the case with graphic data recorded on the optical disc 31 as described above, it is not necessary to carry out the graphic-data processing represented by the flowchart shown in FIG. 2.

After the graphic data is obtained at the step S11, the flow of the process goes on to a step S12 at which the real-time reproducibility determination unit 15 obtains reproduction conditions by reading out the reproduction conditions from the reproduction-condition storage unit 16 through the system control unit 11. The obtained reproduction conditions are an allowable reproduction delay time and an allowable buffer data amount. Then, the flow of the process goes on to a step S13. At the step S13, the real-time reproducibility determination unit 15 obtains another reproduction condition by reading out the reproduction condition from the reproduction-condition storage unit 16 through the system control unit 11. The other reproduction condition obtained this time is a requested reproduction rate. Then, the flow of the process goes on to a step S14.

The allowable reproduction delay time, the allowable buffer data amount and the requested reproduction rate are read out from the reproduction-condition storage unit 16 as described above. The requested reproduction rate can be a default value or a value originally entered via the input unit 12. An example of the default value is a reproduction rate for a one-time speed reproduction process (or the normal-speed reproduction process) whereas examples of the entered value are the reproduction rate for the one-time speed reproduction process and a reproduction rate for a changed-speed reproduction process, which can be a slow reproduction process or a high-speed reproduction process.

At the step S14, the real-time reproducibility determination unit 15 computes a minimum buffer data amount and a minimum reproduction delay time on the basis of a line approximation graphic form represented by the graphic data. The minimum buffer data amount is defined as a lower limit set for the size of the buffer 19 as a limit required in reproduction of AV data in a real-time manner at a requested reproduction rate of the AV data recorded on the optical disc 31 whereas the minimum reproduction delay time is defined as a lower limit of time it takes to carry out the reproduction of the AV data in a real-time manner. Then, the flow of the process goes on to a step S15.

At the step S15, the real-time reproducibility determination unit 15 compares the minimum buffer data amount and the minimum reproduction delay time, which were computed at the step S14, with respectively the allowable buffer data amount and the allowable reproduction delay time, which were read out from the reproduction-condition storage unit 16 at the step S12, in order to determine whether or not reproduction of AV data in a real-time manner at the requested reproduction rate is possible on the basis of results of the comparisons.

If the reproduction of AV data in a real-time manner at the requested reproduction rate is determined to be possible at the step S15, that is, if the comparison results obtained at the step S15 indicate that the allowable buffer data amount is at least equal to the minimum buffer data amount and the allowable reproduction delay time is at least equal to the minimum reproduction delay time, or if a value at least equal to the minimum buffer data amount has been obtained at the step S12 as an allowable size of the buffer 19 and a value at least equal to the minimum reproduction delay time has been obtained at the step S12 as an allowable reproduction delay time, the flow of the process goes on to a step S16 at which, if necessary, the real-time reproducibility determination unit 15 displays a message on the output unit 20 through the system control unit 11. The message indicates that the real-time reproduction is possible. In addition, at the step S16, the real-time reproducibility determination unit 15 requests the read/write control unit 17 through the system control unit 11 to start a process to reproduce the AV data recorded on the optical disc 31. Finally, the execution of the process to determine whether or not the AV data can be reproduced in a real-time manner is ended.

With the step S16 executed in the disc apparatus shown in FIG. 1, the AV data recorded on the optical disc 31 is reproduced in a real-time manner at the requested reproduction rate as described above.

If the reproduction of AV data in a real-time manner at the requested reproduction rate is determined to be impossible at the step S15, that is, if the comparison results obtained at the step S15 indicate that the allowable buffer data amount is smaller than the minimum buffer data amount or the allowable reproduction delay time is shorter than the minimum reproduction delay time, that is, if a value smaller than the minimum buffer data amount has been obtained at the step S12 as an allowable size of the buffer 19 or a value smaller than the minimum reproduction delay time has been obtained at the step S12 as an allowable reproduction delay time, on the other hand, the flow of the process goes on to a step S17 at which, the real-time reproducibility determination unit 15 displays a message on the output unit 20 through the system control unit 11. The message indicates that the real-time reproduction is not possible. Finally, the execution of the process to determine whether or not the AV data can be reproduced in a real-time manner is ended.

With the step S17 executed in the disc apparatus shown in FIG. 1, the user is notified that the AV data recorded on the optical disc 31 cannot be reproduced in a real-time manner at the requested reproduction rate.

If the user is notified at the step S17 that the AV data recorded on the optical disc 31 cannot be reproduced in a real-time manner at the requested reproduction rate, by operating the input unit 12, the user can set the allowable buffer data amount and/or the allowable reproduction delay time at a larger value, or set the requested reproduction rate at a smaller value. In this case, the process represented by the flowchart shown in FIG. 3 as a process to determine whether or not the AV data can be reproduced in a real-time manner is carried out again.

In addition to the message notifying the user at the step S17 that the AV data recorded on the optical disc 31 cannot be reproduced in a real-time manner at the requested reproduction rate, the real-time reproducibility determination unit 15 may request the system control unit 11 to carry out compilation.

The compilation implies relocation of data included in the AV data recorded on the optical disc 31 as data to be reproduced continuously into typically a recording area existing in the optical disc 31 as an area contiguous to a certain degree. By carrying out the compilation, the AV data to be reproduced continuously is relocated into a recording area contiguous to a certain degree on the optical disc 31. Thus, at least, the AV data can be read out continuously from the contiguous recording area with no seek operation is carried out during the operation to read out the AV data from the area. As a result, by carrying out the compilation, it is possible to prevent the reproduction process from being interrupted by occurrence of a seek operation causing suspension of an operation to read out AV data from the optical disc 31 so that the AV data read out from the optical disc 31 becomes not in time for the reproduction of the AV data.

The following description gives more information on the process carried out by the disc apparatus shown in FIG. 1 to find graphic data and the process carried out by the disc apparatus to determine whether or not AV data can be reproduced in a real-time manner.

If the size of the buffer 19 employed in the disc apparatus shown in FIG. 1 is at least equal to the amount of AV data recorded on the optical disc 31 and the reproduction delay time between the start of an operation to read out the AV data from the optical disc 31 and the start of an operation to reproduce the AV data is not limited, the AV data recorded on the optical disc 31 can all be read out and stored into the buffer 19 first and, then, the AV data is reproduced so that it is possible to prevent the reproduction of the AV data in a real-time manner from being interrupted by a seek operation taking place in the disc drive 2 without regard to locations at which the AV data has been recorded on the optical disc 31.

That is to say, if no limits are imposed on the size of the buffer 19 and the reproduction delay time, there is no real merit of the execution of the process to make a decision on real-time reproducibility of AV data in a process to determine whether or not it is possible to reproduce the AV data in a real-time manner without being interrupted by a seek operation.

Thus, in determining whether or not AV data can be reproduced in a real-time manner, it is necessary to clarify reproduction conditions, under which the AV data is to be reproduced. As described above, the reproduction conditions include a requested reproduction rate, a read rate, an allowable reproduction delay time, an allowable buffer data amount, a seek time (or a seek time function) and media access information.

It is to be noted that the media access information is dependent on AV data recorded on the optical disc 31, that is, dependent on how contiguous AV data is recorded in recording areas in the optical disc 31. The read rate and the seek time (or the seek time function) are dependent on the specifications of the disc drive 2 or the performance thereof. The requested reproduction rate is determined as an input entered by the user by operating the input unit 12. The allowable reproduction delay time and the allowable buffer data amount are each also determined as an input entered by the user by operating the input unit 12 or dependent on the specifications of the disc drive 2.

As described earlier by referring to the flowchart shown in FIG. 3, in the process to determine whether or not AV data can be reproduced in a real-time manner, a minimum buffer data amount and a minimum reproduction delay time are computed at the step S14 of the flowchart. As explained before, the minimum buffer data amount is defined as a lower limit set for the size of the buffer 19 as a limit required in reproduction of AV data in a real-time manner at a requested reproduction rate whereas the minimum reproduction delay time is defined as a lower limit of a period of time it takes to reproduce the AV data. If an acquired allowable buffer data amount is at least equal to the computed minimum buffer data amount and an acquired allowable reproduction delay time is at least equal to the computed minimum reproduction delay time, the reproduction of the AV data in a real-time manner is determined to be possible.

Thus, the problem of the determination as to whether or not reproduction of AV data in a real-time manner is possible can be solved as a problem to find a minimum buffer data amount and a minimum reproduction delay time.

A minimum buffer data amount and a minimum reproduction delay time can be found at the step S14 of the flowchart in a diagrammatical way from a media read line expressing the change in cumulative amount of data read out from the optical disc 31 in the disc drive 2. In this case, in order to compute a minimum buffer data amount and a minimum reproduction delay time, it is necessary to first find the media read line.

A media read line can be found from media access information.

If data is written onto and erased from the optical disc 31 repeatedly or if a defect exists on the recording face of the optical disc 31, for example, the recording face of the optical disc 31 is inadvertently segmented into a plurality of free contiguous recording areas separated from each other. If contiguous AV data is recorded onto the optical disc 31 with the recording face thereof segmented into a plurality of free contiguous recording areas separated from each other as such, the amount of AV data recorded in any particular one of the contiguous recording areas is limited by the size of the particular contiguous recording area. An extent is defined as a contiguous recording area existing on the optical disc 31 as an area in which continuous AV data is recorded. With an extent defined as such, the media access information can be represented in terms of extents as shown in FIG. 4.

Figure 4:
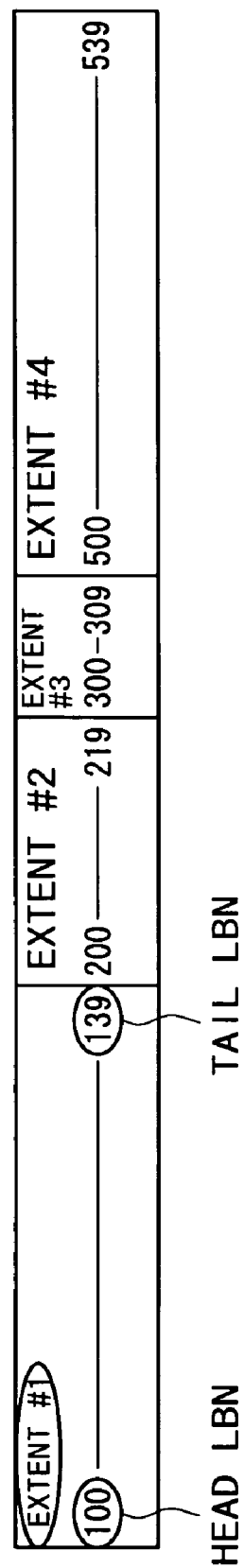
FIG. 4 is an explanatory diagram referred to in describing media access information.

A rectangle shown in FIG. 4 represents an extent. On the left and right sides of a rectangle representing an extent, respectively, the LBNs of the first and last logical blocks of the extent are shown. The LBNs of the first and last logical blocks are referred to hereafter simply as head and tail LBNs respectively. The longitudinal-direction length of a rectangle representing an extent corresponds to the size of the extent.

As shown in FIG. 4, the media access information includes extents represented by rectangles arranged in the horizontal rightwardly direction in the reproduction order of the extents. Thus, the media access information shown in FIG. 4 indicates that the extents are to be reproduced in the following order: extents #1, #2, #3 and #4.

As shown in FIG. 4, extent #1 includes logical blocks identified by LBNs of 100 to 139 and extent #2 includes logical blocks identified by LBNs of 200 to 219. Extent #3 includes logical blocks identified by LBNs of 300 to 309 and extent #4 includes logical blocks identified by LBNs of 500 to 539.

While an extent is a contiguous recording area in which continuous AV data is recorded, an extent for recording specific AV data and an extent for recording AV data to be reproduced right after the specific AV data are not located in a contiguous area. Thus, when AV data spread over 2 extents is read out from the extents in the disc drive 2, a seek operation must be carried out.

To put it concretely, in the example shown in FIG. 4, extent #2 read out after extent #1 in the disc drive 2 has a head LBN of 200, which is not the number 140 following the tail LBN 139 of extent #1. Thus, when a transition from extent #1 to extent #2 is made in the process to read out the AV data, a seek operation is carried out from a logical block identified by an LBN of 139 as a seek origin to a logical block identified by an LBN of 200 as a seek destination.

As described before, the seek time for the seek operation can be found as a function of LBNs. That is to say, the seek time can be found by specifying the LBNs of the logical blocks, which serve as the seek origin and the seek destination, as the arguments of the seek time function.

In the disc drive 2, AV data of an extent is read out at a read rate.

When extents #1 to #4 shown in FIG. 4 are read out from the optical disc 31, the cumulative amount of data read out from the optical disc 31 changes with the lapse of time. A media read line $L_r$ representing the change in cumulative amount of data is described as follows.

Figure 5:
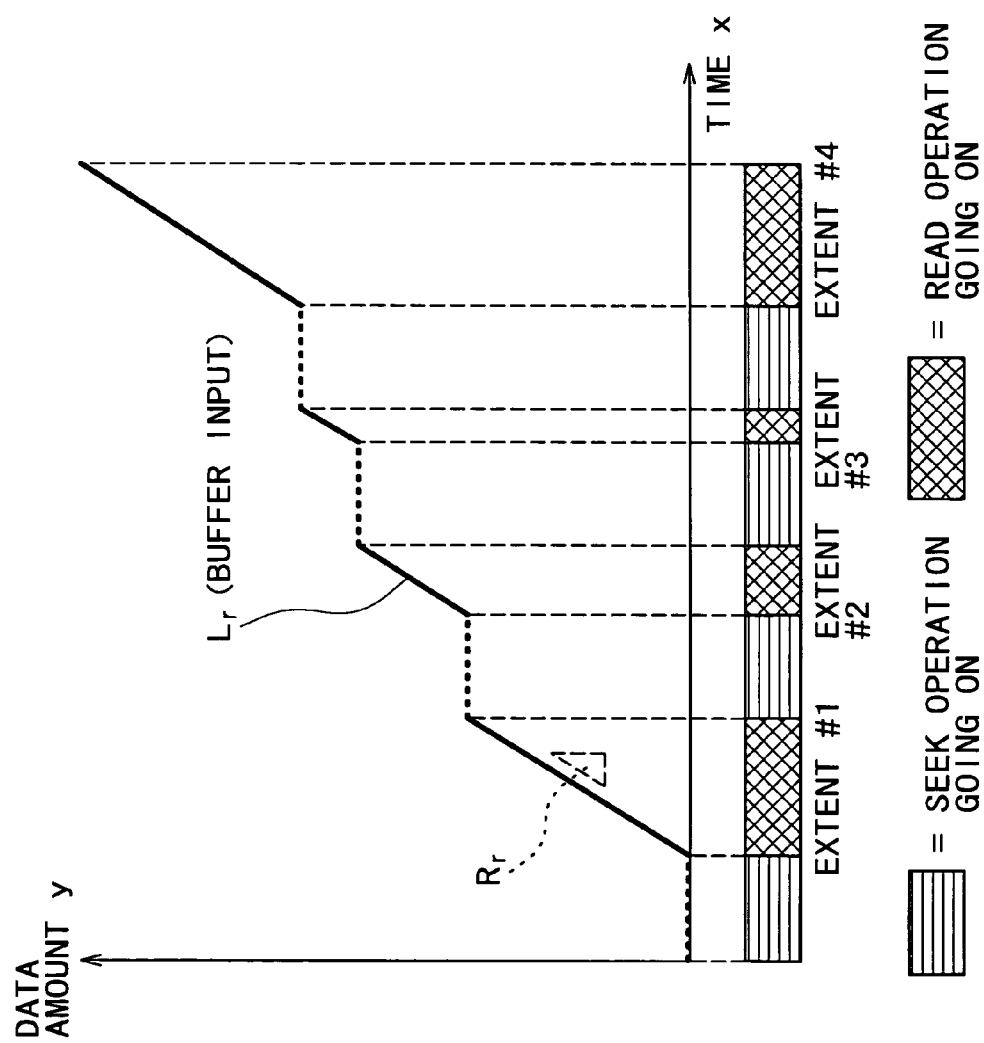
FIG. 5 is a diagram showing a media read line.

FIG. 5 is a diagram showing the media read line $L_r$ representing the change in cumulative amount of data read out in an operation to read extents #1 to #4 shown in FIG. 4 from the optical disc 31.

The media read line $L_r$ shown in FIG. 5 as a line expressing the change in cumulative amount of AV data read out from extents #1 to #4 has a gradient representing a media read rate $R_r$ at which the AV data is read out from the optical disc 31 in the disc drive 2. In a period of time between the end of an operation to read any specific extent and the start of an operation to read an extent to be reproduced right after the specific extent, a seek operation is taking place. Thus, during such a period of time, the media read line $L_r$ has a gradient of 0 since no AV data is read out from the optical disc 31. As a result, the medial read line $L_r$ representing the change in cumulative amount of AV data read out from extents #1 to #4 shown in FIG. 4 is obtained as a staircase-like line rising in the right direction as shown in FIG. 5.

It is to be noted that, in the disc drive 2, a seek operation occurs in the disc drive 2 right before the start of an operation to read the first extent, namely, extent #1. The seek time of this seek operation is dependent on the position of a head (or a pickup shown in none of the figures) employed in the disc drive 2. In this case, however, the seek time of the seek operation occurring in the disc drive 2 right before the start of an operation to read the first extent is not included in the media read line $L_r$.

Figure 6:
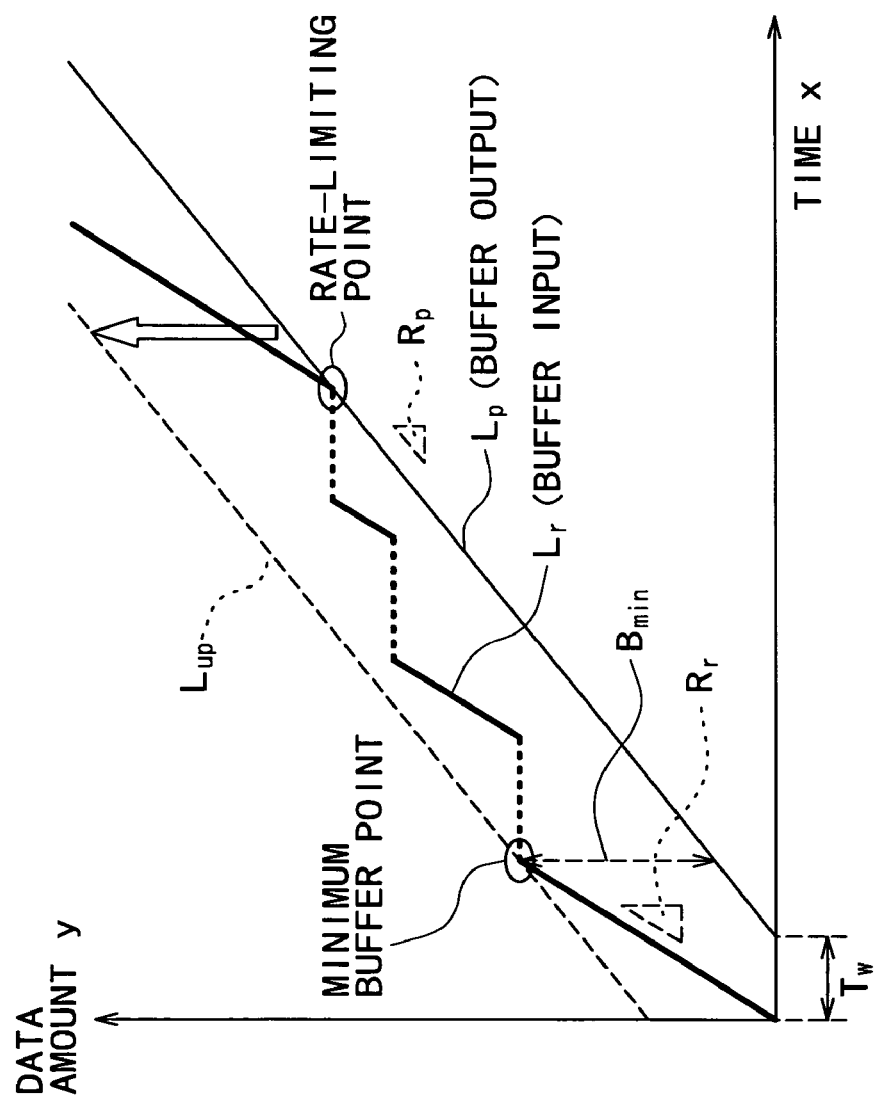
FIG. 6 is an explanatory diagram referred to in describing a real-time reproduction line.

Next, FIG. 6 shows a real-time reproduction line $L_p$. It is to be noted that, in addition to the real-time reproduction line $L_p$, FIG. 6 also shows a buffer upper-limit line $L_{up}$ to be described later.

For an operation to read out AV data from the optical disc 31 with the media read line $L_r$ representing the change in cumulative amount of the AV data, it is necessary to introduce a real-time reproduction line $L_p$ to be used in determining whether or not the AV data can be reproduced in a real-time manner.

The real-time reproduction line $L_p$ represents the change in cumulative amount of AV data output from the buffer 19 with the lapse of time.

Assume for example that serial AV data is reproduced at a fixed reproduction rate. In this case, the real-time reproduction line $L_p$ is a straight line having a gradient equal to the reproduction rate as shown in FIG. 6.

Let a time of 0 denote the start time of an operation of read out AV data from the optical disc 31. It is to be noted that, accurately speaking in this case, the real-time reproduction line $L_p$ is a polygonal line comprising a segment, which represents an AV data amount of 0 after the operation to read out AV data from the optical disc 31 is started till the AV data is actually output from the buffer 19, and a segment slanting at a gradient equal to the reproduction rate.

In FIG. 6 as well as FIG. 5 and figures to be described later, the horizontal axis (or the x axis) represents the lapse of time whereas the vertical axis (or the y axis) represents the (cumulative) amount of data. The distance from the origin to a point of intersection of the real-time reproduction line $L_p$ and the x axis representing the lapse of time represents a reproduction delay time.

As described above, the real-time reproduction line $L_p$ represents the change in cumulative amount of AV data output from the buffer 19 with the lapse of time. On the other hand, the media read line $L_r$ represents the change in cumulative amount of AV data read out from the optical disc 31 and supplied to the buffer 19. Thus, a real-time reproduction line $L_p$ above a media read line $L_r$ indicates an underflow state of the buffer 19. An underflow state of the buffer 19 implies an interrupted state of the reproduction.

Accordingly, in order to assure reproduction of AV data in a real-time manner, it is desirable to shift the real-time reproduction line $L_p$ in the right direction as far as possible.

However, the longer the real-time reproduction line $L_p$ shifts in the rightward direction, the longer the reproduction delay time occurs.

Thus, in order to assure reproduction of AV data in a real-time manner at a shortest possible reproduction delay time, it is necessary to shift the real-time reproduction line $L_p$ in the left direction to a farthest position that does not cause the real-time reproduction line $L_p$ to go above the media read line $L_r$.

To put it in detail, reproduction of AV data in a real-time manner at a shortest possible reproduction delay time can be implemented by bringing the real-time reproduction line $L_p$ into contact with the media read line $L_r$ at one or more points from the lower right side as shown in FIG. 6.

It is to be noted that a reproduction delay time obtained as a result of bringing the real-time reproduction line $L_p$ into contact with the media read line $L_r$ at one or more points from the lower right side is a minimum reproduction delay time $T_w$, which is the lower limit of the reproduction delay time required for the reproduction of AV data in a real-time manner.

One or more points at which the real-time reproduction line $L_p$ is brought into contact with the media read line $L_r$ from the lower right side are each referred to hereafter simply as a rate-limiting point.

It is to be noted that, if the amount of AV data per frame is fixed, strictly speaking, the real-time reproduction line $L_p$ is a staircase-like line changing for each time unit corresponding to a frame.

If the AV data recorded on the optical disc 31 is data with a variable length, for example, it is necessary to draw the real-time reproduction line $L_p$ with reproduction times of resulting AV data used as references. In this case, the resulting AV data is AV data obtained as a result of decoding, and the reproduction times of the resulting AV data are times at which AV data the data having a variable length is reproduced.

If the AV data is fixed-rate data treated as data to be encoded by adoption of typically an MPEG (Moving Picture Experts Group) method, the AV data read out from the optical disc 31 and stored in the buffer 19 is decoded by using typically an MPEG decoder embedded in the read/write control unit 17. In this case, it is necessary to add a delay time, which is caused by a VBV (Video Buffering Verifier) buffer included in the MPEG decoder in a process to draw a real-time reproduction line $L_p$ and other curves.

The graphic-data computation unit 13 shown in FIG. 1 finds graphic data representing a line approximation graphic form approximating the media read line $L_r$ at the step S2 of the flowchart shown in FIG. 2 by using the real-time reproduction line $L_p$ described above.

Figure 7:
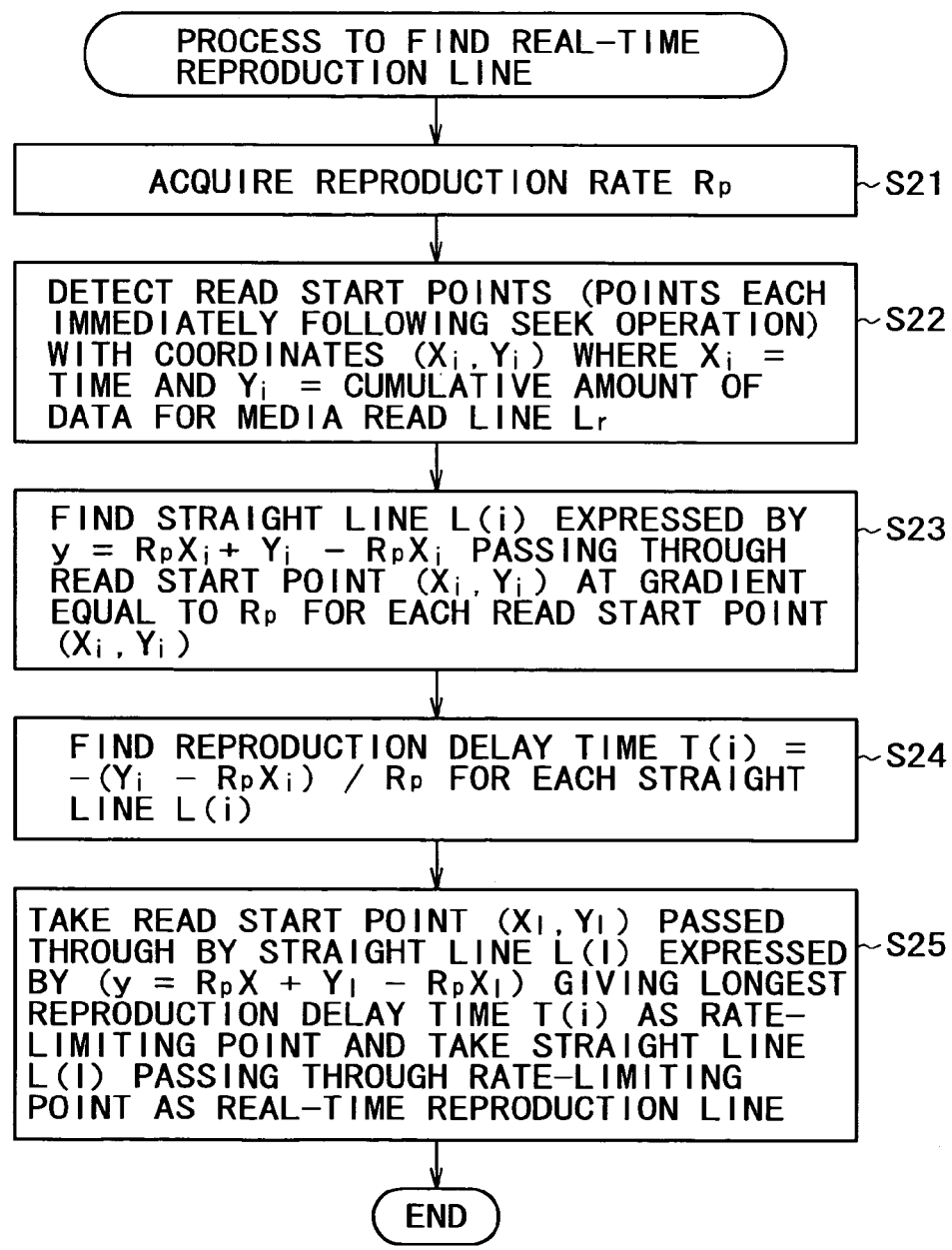
FIG. 7 shows a flowchart representing a process to find a real-time reproduction line.

By referring to a flowchart shown in FIG. 7, the following description explains a real-time reproduction line computation process to find a real-time reproduction line $L_p$.

The flowchart representing the process to find a real-time reproduction line $L_p$ begins with a step S21 at which the graphic-data computation unit 13 acquires a reproduction rate $R_p$. The reproduction rate $R_p$ acquired by the graphic-data computation unit 13 at the step S21 is a reproduction rate used as a reference in finding a line approximation graphic form approximating the media read line $L_r$. The reproduction rate $R_p$ used as a reference as such is referred to hereafter simply as a reference reproduction rate for the sake of convenience. No predetermined value is specially set for the reference reproduction rate. Instead, it is possible to use a reproduction rate for an operation to reproduce AV data from the optical disc 31 at a one-time speed or another reproduction rate as the reference reproduction rate.

After the graphic-data computation unit 13 acquires the reproduction rate $R_p$, the flow of the process goes on from the step S21 to a step S22 at which a point $(X_i, Y_i)$ immediately following the end of every seek operation is detected for the media read line $L_r$.

The point $(X_i, Y_i)$ immediately succeeding the end of a seek operation is a point on the media read line $L_r$. At this point, an operation to read out AV data of extents from the optical disc 31 is started. The point $(X_i, Y_i)$ immediately succeeding the end of a seek operation is referred to hereafter simply as a read start point for the sake of convenience.

It is to be noted that the x coordinate $X_i$ of the read start point $(X_i, Y_i)$ represents a time and the y coordinate $Y_i$ of the read start point $(X_i, Y_i)$ represents a cumulative amount of data. The suffix i of the x coordinate $X_i$ and the y coordinate $Y_i$ indicates the sequence number of the point $(X_i, Y_i)$. A sequence number of a read start point $(X_i, Y_i)$ is a sequential number assigned to the read start point $(X_i, Y_i)$ with a time of 0 taken as a reference for the sake of convenience.

After the graphic-data computation unit 13 detects a read start point $(X_i, Y_i)$ immediately following the end of every seek operation for the media read line $L_r$ at the step S22, the flow of the process goes on to a step S23 to find a straight line L (i) passing through the read start point $(X_i, Y_i)$ at a gradient equal to the reference reproduction rate $R_p$ for every read start point $(X_i, Y_i)$ as shown in FIG. 8 as a candidate for the real-time reproduction line $L_p$. Then, the flow of the process goes on to a step S24.

The straight line L (i) serving as a candidate for the real-time reproduction line can be typically expressed by the following equation:

$$y = R_p x + Y_i - R_p X_i$$

At the step S24, a reproduction delay time T (i) of a candidate L (i) for the real-time reproduction line $L_p$ is found for every straight line L (i) found at the step S23. Then, the flow of the process goes on to a step S25.

As described earlier, the reproduction delay time is an x-axis segment of the real-time reproduction line $L_p$. Thus, the reproduction delay time T (i) of a candidate L (i) for the real-time reproduction line $L_p$ can be found in accordance with the following equation:

$$T(i) = -(Y_i - R_p X_i)/R_p$$

At the step S25, the graphic-data computation unit 13 finds a suffix i that maximizes the reproduction delay time T (i) found at the step S24. Let symbol I denote the suffix i that maximizes the reproduction delay time T (i). In this case, the graphic-data computation unit 13 determines that a read start point $(X_I, Y_I)$ identified by the suffix I is the rate-limiting point. Then, the graphic-data computation unit 13 determines that the candidate L (I) expressed by the equation $y = R_p x + Y_I - R_p X_I$ identified by the suffix I as a candidate for the real-time reproduction line $L_p$ is the correct candidate for the real-time reproduction line, ending the execution of the process to find a real-time reproduction line $L_p$.

A real-time reproduction line $L_p$ found in accordance with the process to find a real-time reproduction line as described above is a polygonal line expressed by an equation y=0 in a period of time from 0 to T (I) and by the equation $y = R_p x + Y_I - R_p X_I$ in a period of time after T (I). At the same time, the maximized reproduction delay time T (I) is taken as the minimum reproduction delay time $T_w$. Thus, by substituting the minimum reproduction delay time $T_w$ for the maximized reproduction delay time T (I), the real-time reproduction line $L_p$ found in accordance with the process to find a real-time reproduction line as described above is a polygonal line expressed by the equation y=0 in a period of time from 0 to $T_w$ and by the equation $y = R_p x + Y_I - R_p X_I$ in a period of time after $T_w$.

It is to be noted that, if there is a plurality of suffixes i that maximize the reproduction delay time T (i), any of the suffixes i that maximize the reproduction delay time T (i) can be used.

As described earlier, for an operation to read out AV data from the optical disc 31 in accordance with the media read line $L_r$ representing the change in cumulative amount of the AV data, in addition to the real-time reproduction line $L_p$, it is necessary to introduce the buffer upper-limit line $L_{up}$ cited above to be used in determining whether or not the AV data can be reproduced in a real-time manner.

Figure 9:
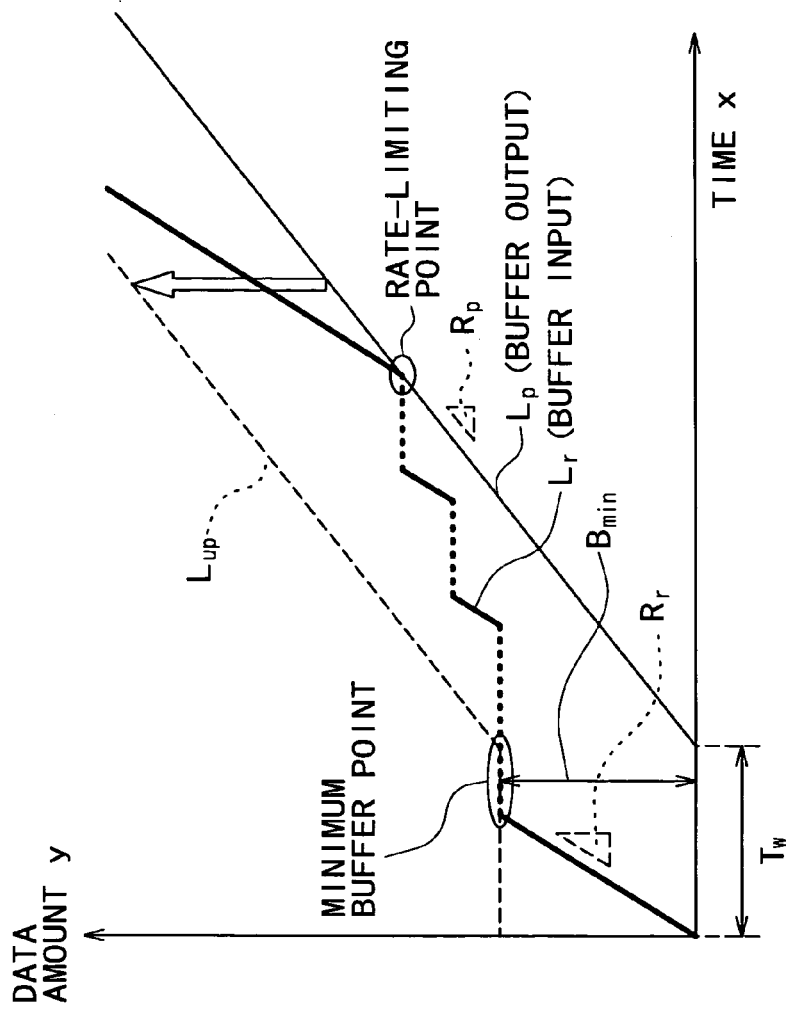
FIG. 9 is an explanatory diagram referred to in describing a buffer upper-limit line.

FIG. 9 is a diagram showing the buffer upper-limit line $L_{up}$.

The buffer upper-limit line $L_{up}$ is a line expressing the change in upper limit with the lapse of time. The upper limit is the cumulative amount of data transferred to the buffer 19 so far. The buffer upper-limit line $L_{up}$ is a polygonal line obtained by shifting the real-time reproduction line $L_p$ in parallel in the upward direction.

As described above, the media read line $L_r$ is a line expressing the change in cumulative amount of data read out from the optical disc 31 and buffered in the buffer 19. On the other hand, the buffer upper-limit line $L_{up}$ is a line expressing the change in upper limit of the cumulative amount of data transferred to the buffer 19. Thus, a media read line $L_r$ above the buffer upper-limit line $L_{up}$ indicates an overflow occurring in the buffer 19. That is to say, it is necessary to prevent the media read line $L_r$ from going above the buffer upper-limit line $L_{up}$ because a media read line $L_r$ above the buffer upper-limit line $L_{up}$ results in a loss of AV data read out from the optical disc 31. As a method to prevent the media read line $L_r$ from going above the buffer upper-limit line $L_{up}$, there is a technique of deliberately making a track jump to wait for the optical disc 31 to make rotations in the disc drive 2 and reading out no AV data from the optical disc 31 while the track jump is being carried out. However, this method prevents the media read line $L_r$ from going above the buffer upper-limit line $L_{up}$ by actually shifting the media read line $L_r$ in the rightward direction. Thus, it is necessary to find a new media read line $L_r$ as a media read line after being shifted in the rightward direction.

The difference in amount of data between the buffer upper-limit line $L_{up}$ and the real-time reproduction line $L_p$, that is, the distance between the buffer upper-limit line $L_{up}$ and the real-time reproduction line $L_p$ in the y-axis direction (or the vertical direction) is the required size of the buffer 19. Thus, in order to decrease the size of the buffer 19, it is desirable to shift the buffer upper-limit line $L_{up}$ to a lowest possible position.

As is obvious from the above description, in order to reduce the required size of the buffer 19 while assuring reproduction of AV data in a real-time manner, it is necessary to bring the buffer upper-limit line $L_{up}$ into contact with the media read line $L_r$ at one or more points from the upper left side as shown in FIG. 9.

The distance between the buffer upper-limit line $L_{up}$ and the real-time reproduction line $L_p$ in the y-axis direction (or the vertical direction) with the buffer upper-limit line $L_{up}$ brought into contact with the media read line $L_r$ at one or more points from the upper left side is the lower limit of the size of the buffer 19. The lower limit of the size of the buffer 19 is referred to hereafter simply as a minimum buffer data amount $B_{min}$, which is a buffer data amount required for reproduction of AV data in a real-time manner.

The minimum buffer data amount $B_{min}$ can be reduced by entering a rotation wait state, which is a state of waiting for the optical disc 31 to make rotations in the disc drive 2 as described earlier. However, the rotation wait state must be a state entered at a point after the rate-limiting point on the media read line $L_r$.

One or more points at which the buffer upper-limit line $L_{up}$ is brought into contact with the media read line $L_r$ from the upper left side are each referred to hereafter simply as a minimum buffer point.

In the process carried out by the graphic-data computation unit 13 shown in FIG. 1 to find graphic data representing a line approximation graphic form approximating the media read line $L_r$ at the step S2 of the flowchart shown in FIG. 2, in addition to the real-time reproduction line $L_p$, the buffer upper-limit line $L_{up}$ is also used.

Figure 10:
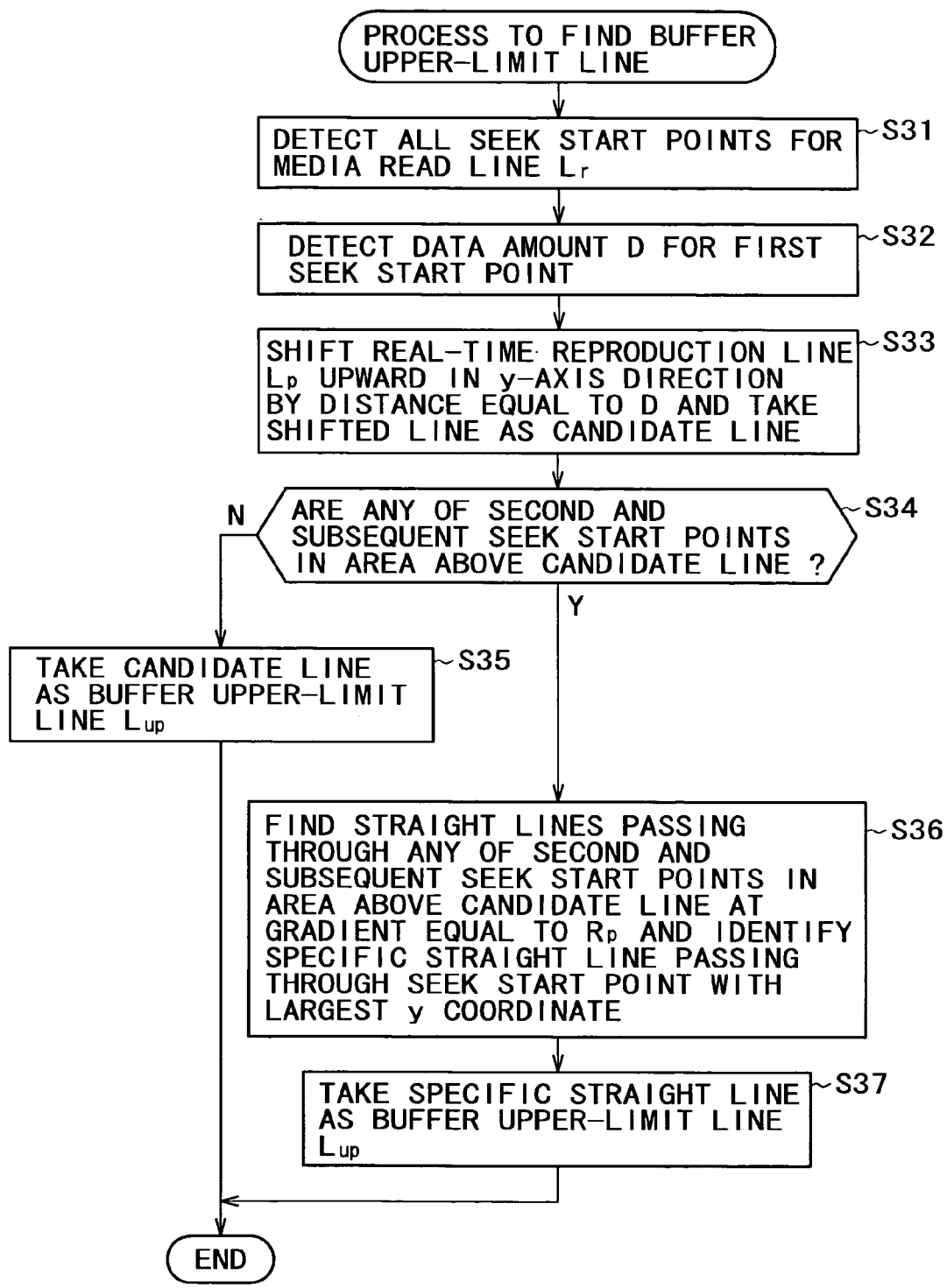
FIG. 10 is an explanatory diagram referred to in describing a method to find a buffer upper-limit line.

By referring to a flowchart shown in FIG. 10, the following description explains a buffer upper-limit line computation process to find a buffer upper-limit line $L_{up}$.

The flowchart representing the buffer upper-limit line computation process begins with a step S31 at which the graphic-data computation unit 13 detects all seek start points for the media read line $L_r$. A seek start point is defined as a point at which a seek operation is started. Then, the flow of the process goes on to a step S32. At the step S32, the graphic-data computation unit 13 finds the amount D of AV data read out from the optical disc 31 for the first seek start point found in tracing the x axis from the origin in the direction of the lapse of time. Then, the flow of the process goes on to a step S33.

At the step S33, the graphic-data computation unit 13 shifts the real-time reproduction $L_p$ by the amount D found at the step S32 in the upward direction parallel to the y axis and takes the shifted real-time reproduction $L_p$ as a candidate for the buffer upper-limit line $L_{up}$. The candidate for the buffer upper-limit line $L_{up}$ is also referred to hereafter simply as a candidate line.

Since the shifted real-time reproduction $L_p$ is taken as a candidate for the buffer upper-limit line $L_{up}$ as described above, the buffer upper-limit line computation process can be carried out only after the real-time reproduction line $L_p$ has been found by performing the real-time reproduction line computation process represented by the flowchart shown in FIG. 7.

Assume that, in the real-time reproduction line computation process represented by the flowchart shown in FIG. 7, it was possible to find a real-time reproduction line $L_p$ as a polygonal line expressed by an equation y=0 in a period of time from 0 to T (I) and by an equation $y=R_p x+Y_I-R_p X_I$ in a period of time after T (I). In this case, the candidate line found at the step S33 as a candidate for the buffer upper-limit line $L_{up}$ is a polygonal line expressed by an equation y=D in a period of time from 0 to T (I) and by the equation $y=R_p x+Y_I-R_p X_I+D$ in a period of time after T (I).

After the graphic-data computation unit 13 finds the candidate line as a candidate for the buffer upper-limit line $L_{up}$ at the step S33, the flow of the process goes on to a step S34 to determine whether or not any of the second and subsequent seek start points detected on the media read line $L_r$ at the step S31 is positioned above the candidate line.

Figure 11:
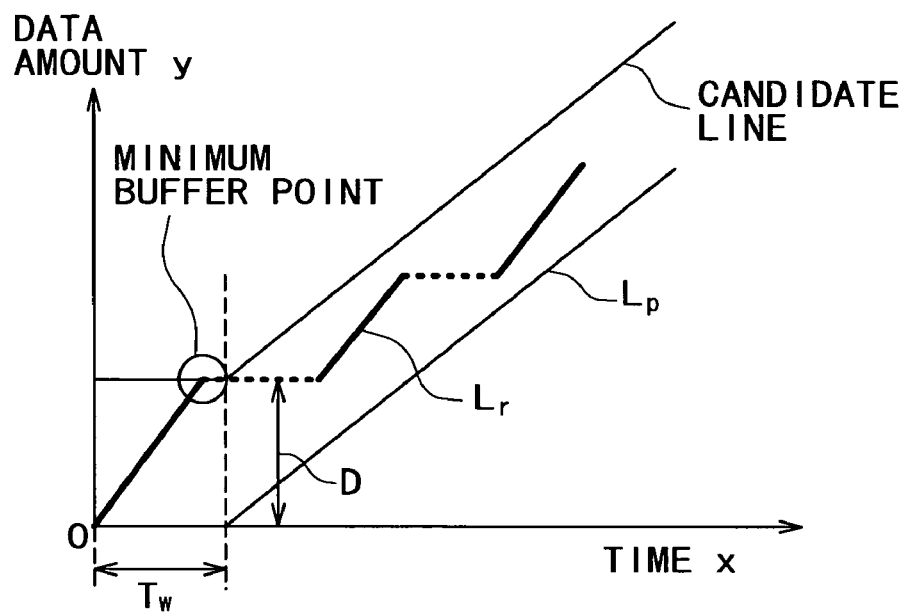
FIG. 11 shows a flowchart representing a process to find a buffer upper-limit line.

If the determination result obtained at the step S34 indicates that none of the second and subsequent seek start points on the media read line $L_r$ are positioned above the candidate line, that is, if all the second and subsequent seek start points on the media read line $L_r$ are positioned below the candidate line as shown in FIG. 11 or in contact with the candidate line (that is, if the candidate line is not below the media read line $L_r$), the flow of the process goes on to a step S35 at which the graphic-data computation unit 13 takes the candidate line as the buffer upper-limit line $L_{up}$, ending the execution of the process to find a buffer upper-limit line $L_{up}$.

If the determination result obtained at the step S34 indicates that any specific one of the second and subsequent seek start points is positioned above the candidate line, that is, if the relation $Y>R_p X+Y_I-R_p X_I+D$ holds true where symbols X and Y are respectively x and y coordinates of the specific one of the second and subsequent seek start points, the flow of the process goes on to a step S36 at which the graphic-data computation unit 13 finds a straight line passing through the specific seek start point (X, Y) at a gradient equal to the reference reproduction rate $R_p$. If there is a plurality of such specific seek start points (X, Y) above the candidate line, the graphic-data computation unit 13 finds such a straight line for each of the specific seek start points (X, Y). Then, the graphic-data computation unit 13 determines a particular one among the straight lines each having a gradient equal to the reference reproduction rate $R_p$. The particular straight line passes through a specific seek start point (X, Y) with the largest y coordinate. The graphic-data computation unit 13 takes this particular straight line as a segment of the buffer upper-limit line $L_{up}$ to be finally determined at the next step S37. Then, the flow of the process goes on to the step S37.

Figure 12:
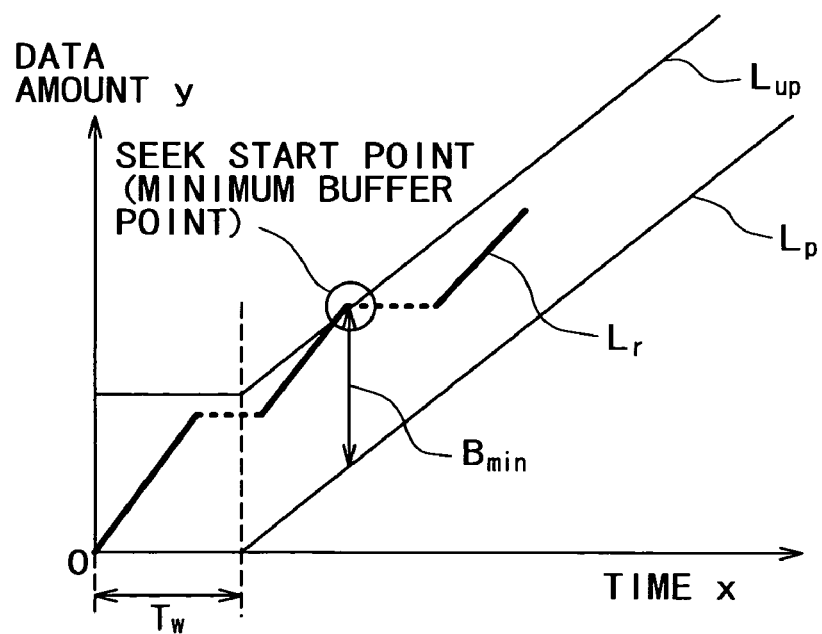
FIG. 12 is an explanatory diagram referred to in describing a process to find a buffer upper-limit line.

At the step S37, the graphic-data computation unit 13 takes the seek start point on the straight line, which serves as the buffer upper-limit line $L_{up}$, as the minimum buffer point, and finds the distance in the vertical direction from the minimum buffer point to the real-time reproduction line $L_p$ as the minimum buffer data amount $B_{min}$ as shown in FIG. 12. Finally, at the step S37, as the buffer upper-limit line $L_{up}$, the graphic-data computation unit 13 takes a polygonal line expressed by an equation $y=B_{min}$ in a period of time from 0 to the minimum reproduction delay time $T_w$ and expressed by the particular straight line passing through the specific seek start point (X, Y) with the largest y coordinate as described above in a period of time after the minimum reproduction delay time $T_w$, ending the execution of the process to find a buffer upper-limit line $L_{up}$.

In the process to find a buffer upper-limit line $L_{up}$, the minimum buffer data amount $B_{min}$ is also found as well.

It is possible to adopt the methods described above for finding a real-time reproduction line $L_p$, a minimum reproduction delay time $T_w$, a buffer upper-limit line $L_{up}$ and a minimum buffer data amount $B_{min}$ as they are in a process to reproduce a file containing only AV data such as only audio or video data from the optical disc 31. In the case of a process to reproduce audio data and video data, which are recorded in separated files on the optical disc 31, as AV data of a single file representing the whole data, however, it is necessary to find a real-time reproduction line $L_p$, a minimum reproduction delay time $T_w$, a buffer upper-limit line $L_{up}$ and a minimum buffer data amount $B_{min}$ as follows.

In a process to reproduce audio data and video data, which are recorded in separated files on the optical disc 31, there is provided a reproduction method whereby a list of the files for storing the audio and the video data is prescribed in a file known as a VFL (Virtual File List) file in advance and, then, the video data as well as the audio data accompanying the video data are reproduced at the same time in accordance with the VFL file so that the files for storing the audio and the video data can be handled as a single file for storing AV data.

Figure 13:
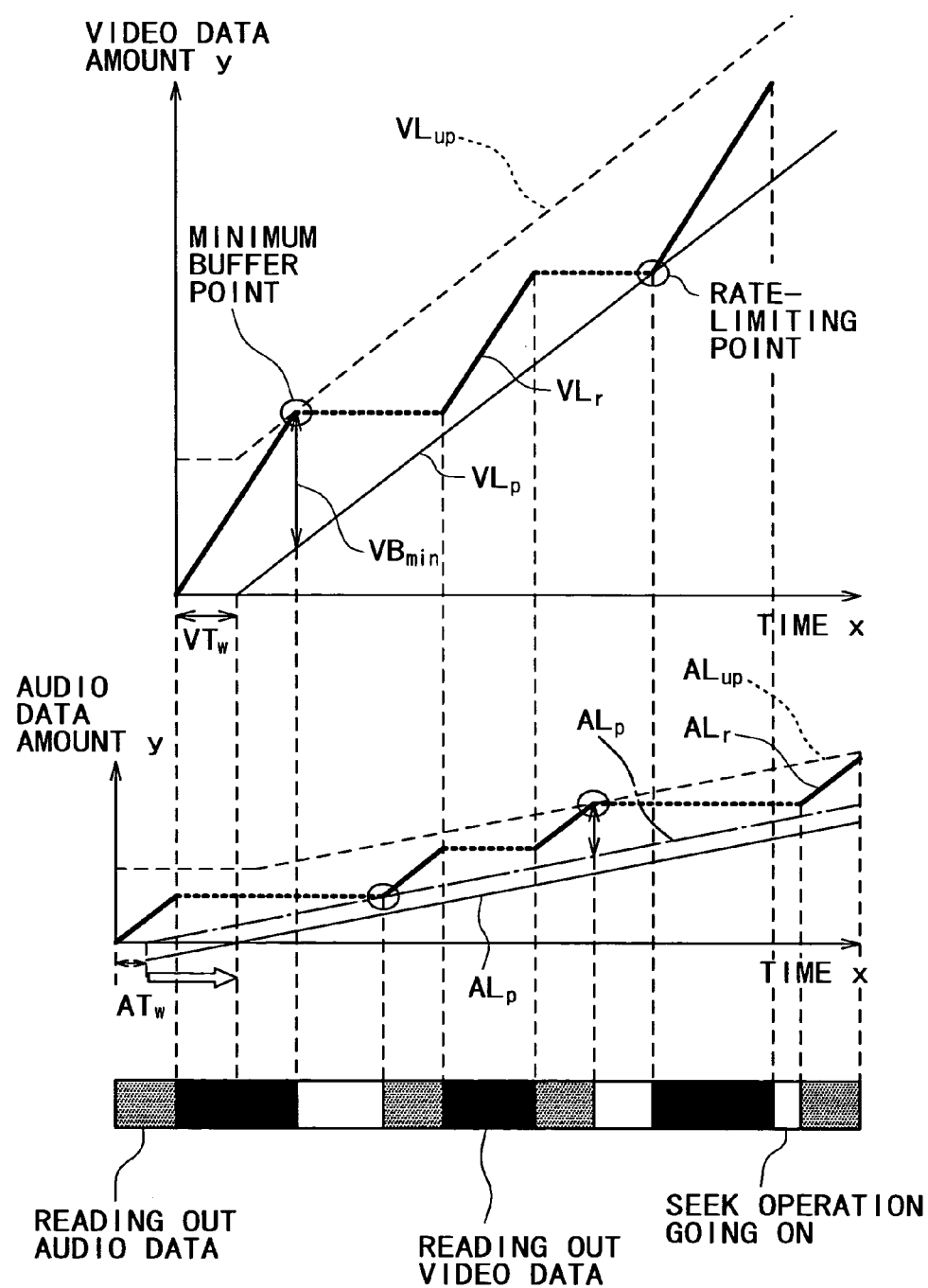
FIG. 13 is an explanatory diagram referred to in describing a method to find a buffer upper-limit line for a process to read out video and audio data concurrently.

In this case, it is necessary to read out the video and the audio data from the optical disc 31 at the same time. Thus, first of all, media read lines $VL_r$ and $AL_r$ as well as real-time reproduction lines $VL_p$ and $AL_p$ are found for the video and audio data respectively by adoption of the same method as those described earlier. The media read lines $VL_r$ and $AL_r$ as well as the real-time reproduction lines $VL_p$ and $AL_p$ are shown in FIG. 13. It is to be noted, however, that in a process to reproduce the video data and the audio data accompanying the video data 'at the same time' so to speak from the optical disc 31, in actuality, the disc drive 2 typically reads out pieces of the video data and the audio data from the optical disc 31 in a reproduction order on a timedivision basis while carrying out seek operations whenever necessary as shown in FIG. 13.

After the real-time reproduction lines $VL_p$ and $AL_p$ are found for the video and audio data respectively, a minimum reproduction delay time $VT_w$ found from the real-time reproduction line $VL_p$ of the video data may be found different from a minimum reproduction delay time $AT_w$ found from the real-time reproduction line $AL_p$ of the audio data. In this case, either the real-time reproduction line $VL_p$ of the video data or the real-time reproduction line $AL_p$ of the audio data is selected as a real-time reproduction line giving the shorter minimum reproduction delay time, and the selected real-time reproduction line is shifted in the rightward direction to adjust the shorter minimum reproduction delay time to the longer minimum reproduction delay time. Since the minimum reproduction delay time $VT_w$ found for the video data is generally longer than the minimum reproduction delay time $AT_w$ found for the audio data, the real-time reproduction line $AL_p$ is shifted in the rightward direction to adjust the shorter minimum reproduction delay time $AT_w$ to the longer minimum reproduction delay time $VT_w$. A real-time reproduction line $AL_p'$ is the shifted real-time reproduction line $AL_p$.

Then, by adopting the method explained earlier by referring to FIGS. 9 to 12, a buffer upper-limit line $VL_{up}$ for the video data is found from the real-time reproduction line $VL_p$ obtained for the video data as described above. By the same token, also by adopting the method explained earlier by referring to FIGS. 9 to 12, a buffer upper-limit line $AL_{up}$ for the audio data is found from the real-time reproduction line $AL_{up}'$ obtained for the audio data as described above.

It is to be noted that, in this case, it is assumed that the buffer 19 for storing video data read out from the optical disc 31 is provided as a buffer used independently of the buffer 19 for storing audio data read out from the optical disc 31. However, it is also possible to employ a buffer used as the buffer 19 common to video data read out from the optical disc 31 and audio data read out from the same disc 31. In this case, the size of the buffer 19 common to the video and audio data may be smaller than the sum of the sizes of the independent buffers provided separately for the video and audio data.

In addition, in the case of a file comprising a number of extents, it takes time to compute the minimum reproduction delay time $T_w$ and the minimum buffer data amount $B_{min}$ for the reference reproduction rate in some cases. For this reason, the minimum reproduction delay time $T_w$ and the minimum buffer data amount $B_{min}$ for the reference reproduction rate are found in advance at the time the file is created on the optical disc 31 so that the minimum reproduction delay time $T_w$ and the minimum buffer data amount $B_{min}$ can be immediately referenced in a process to determine whether or not audio data can be reproduced in a real-time manner. It is to be noted that, if the minimum reproduction delay time $T_w$ and the minimum buffer data amount $B_{min}$ for the reference reproduction rate are found in advance at the time a file is created, the minimum reproduction delay time $T_w$ and the minimum buffer data amount $B_{min}$ may be stored in an extended attribute file provided that such an extended attribute file is created for the file. An extended attribute file created for a specific file is used for storing entries of the specific file and a variety of attributes for the specific file.

By the way, in the embodiment described above, the minimum reproduction delay time $T_w$ and the minimum buffer data amount $B_{min}$ are found by using a reproduction rate for the one-time speed reproduction processing as the reference reproduction rate $R_p$, which is defined as the gradient of the real-time reproduction line $L_p$. Assume that the requested reproduction rate entered by the user by operating the input unit 12 matches the reproduction rate for the one-time speed reproduction processing, that is, the reference reproduction rate $R_p$. In this case, by comparing the minimum reproduction delay time $T_w$ and the minimum buffer data amount $B_{min}$, which are found for the reference reproduction rate $R_p$, with the allowable reproduction delay time and the allowable buffer data amount respectively, it is possible to easily determine whether or not AV data can be reproduced in a real-time manner. That is to say, if the minimum buffer data amount $B_{min}$ is not greater than the allowable buffer data amount and the minimum reproduction delay time $T_w$ is not longer than the allowable reproduction delay time, AV data can be reproduced in a real-time manner at a reproduction rate corresponding to the reproduction rate for the one-time speed reproduction processing. If the minimum buffer data amount $B_{min}$ is greater than the allowable buffer data amount or the minimum reproduction delay time $T_w$ is longer than the allowable reproduction delay time, on the other hand, AV data cannot be reproduced in a real-time manner at a reproduction rate corresponding to the reproduction rate for the one-time speed reproduction processing.

If the requested reproduction rate does not match the reference reproduction rate $R_p$, on the other hand, it is necessary to find a buffer upper-limit line $L_{up}$ and a real-time reproduction line $L_p$, which have a gradient equal to the requested reproduction rate. It is also necessary to find a minimum reproduction delay time $T_w$ and a minimum buffer data amount $B_{min}$ for the requested reproduction rate. Then, the minimum reproduction delay time $T_w$ and the minimum buffer data amount $B_{min}$ must be compared with the allowable reproduction time delay and the allowable buffer data amount respectively. Otherwise, it is impossible to make a decision on real-time reproducibility in a process to determine whether or not AV data can be reproduced in a real-time manner at the requested reproduction rate. Thus, the determination of whether or not AV data can be reproduced in a real-time manner at the requested reproduction rate is a cumbersome work in this case. In addition, a media read line $L_r$ is required for finding a buffer upper-limit line $L_{up}$ and a real-time reproduction line $L_p$, which have a gradient equal to the requested reproduction rate. Thus, every time the requested reproduction rate is changed, the media read line $L_r$ becomes necessary. In consequence, every time the requested reproduction rate is changed, a media read line $L_r$ must be newly found or the once found media read line $L_r$ must be saved, and this work also complicates the process.

However, the disc apparatus shown in FIG. 1 simplifies the processing to make a decision on real-time reproducibility in a process to determine whether or not AV data can be reproduced in a real-time manner at a requested reproduction rate as follows.

Figure 14:
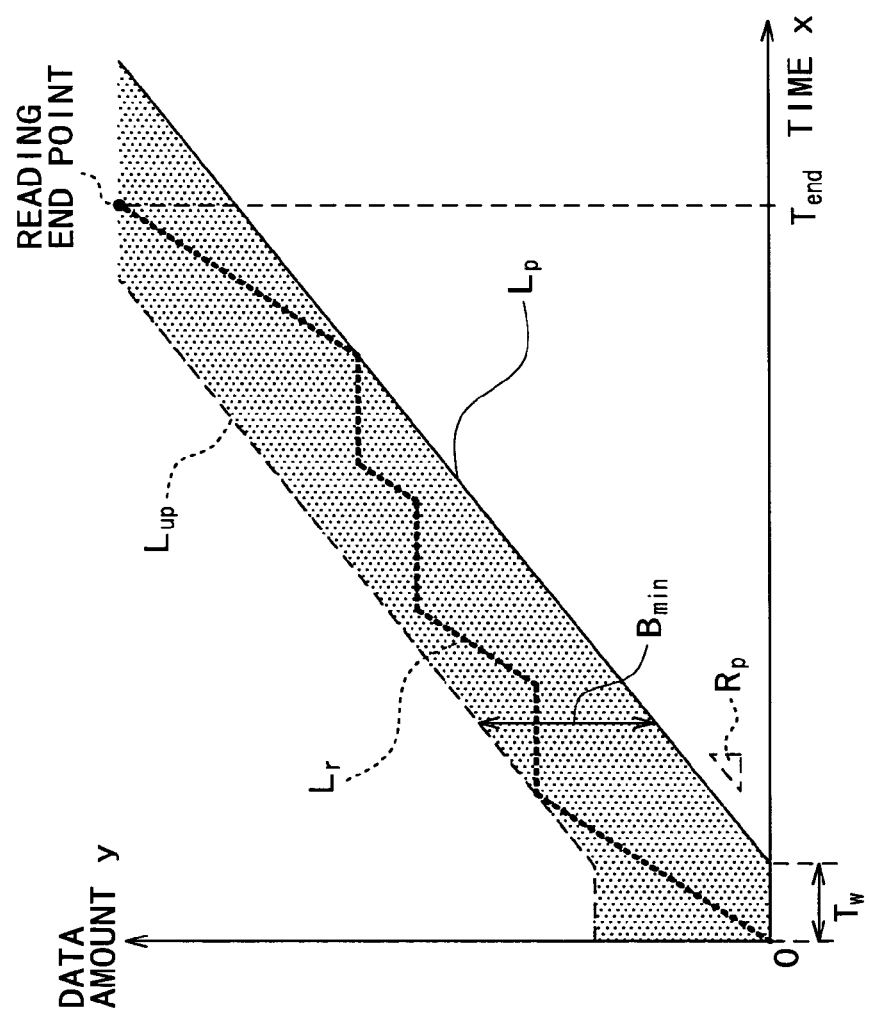
FIG. 14 is a diagram showing a hockey-stick shape used as a line approximation graphic form approximating a media read line.

As shown in FIG. 14, the media read line $L_r$ lies on a shadow area sandwiched by a real-time reproduction line $L_p$ having a gradient equal to a reference reproduction rate $R_p$ to provide a minimum reproduction delay time $T_w$ and a buffer upper-limit line $L_{up}$ also having a gradient equal to the reference reproduction rate $R_p$ to provide a minimum buffer data amount $B_{min}$. The buffer upper-limit line $L_{up}$ and the real-time reproduction line $L_p$ are respectively upper-left and lower-right borders of the shadow area shown in FIG. 14. A segment on the y axis is a left-side border of the shadow area and a straight line passing through a read end point in parallel to the x axis is a top border of the shadow area. The read end point is the last point on the upper edge of the media read line $L_r$. At the read end point, an operation to read out AV data from the optical disc 31 is ended. The read end point is thus a time-wise last point of the media read line $L_r$. Having a form resembling the shape of a hockey stick, the shadow area is referred to hereafter simply as a hockey-stick shape, which can be said to be a graphic form approximating the media read line $L_r$.

The hockey-stick shape can be defined typically by the reference reproduction rate $R_p$, the minimum buffer data amount $B_{min}$ and the minimum reproduction delay time $T_w$, which are set for the reference reproduction rate $R_p$, and the read end point. For this reason, the graphic-data computation unit 13 shown in FIG. 1 finds the reference reproduction rate $R_p$, the minimum buffer data amount $B_{min}$, the minimum reproduction delay time $T_w$ and the read end point as graphic data representing the hockey-stick shape, which is used as a line approximation graphic form approximating the media read line $L_r$, at the step S2 of the flowchart shown in FIG. 2, storing the graphic data in the graphic-data storage unit 14 at the step S3 of the flowchart shown in FIG. 2. It is to be noted that, while the graphic data may include x and y coordinates of the read end point, both the coordinates are not necessarily included in the graphic data. That is to say, only one of the coordinates can be included in the graphic data. The x coordinate of the read end point is a read end time $T_{end}$ at which an operation to read out AV data from the optical disc 31 is ended. On the other hand, the y coordinate of the read end point is the cumulative amount of the AV data read out from the optical disc 31 so far up to the read end time $T_{end}$. In addition, the graphic data representing the hockey-stick shape is not limited to the reference reproduction rate $R_p$, the minimum buffer data amount $B_{min}$, the minimum reproduction delay time $T_w$ and the read end point, which are described above.

As explained below, the real-time reproducibility determination unit 15 shown in FIG. 1 finds a minimum buffer data amount and a minimum delay time for the required reproduction rate on the basis of the line approximation graphic form resembling the shape of a hockey stick described above at the step S14 of the flowchart shown in FIG. 3. The minimum buffer data amount for the required reproduction rate is a minimum buffer data amount required for reproduction of data at the required reproduction rate. By the same token, the minimum delay time for the required reproduction rate is a minimum delay time required for reproduction of the data at the required reproduction rate.

In order to assure reproduction of data in a real-time manner at the requested reproduction rate, the real-time reproduction line for the requested reproduction rate must not go above the media read line $L_r$.

On the other hand, the hockey-stick-like line approximation graphic form found for the reference reproduction rate covers the media read line $L_r$. Thus, if the real-time reproduction line for the requested reproduction rate lies in an area below the hockey-stick-like line approximation graphic form found for the reference reproduction rate or is merely in contact with the lower right border of the line approximation graphic form, the real-time reproduction line for the requested reproduction rate by no means goes above the media read line $L_r$.

Figure 15:
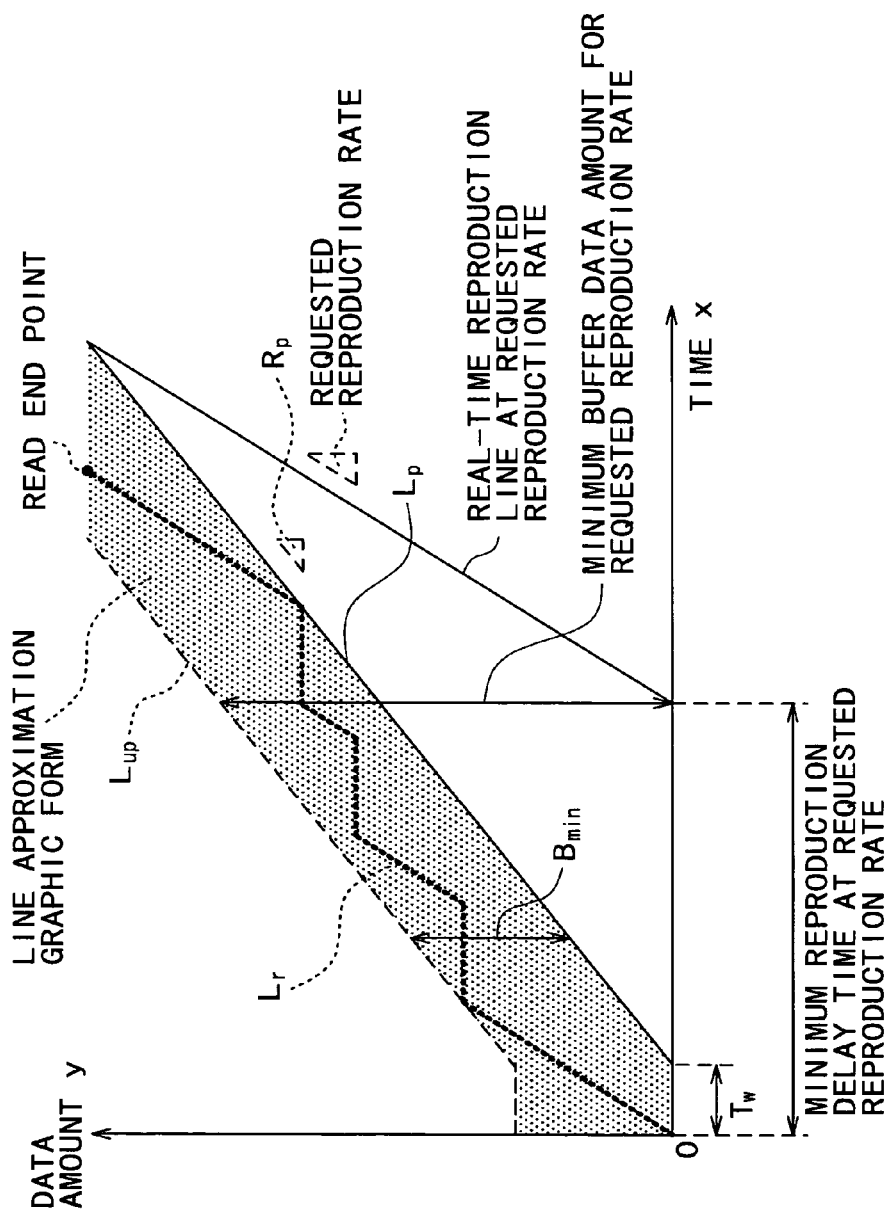
FIG. 15 is an explanatory diagram referred to in describing a method based on a line approximation graphic form to determine whether or not AV data can be reproduced in a real-time manner at a requested reproduction rate.

For the reason described above, in order to guarantee reproduction of data in a real-time manner at the requested reproduction rate, it is necessary to assure that the real-time reproduction line for the requested reproduction rate lies in an area below the hockey-stick-like line approximation graphic form found for the reference reproduction rate or is merely in contact with the lower right border of the line approximation graphic form as shown in FIG. 15. The locations below and in contact with the lower right border of the line approximation graphic form are referred to hereafter simply as an area under the line approximation graphic form for the sake of convenience.

The real-time reproduction line for the requested reproduction rate lies in the area under the line approximation graphic form, and may be in contact with the lower right border of the approximation graphic form at one or more points. The real-time reproduction line is obtained by determining a straight line having a gradient equal to the requested reproduction rate (referred to hereafter simply as a reproduction request straight line for the sake of convenience) and a x-axis segment for the reproduction request straight line. That is, the real-time reproduction line for the requested reproduction rate in this case is a polygonal line consisting the x-axis segment expressed by an equation y=0 for the time period 0 to the length of the x-axis segment and the reproduction request straight line for a time period after the length of the x-axis segment as shown in FIG. 15.

As shown in FIG. 15, the length of the x-axis segment of the reproduction request straight line is a value approximating the minimum reproduction delay time for the requested reproduction rate. On the other hand, the maximum value of a distance in the vertical direction from the real-time reproduction line with a gradient equal to the requested reproduction rate to the buffer upper-limit line $L_{up}$ serving as the upper left border of the line approximation graphic form resembling the shape of a hockey stick is a value approximating the minimum buffer data amount for the requested reproduction rate.

As described above, (a value approximating) the minimum reproduction delay time for the requested reproduction rate and (a value approximating) the minimum buffer data amount for the requested reproduction rate are found and, then, compared with the allowable reproduction delay time and the allowable buffer data amount respectively to easily determine whether or not AV data can be reproduced in a real-time manner at the requested reproduction rate.

It is to be noted that, in the embodiment shown in FIG. 15, the typically requested reproduction rate is twice the reference reproduction rate $R_p$.

For the sake of convenience, in the following description, the real-time reproduction line $L_p$, the buffer upper-limit line $L_{up}$, the minimum reproduction delay time $T_w$ and the minimum buffer data amount $B_{min}$, which are set for the reference reproduction rate $R_p$, are referred to as a reference real-time reproduction line $L_p$, a reference buffer upper-limit line $L_{up}$, a reference minimum reproduction delay time $T_w$ and a reference minimum buffer data amount $B_{min}$ respectively.

As described above, if the reference reproduction rate $R_p$, the reference minimum reproduction delay time $T_w$, the reference minimum buffer data amount $B_{min}$ and the read end point are stored in the graphic-data storage unit 14 in advance as graphic data at the step S3 of the flowchart shown in FIG. 2, a minimum reproduction delay time for a requested reproduction rate and a minimum buffer data amount for the requested reproduction rate can be found at the step S14 of the flowchart shown in FIG. 3 on the basis of a hockey-stick-like line approximation graphic form represented by the graphic data to be used in making a decision on real-time reproducibility in a process to determine whether or not AV data can be reproduced in a real-time manner at the requested reproduction rate at the step S15 of the flowchart shown in FIG. 3.

It is to be noted that, in order to assure an operation to reproduce AV data in a real-time manner at a requested reproduction rate, it is necessary not only to prevent a real-time reproduction line for the requested reproduction rate from going above the media read line $L_r$, but also to prevent the media read line $L_r$ from going above the buffer upper-limit line for the requested reproduction rate. However, it is possible to prevent the media read line $L_r$ from going above the buffer upper-limit line for the requested reproduction rate by deliberately entering a state of waiting for the optical disc 31 to make rotations in the disc drive 2 as described earlier.

By the way, a reproduction rate corresponding to the one-time reproduction processing is used as a reference reproduction rate in finding a line approximation graphic form resembling the shape of a hockey stick as described above. Once a line approximation graphic form resembling the shape of a hockey stick has been determined, however, a minimum reproduction delay time for the requested reproduction rate and a minimum buffer data amount for the requested reproduction rate can be found on the basis of the line approximation graphic form, which may have been found from any reference reproduction rate. That is to say, it is not always necessary to use a reproduction rate corresponding to the one-time reproduction processing as a reference reproduction rate in finding a line approximation graphic form resembling the shape of a hockey stick. As a matter of fact, by using a reproduction rate corresponding to the one-time reproduction processing as a reference reproduction rate, the resulting line approximation graphic form resembling the shape of a hockey stick does not approximate the media read line $L_r$ with such a high degree of precision.

Figure 16:
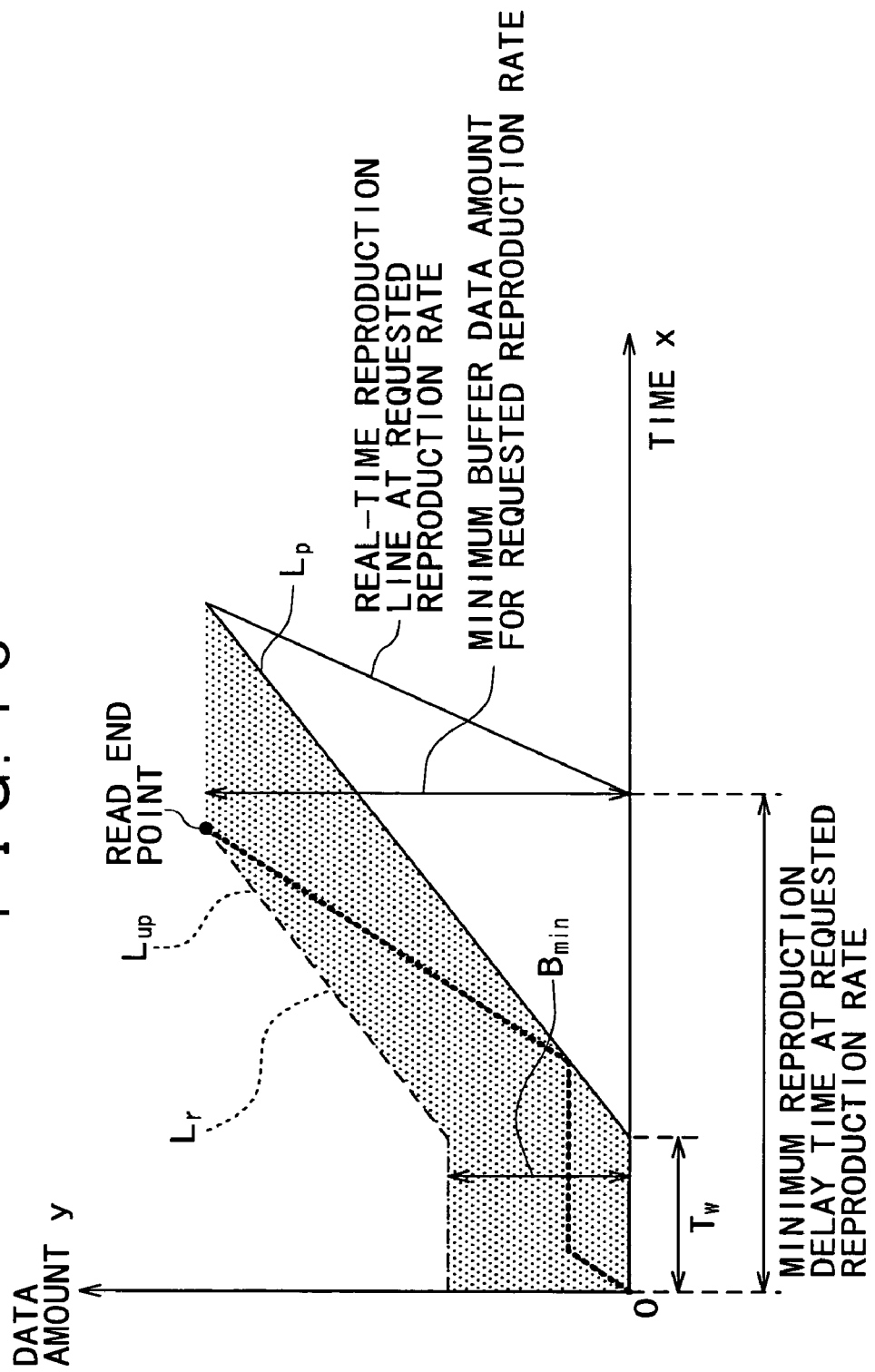
FIG. 16 is a diagram showing a hockey-stick shape used as a line approximation graphic form.

For example, assume that the media read line $L_r$ includes a long seek operation right after an operation to read out AV data from the optical disc 31 and, after the seek operation, another continuous operation is carried out to read AV data from the optical disc 31 without a seek operation as shown in FIG. 16. If a reproduction rate for the one-time speed reproduction is used as the reference rate in this case, a wide hockey-stick shape is obtained as a line approximation graphic form approximating the media read line $L_r$.

In this case, the reproduction request straight line (a real-time reproduction line with a gradient equal to a requested reproduction rate higher than the reference reproduction rate) has a long x-axis segment as shown in FIG. 16. Since the x-axis segment of a real-time reproduction line with a gradient equal to a requested reproduction rate is the minimum reproduction delay time for the requested reproduction rate, in this case, a value obtained as (a value approximating) the minimum reproduction delay time for the requested reproduction rate is much greater than the true value of the actually requested minimum reproduction delay time. In addition, for a long x-axis segment of the real-time reproduction line with a gradient equal to the requested reproduction rate, (a value approximating) the minimum buffer data amount represented by a distance in the vertical direction from the real-time reproduction line to the reference buffer upper-limit line $L_{up}$ serving as the upper left border of the line approximation graphic form resembling the shape of a hockey stick is also large. Thus, in this case, a value obtained as (a value approximating) the minimum buffer data amount is also much greater than the true value of the actually requested minimum buffer data amount.

In order to solve the problem described above, the concept of a virtual reproduction rate is introduced. By assuming a virtual reproduction rate, it is possible to obtain a hockey-stick-like line approximation graphic form approximating the media read line $L_r$ with a higher degree of precision without regard to considerations such as the determination of whether or not reproduction of AV data at the requested reproduction rate is possible.

Let a virtual reproduction rate be defined as a virtually assumed reproduction rate for which it is possible to obtain a hockey-stick-like line approximation graphic form approximating the media read line $L_r$ with a higher degree of precision. In this case, the virtual reproduction rate can be used as a reference reproduction rate.

Figure 17:
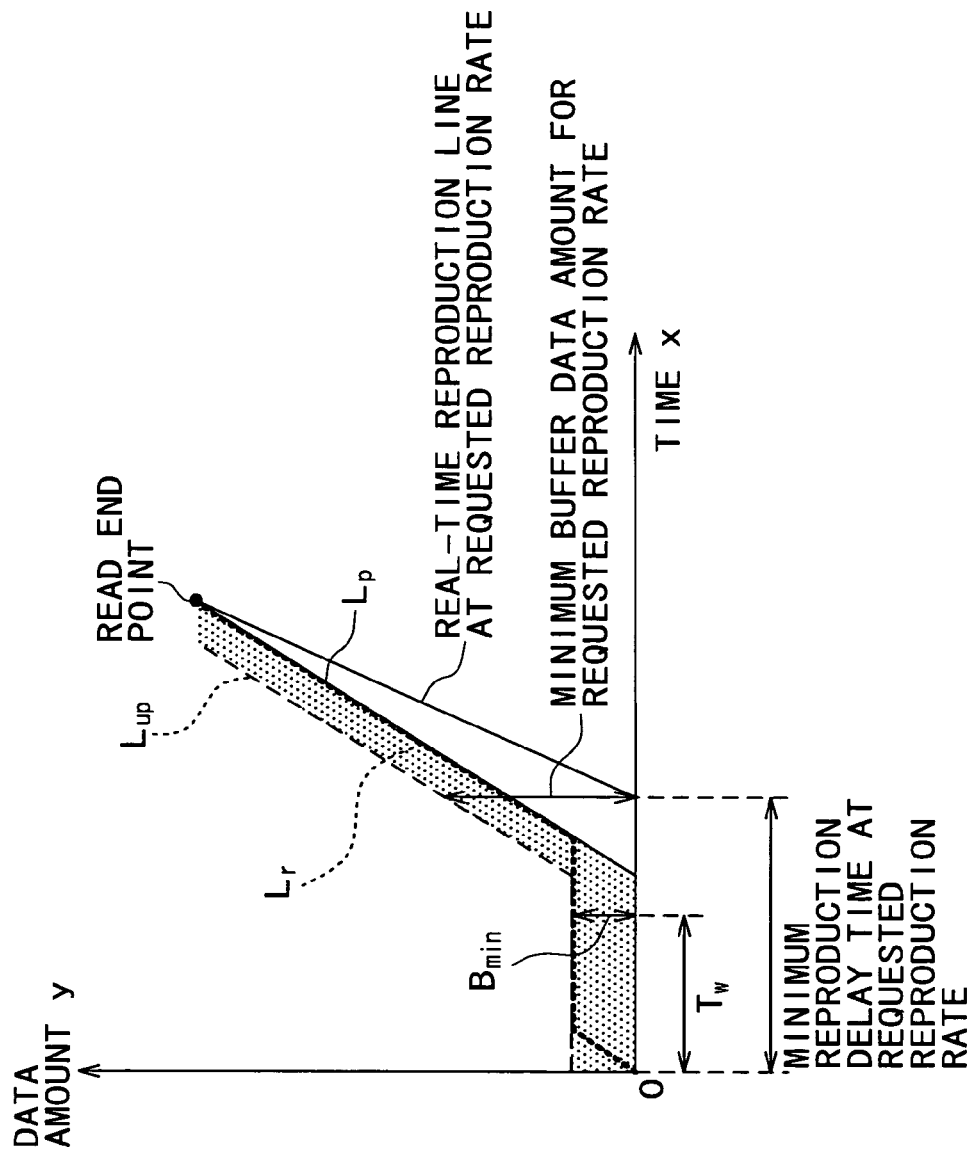
FIG. 17 is a diagram showing another hockey-stick shape used as a line approximation graphic form.

As shown in FIG. 17, a line approximation graphic form found by using a virtual reproduction rate can approximate the media read line $L_r$ with a high degree of precision. Then, on the basis of such a line approximation graphic form, a real-time reproduction line with a gradient equal to a requested reproduction rate is found. Finally, a minimum reproduction delay time and a minimum buffer data amount are found for the requested reproduction rate from the real-time reproduction line as values close to the true values of respectively a minimum reproduction delay time and a minimum buffer data amount, which are actually requested.

FIGS. 16 and 17 are each a diagram showing a hockey-stick-like line approximation graphic form approximating the same media read line $L_r$. The hockey-stick-like line approximation graphic form shown in FIG. 16 is obtained with the reproduction rate for the one-time speed reproduction used as the reference reproduction rate while the hockey-stick-like line approximation graphic form shown in FIG. 17 is obtained with a virtual reproduction rate used as the reference reproduction rate. The figures also each show a minimum reproduction delay time and a minimum buffer data amount, which are found for a requested reproduction rate. As is obvious from FIGS. 16 and 17, the minimum reproduction delay time and minimum buffer data amount found for the requested reproduction rate on the basis of the hockey-stick-like line approximation graphic form shown in FIG. 17 as a graphic form drawn with a virtual reproduction rate used as the reference reproduction rate are smaller than respectively the minimum reproduction delay time and minimum buffer data amount found for the requested reproduction rate on the basis of the hockey-stick-like line approximation graphic form shown in FIG. 16 as a graphic form drawn with the reproduction rate for the one-time speed reproduction used as the reference reproduction rate.

If a hockey-stick-like line approximation graphic form is found with a virtual reproduction rate used as the reference reproduction rate, however, there is raised a problem as to what reproduction rate is to be used as the virtual reproduction rate.

Figure 18:
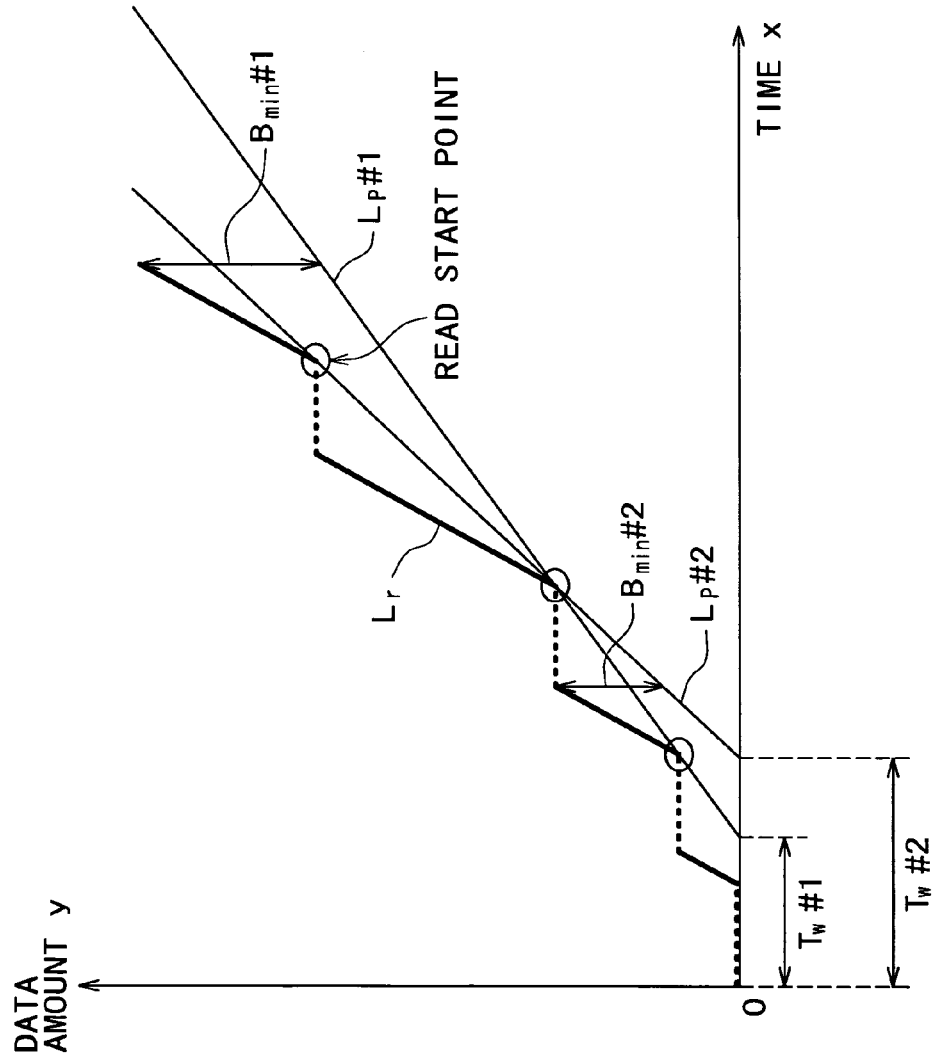
FIG. 18 is an explanatory diagram referred to in describing a method to determine a virtual reproduction line.

The above problem is solved by taking the gradient of a real-time reproduction line providing a smallest minimum buffer data amount $B_{min}$ as shown in FIG. 18 as the virtual reproduction rate.

Let a real-time reproduction line with a gradient equal to a virtual reproduction rate be referred to as a virtual reproduction line. Since a virtual reproduction line can be drawn to come in contact with the media read line $L_r$ from the lower right side at one or more points, there is a huge number of candidates for the virtual reproduction line. One selected among the innumerable candidates as a candidate providing a smallest minimum buffer data amount $B_{min}$ is taken as the virtual reproduction line.

To put it concretely, let candidate $L_p\#1$ for the virtual reproduction line be a candidate having a relatively short x-axis segment and a relatively small gradient while candidate $L_p\#2$ for the virtual reproduction line be a candidate having a relatively long x-axis segment and a relatively large gradient as shown in FIG. 18. In this case, the minimum reproduction delay time $T_w\#1$ of candidate $L_p\#1$ having a relatively short x-axis segment is shorter than candidate $L_p\#2$ having a relatively long x-axis segment.

On the other hand, the minimum buffer data amount $B_{min}$ is the value of a longest distance in the vertical direction between the virtual reproduction line and the media read line $L_r$. Thus, minimum buffer data amount $B_{min}\#1$ of candidate $L_p\#1$ having a relatively short x-axis segment and a relatively small gradient is greater than minimum buffer data amount $B_{min}\#2$ of candidate $L_p\#2$ having a relatively long x-axis segment and a relatively large gradient.

Thus, if the minimum buffer data amount $B_{min}$ is used as a criterion for determining a virtual reproduction line, candidate $L_p\#2$ with a smallest minimum buffer data amount $B_{min}$ is selected as the virtual reproduction line and the gradient of candidate $L_p\#2$ is taken as the virtual reproduction rate. If the minimum reproduction delay time $T_w$ is used as a criterion for determining a virtual reproduction line, on the other hand, candidate $L_p\#1$ with a shortest minimum reproduction delay time $T_w$ is selected as the virtual reproduction line.

If a line approximation graphic form resembling the shape of a hockey stick is to be found by using a virtual reproduction rate as the reference reproduction rate as described above, at the step S2 of the flowchart shown in FIG. 2, the graphic-data-computation unit 13 finds attributes of the virtual reproduction line as graphic data representing the line approximation graphic form resembling the shape of a hockey stick.

Figure 19:
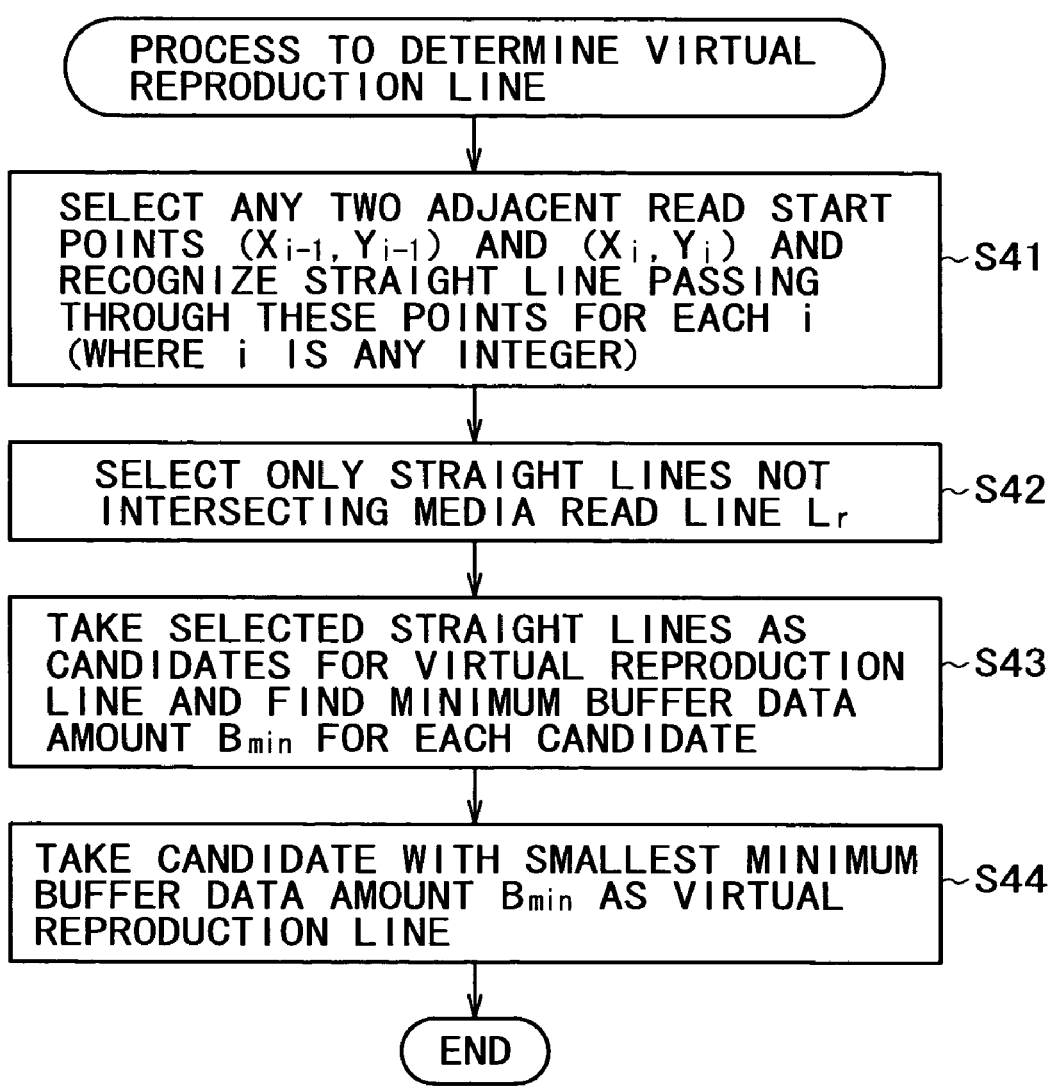
FIG. 19 shows a flowchart representing a process to determine a virtual reproduction line.

By referring to a flowchart shown in FIG. 19, the following description explains a virtual reproduction line determination process for determining a virtual reproduction line.

Figure 20A:
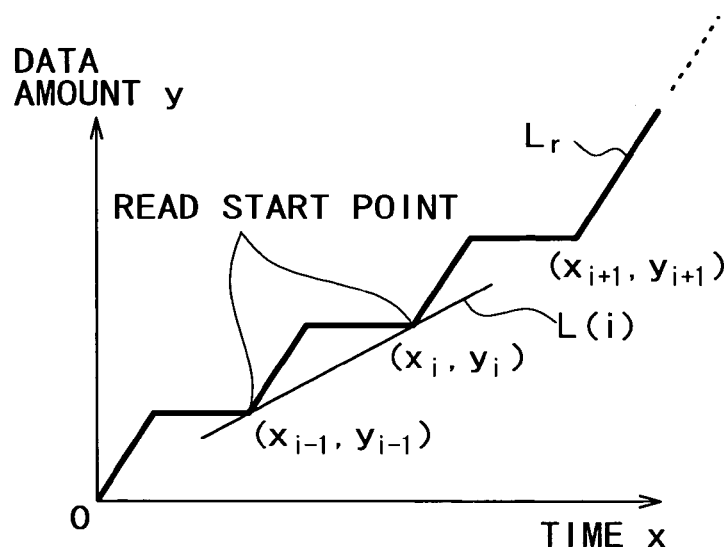
FIGS. 20A and 20B are explanatory diagrams referred to in describing a process to determine a virtual reproduction line.

Let symbol $(X_i, Y_i)$ (where i is an integer) denote coordinates of an ith read start point on the media read line $L_r$. The flowchart begins with a step S41 at which the graphic-data computation unit 13 selects any 2 adjacent read start points $(X_{i-1}, Y_{i-1})$ and $(X_i, Y_i)$ on the media read line $L_r$ and recognizes a straight line L (i) passing through theses 2 read start points $(X_{i-1}, Y_{i-1})$ and $(X_i, Y_i)$ for each i as shown in FIG. 20A. Then, the flow of the process goes on to a step S42.

At the step S42, the graphic-data computation unit 13 selects only straight lines L (i) found at the step S41 as straight lines not intersecting the media read line $L_r$. A straight line L (i) passing through two specific read start points $(X_{i-1}, Y_{i-1})$ and $(X_i, Y_i)$ is expressed by the following equation:

$$y=(Y_i-Y_{i-1})/(X_i-X_{i-1}) \times x+(Y_{i-1}X_i=Y_iX_{i-1})/(X_1-X_{1-1}).$$

Let symbol (X, Y) denote coordinates of any other read start point on the media read line $L_r$. The other read start point is other than the specific read start points $(X_{i-1}, Y_{i-1})$ and $(X_i, Y_i)$ on the media read line $L_r$. The straight line L (i) expressed by the above equation does not intersect the media read line $L_r$ if the coordinates (X, Y) satisfy the following relation:

$$Y \geq (Y_i-Y_{i-1})/(X_i-X_{i-1}) \times X+(Y_{i-1}X_i=Y_iX_{i-1})/(X_1-X_{i-1}).$$

Thus, at the step S42, the graphic-data computation unit 13 selects only straight lines L (i) not intersecting the media read line $L_r$ by verifying that the above relation holds true for any other read start point (X, Y).

Figure 20B:
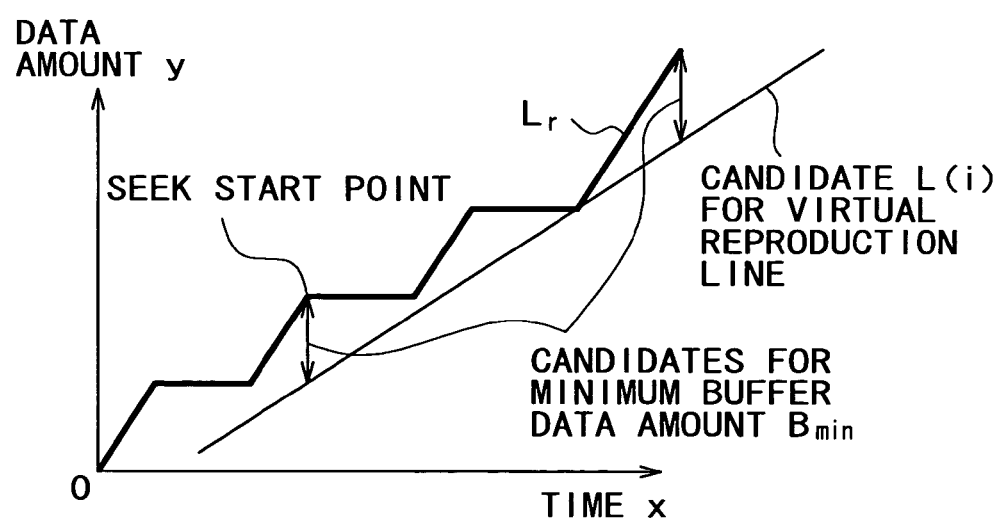

Then, the flow of the process goes on to a step S43 at which the graphic-data computation unit 13 takes the straight lines L (i) selected at the step S42 as candidates for the virtual reproduction line and finds the minimum buffer data amount $B_{min}$ for each of the candidates. To put it in detail, for each of the candidates for the virtual reproduction line, which are each represented by the straight line L (i) expressed by the equation:

$$y=(Y_i-Y_{i-1})/(X_i-X_{i-1}) \times x+(Y_{i-1}X_i=Y_iX_{i-1})/(X_i-X_{1-1}),$$

the graphic-data computation unit 13 finds a distance in the vertical direction from each seek start point on the media read line $L_r$ to the straight line L (i). As shown in FIG. 20B, the found distance is a distance in the vertical direction at the seek start point between the media read line $L_r$ and the straight line L (i) representing a candidate for the virtual reproduction line, and the seek start point is not the read start points $(X_{i-1}, Y_{i-1})$ and $(X_i, Y_i)$ passed through by the straight line L (i). The distances from seek start points to the straight line L (i) representing a candidate for the virtual reproduction line are each taken as a $B_{min}$ candidate for the minimum buffer data amount $B_{min}$, and the longest distance among the $B_{min}$ candidates is selected as the minimum buffer data amount $B_{min}$ for the straight line L (i) representing a candidate for the virtual reproduction line.

After a minimum buffer data amount $B_{min}$ is determined at the step S43 for each straight line L (i) found at the step S42 as a candidate for the virtual reproduction line, the flow of the process goes on to a step S44 at which the graphic-data computation unit 13 selects a candidate with a smallest minimum buffer data amount $B_{min}$ among the candidates determined at the step S43 as candidates for the virtual reproduction line. The graphic-data computation unit 13 then takes the selected candidate with a smallest minimum buffer data amount $B_{min}$ as the virtual reproduction line, ending the execution of the process of determining a virtual reproduction line.

It is to be noted that, in the process of determining a virtual reproduction line, it is possible to find a plurality of candidates for the virtual reproduction line as candidates each having the same smallest minimum buffer data amount. In this case, any one of the candidates can be taken as the virtual reproduction line. Even though the candidates for the virtual reproduction line have the same smallest minimum buffer data amount, they may have different gradients. In this case, it is possible to select a candidate having a gradient closest to a reproduction rate, which may be most likely requested by the user, as the virtual reproduction line. The candidates for the virtual reproduction line may have gradients, which are much different from each other. In this case, typically, all the candidates are taken as the virtual reproduction line. Since a plurality of virtual reproduction lines exists, there are obtained as many line approximation graphic forms each resembling the shape of a hockey stick as the virtual reproduction lines. In this case, if any particular one of the line approximation graphic forms each resembling the shape of a hockey stick provides a minimum buffer data amount not greater than the allowable buffer data amount and a minimum reproduction delay time not longer than the allowable reproduction delay time, the particular line approximation graphic form indicates that AV data can be reproduced in a real-time manner.

In the embodiment described above, a reproduction rate is taken as a virtual reproduction rate at which a real-time reproduction line can be drawn as a virtual reproduction line providing an even smaller minimum buffer data amount $B_{min}$. However, another reproduction rate can also be taken as a virtual reproduction rate. An example of the other reproduction rate is a reproduction rate at which a maximum amount of AV data stored in the buffer 19 is observed equally at points of time located symmetrically with respect to a point of contact of the media read line $L_r$ and the virtual reproduction line on both sides of the point of contact in the course of a real-time reproduction process as described as follows.

A buffer data amount is the amount of AV data stored in the buffer 19 in a reproduction process carried out in a real-time manner. Represented by a distance in the vertical direction between the media read line $L_r$ and the real-time reproduction line $L_p$, the buffer data amount changes from time to time. A maximum buffer data amount is a largest value of the buffer data amount during the real-time reproduction process. For example, a straight line is brought into contact with the media read line $L_r$ at a single point of contact from the lower right side as shown in FIG. 21. This straight line is taken as a candidate for the real-time reproduction line in general or the virtual reproduction line in particular. There may be a plurality of such candidates. As the virtual reproduction line, it is possible to take a candidate providing a maximum buffer data amount on both sides of the point of contact of the candidate for the virtual reproduction line and the media read line $L_r$.

Figure 22:
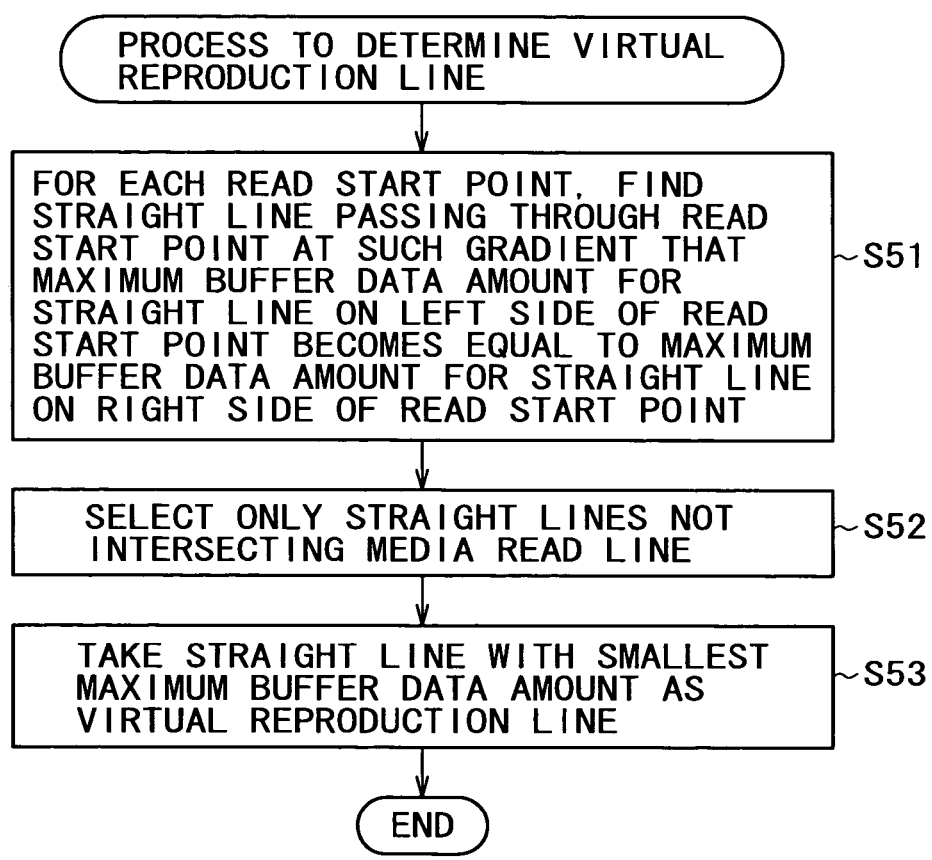
FIG. 22 shows a flowchart representing a process to determine a virtual reproduction line.

By referring to a flowchart shown in FIG. 22, the following description explains a virtual reproduction line determination process of determining a virtual reproduction line by adopting the technique described above.

The flowchart begins with a step S51 at which the graphic-data computation unit 13 determines a straight line passing through a read start point on the media read line $L_r$ at such a gradient that a maximum buffer data amount appears on both sides of the read start point. The graphic-data computation unit 13 finds such a straight line for every read start point on the media read line $L_r$ and takes the straight line as a candidate for the virtual reproduction line. Let symbol $(X_i, Y_i)$ denote the coordinates of a read start point on the media read line $L_r$. In this case, a straight line L (i) passing through the read start point $(X_i, Y_i)$ can be expressed by the following equation:

$$y = Ax + Y_i + AX_i$$

where symbol A denotes the gradient of the straight line L (i). The graphic-data computation unit 13 changes the gradient A of the straight line L (i) little by little in order to find a value of the gradient A setting the straight line L (i) in such an orientation that a maximum buffer data amount of the straight line L (i) appears on both sides of the read start point $(X_i, Y_i)$. The straight line L (i) passing through the read start point $(X_i, Y_i)$ on the media read line $L_r$ at the gradient A with such a value is taken as a candidate for the virtual reproduction line.

It is to be noted that the following typical process can be carried out to determine whether or not a straight line L (i) passing through a read start point $(X_i, Y_i)$ on the media read line $L_r$ provides a maximum buffer data amount on both sides of the read start point $(X_i, Y_i)$. First of all, the seek start points of seek operations on both sides of the read start point $(X_i, Y_i)$ are found. Then, the buffer data amounts at the seek start points are calculated. As described earlier, the buffer data amount at a seek start point is defined as the distance in the vertical direction from the seek start point to the straight line L (i). Subsequently, a maximum buffer data amount is found among the buffer data amounts at the seek start points on the left side of the read start point $(X_i, Y_i)$ and a maximum buffer data amount is found among the buffer data amounts at the seek start points on the right side of the read start point $(X_i, Y_i)$. Finally, if the maximum buffer data amount on the left side is found equal to the maximum buffer data amount on the right side, the straight line L (i) passing through a read start point $(X_i, Y_i)$ on the media read line $L_r$ is determined to be a straight line providing a maximum buffer data amount on both sides of the read start point $(X_i, Y_i)$.

Figure 23:
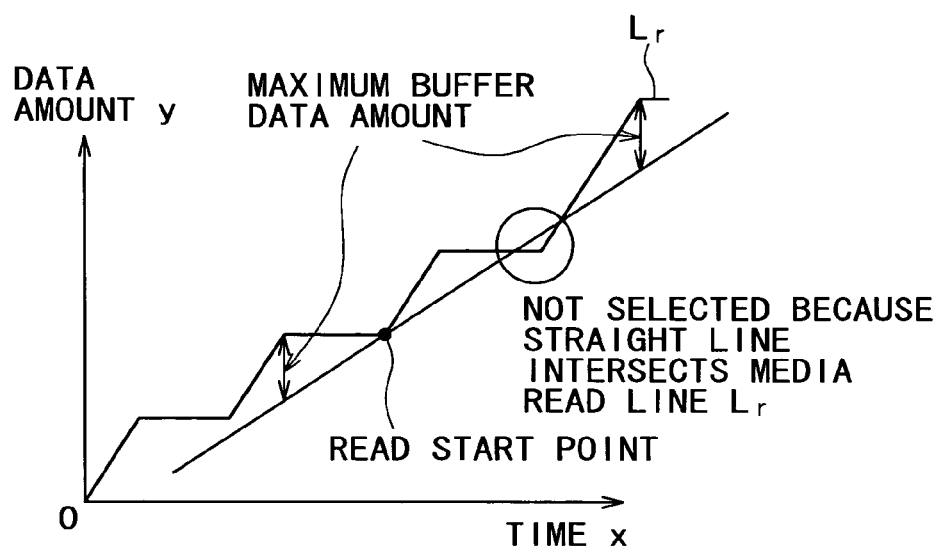
FIG. 23 is an explanatory diagram referred to in describing a method to determine a virtual reproduction line.
Figure 24:
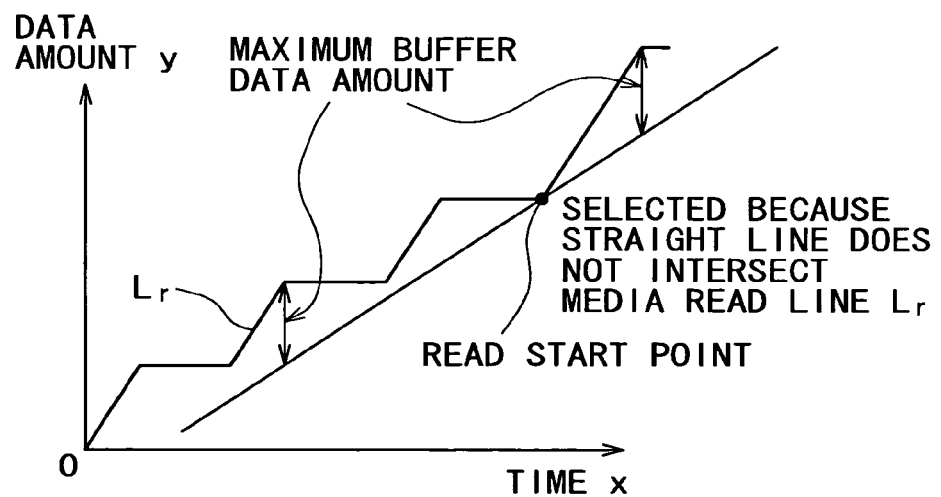
FIG. 24 is an explanatory diagram referred to in describing a method to determine a virtual reproduction line.

Then, at the next step S52, the graphic-data computation unit 13 selects candidates not intersecting the media read line $L_r$ among the candidates determined at the step S51 as candidates for the virtual reproduction line. That is to say, at the step S52, as shown in FIG. 23, the graphic-data computation unit 13 selects candidates not intersecting the media read line $L_r$ by eliminating candidates intersecting the media read line $L_r$ from the candidates determined at the step S51 as candidates for the virtual reproduction line. As a result, only candidates not intersecting the media read line $L_r$ are left as candidates for the virtual reproduction line as shown in FIG. 24.

Then, at the next step S53, the graphic-data computation unit 13 selects a candidate typically having the smallest buffer data amount among the candidates left at the step S52 as candidates for the virtual reproduction line. The selected candidate for the virtual reproduction line is taken as the virtual reproduction line and the execution of the process of determining the virtual reproduction line is ended.

In the process of determining a virtual reproduction line as represented by the flowchart shown in FIG. 19, a candidate having the smallest minimum buffer data amount $B_{min}$ is merely selected among candidates for the virtual reproduction line. In the process of determining a virtual reproduction line as represented by the flowchart shown in FIG. 22, on the other hand, candidates each passing through a read start point $(X_i, Y_i)$ at a gradient giving a maximum buffer data amount on both sides of the read start point $(X_i, Y_i)$ are first determined as candidates for the virtual reproduction line and a candidate having the smallest maximum buffer data amount is then selected among the determined candidates as the virtual reproduction line having the minimum buffer data amount $B_{min}$ equal to the maximum buffer data amount given by the selected candidate. As a result, the minimum buffer data amount $B_{min}$ and the minimum reproduction delay time $T_w$ can be further reduced to a certain degree.

If a candidate having the smallest minimum buffer data amount $B_{min}$ is merely selected as a virtual reproduction line among candidates for the virtual reproduction line, the minimum buffer data amount $B_{min}$ decreases but, in general, the minimum reproduction delay time $T_w$ increases. If candidates each passing through a read start point $(X_i, Y_i)$ at a gradient giving a maximum buffer data amount on both sides of the read start point $(X_i, Y_i)$ are first determined as candidates for the virtual reproduction line and a candidate having the smallest maximum buffer data amount is then selected among the determined candidates as the virtual reproduction line having the minimum buffer data amount $B_{min}$ equal to the maximum buffer data amount given by the selected candidate, on the other hand, the minimum buffer data amount $B_{min}$ and the minimum reproduction delay time $T_w$ can both be reduced to a certain degree.

Figure 25:
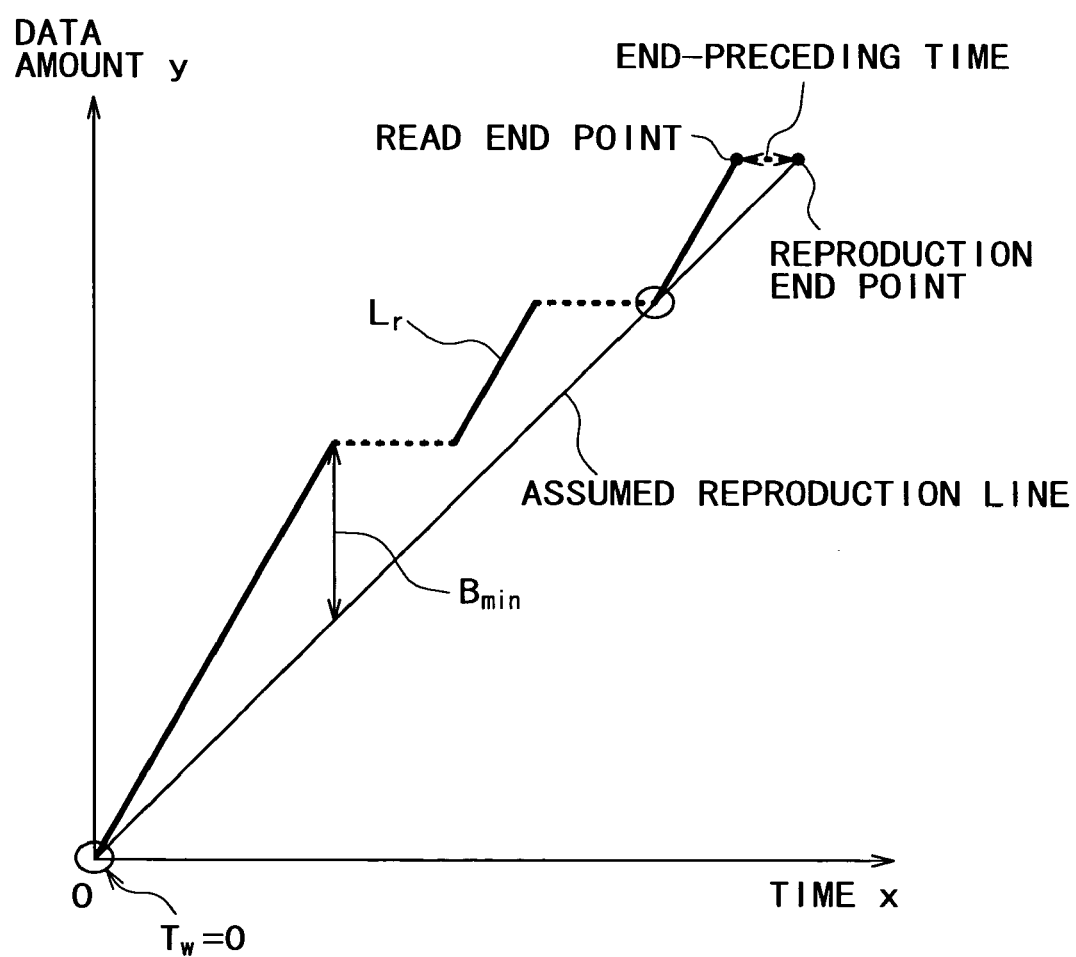
FIG. 25 is an explanatory diagram referred to in describing a method to determine a virtual reproduction line.

It is to be noted that, in accordance with another typical process of determining a virtual reproduction line, a straight line connecting the first read start point on a media read line $L_r$ with the last read start point on the media read line $L_r$ as shown in FIG. 25 is selected as the virtual reproduction line provided that the straight line does not intersect the media read line $L_r$. In this case, the minimum reproduction delay time $T_w$ is 0.

Figure 26:
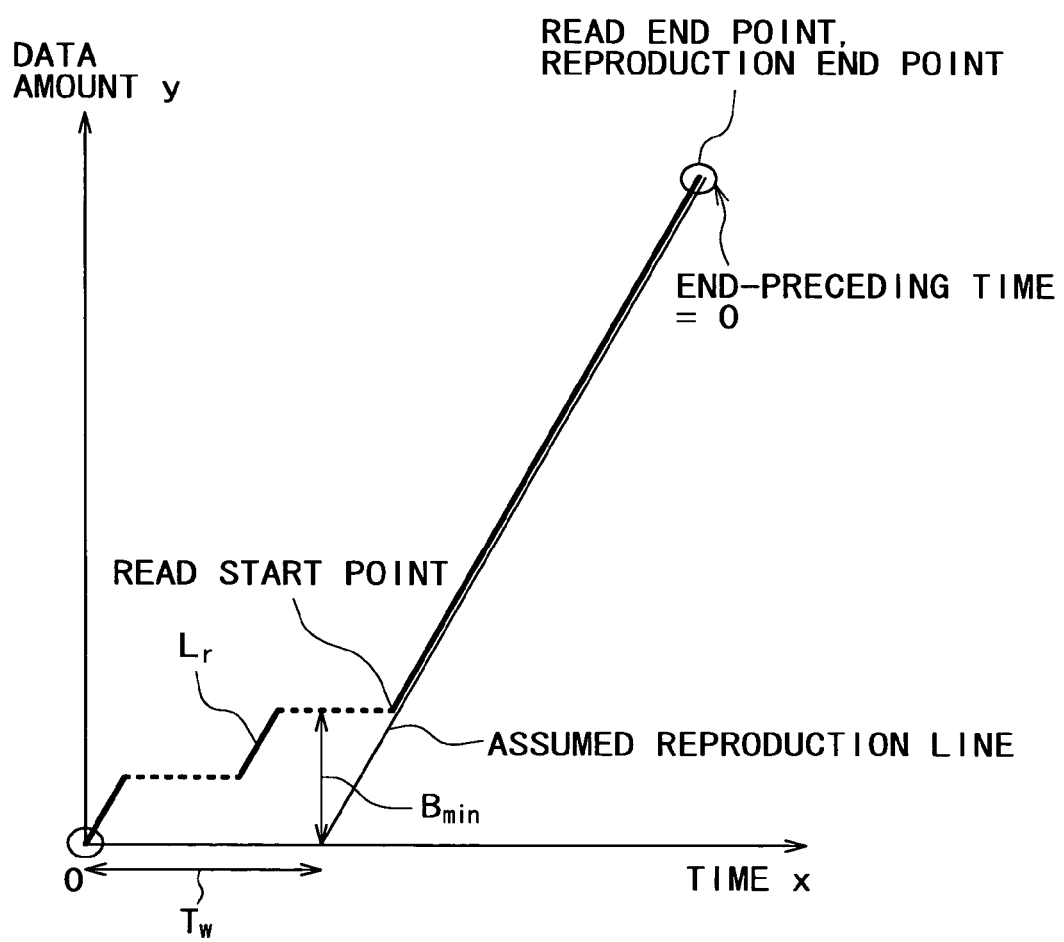
FIG. 26 is an explanatory diagram referred to in describing a method to determine a virtual reproduction line.

An end-preceding time shown in FIG. 25 is defined as a distance in the horizontal direction between the last read end point on the media read line $L_r$ and a reproduction end point on the virtual reproduction line. Thus, the end-preceding time is a period of time between the read end point and the reproduction end time. The last read end point is also the upper edge of the media read line $L_r$. The reproduction end point has a y coordinate representing the amount of data at the read end point. A real-time reproduction line having a 0 end-preceding time can be taken as the virtual reproduction line. In this case, the virtual reproduction line is a straight line connecting the last read start point on the media read line $L_r$ to the last read end point on the media read line $L_r$ as shown in FIG. 26 and the virtual reproduction rate is equal to the read rate $R_r$. If a real-time reproduction line having a 0 end-preceding time is taken as the virtual reproduction line, the minimum buffer data amount $B_{min}$ may have a relatively large value. However, the minimum reproduction delay time $T_w$ very precisely approximates the true value of a minimum reproduction delay time required for a reproduction process carried out at a typical reproduction rate close to the read rate $R_r$. The end-preceding time cited above is thus a period of time between the end of an operation to read out AV data from the optical disc 31 and the end of an operation to reproduce the AV data.

It is to be noted that, in general, an AV data series is recorded in a contiguous area on the optical disc 31 and, if no seek operation occurs during an operation to read out the AV data from the optical disc 31, the media read line $L_r$ is represented by a straight line passing through the origin. In addition, in this case, a virtual reproduction line determined by adopting either of the methods described above will coincide with the media read line $L_r$.

In the embodiments described above, the media read line $L_r$ itself is approximated in the so-called direct manner by a line approximation graphic form resembling the shape of a hockey stick. However, the media read line $L_r$ can also be approximated in the so-called indirect manner. In this case, the media read line $L_r$ is divided into several components, which are each approximated by a graphic form.

To put it in detail, a media read line $L_r$ can be found from media access information, a read rate $R_r$ and a seek time function for computing a seek time as described above. Thus, for example, a disc drive may be invented in the future as a disc drive having a high read rate, or the disc drive 2 may employ a plurality of pickups for reading out AV data from the optical disc 31 at a substantially high read rate. Taking the use of such a disc drive and other factors into consideration, it is desirable to classify components of a media read line $L_r$ into a component concerning the media access information, a component concerning the read rate, and a component concerning the seek time and to treat the component concerning the media access information, and to concern the components independently each other.

Now, consider division of a media read line $L_r$ into a component concerning the media access information, a component concerning the read rate, and a component concerning the seek time.

The components of a media read line $L_r$ include the component concerning the read rate represented by a straight line passing through the origin at a gradient equal to the read rate $R_r$. Thus, the component concerning the read rate can be separated from the media read line $L_r$ with ease.

If an attempt is made to separate the component concerning the media access information and the component concerning the seek time from the media read line $L_r$ into mutually independent components, however, the amount of information resulting from the separation increases. In order to solve this problem, the concept of a synthesis component is introduced. The synthesis component includes a component concerning the media access information and a component concerning the seek time, which are left as a result of separating a component concerning the read rate from the media read line $L_r$. To put it concretely, the synthesis component is a line expressing the change in seek time with the lapse of time and the change in cumulative amount of data with the lapse of time. In this case, the seek time is the time it takes to carry out a seek operation in the course of an operation to read out data from the optical disc 31 whereas the amount of data is the amount of data read out from the optical disc 31 at a read rate set at the infinity.

Thus, as shown in FIG. 27, the media read line $L_r$ is handled by separating the media read line $L_r$ into a line $L_{ns}$, representing the component concerning the read rate $R_r$ and a line $L_s$ representing the synthesis component, which comprises the component concerning the media access information and the component concerning the seek time.

As described earlier, the line $L_{ns}$ representing the component concerning the read rate $R_r$ is a straight line passing through the origin at a gradient equal to the read rate $R_r$. This straight line $L_{ns}$ represents the change with the lapse of time in cumulative amount of data, which is read out from the optical disc 31 on the assumption that no seek operation occurs in the read operation. For the sake of convenience, the straight line $L_{ns}$ representing the component concerning the read rate $R_r$ is referred to hereafter simply as a no-seek read line $L_{ns}$. On the other hand, the line $L_s$ representing the synthesis component, which comprises the component concerning the media access information and the component concerning the seek time, is referred to hereafter simply as a media seek line $L_s$ for the sake of convenience.

By adopting the concept of a media read line $L_r$ comprising a no-seek read line $L_{ns}$ and a media seek line $L_s$, a media read line $L_r$ can be found as a result of adding a no-seek read line $L_{ns}$ to a media seek line $L_s$ in the so-called time direction or the x-axis direction.

The no-seek read line $L_{ns}$ is dependent only on the read rate $R_r$ of the disc drive 2 for driving the optical disc 31. Strictly speaking, the no-seek read line $L_{ns}$ is further dependent on the specifications of the disc drive 2. The specifications include the number of pickups employed in the disc drive 2. It is thus unnecessary to provide a no-seek read line $L_{ns}$ for each file for storing AV data to be reproduced. In addition, since the no-seek read line $L_{ns}$ is a straight line passing through the origin at a gradient equal to the read rate $R_r$ as described earlier, the no-seek read line $L_{ns}$ can be drawn if the read rate $R_r$ is known. Thus, the no-seek read line $L_{ns}$ can be determined by using only the read rate $R_r$ without approximation by a graphic form.

On the other hand, the media seek line $L_s$ is a line representing the synthesis component, which comprises the component concerning the media access information and the component concerning the seek time as described above. Thus, the media seek line $L_s$ is dependent on not only the specifications of the disc drive 2, but also the position of the pickup on the optical disc 31 and other parameters. During a seek operation, the gradient of the media seek line $L_s$ is 0 but, while data is being read out from the optical disc 31, the gradient thereof is infinite. Thus, in order to define the media seek line $L_s$, a lot of information is required. The information includes a start time of each seek operation, the time it takes to carry out each seek operation and the amount of data read out from the optical disc 31 at each time the data is read out from the optical disc 31. In order to solve this problem, there is conceived a technique whereby the media seek line $L_s$ is approximated by using a graphic form definable by a small amount of information in the same way a media read line $L_r$ is approximated by a graphic form represented by graphic data.

In order to approximate a media seek line $L_s$ by a graphic form, first of all, it is necessary to determine a virtual reproduction rate to be used as a reference reproduction rate. As shown in FIG. 28, an average reproduction line is a straight line connecting the start point of a media seek line $L_s$ to the end point thereof. The gradient of the average reproduction line is taken as the virtual reproduction rate. A virtual reproduction line is a real-time reproduction line having a gradient equal to the virtual reproduction rate. As shown in the figure, the virtual reproduction line is a straight line brought into contact with the media seek line $L_s$ from the lower right side at a gradient equal to the virtual reproduction rate. Let a buffer upper-limit line having a gradient equal to the virtual reproduction rate be referred to as a virtual buffer upper-limit line. The virtual buffer upper-limit line is thus a straight line brought into contact with the media seek line $L_s$ from the upper left side at a gradient equal to the virtual reproduction rate. It is to be noted that the virtual buffer upper-limit line and the virtual reproduction line coincide with lines obtained by shifting the average reproduction line in parallel in the left and right directions respectively.

The media seek line $L_s$ is enclosed in a parallelogram formed by four sides, i. e., the virtual buffer upper-limit line, the virtual reproduction line, the x axis and a straight line passing through the end point of the media seek line $L_s$ in parallel to the x axis. In other words, this parallelogram approximates the media seek line $L_s$ and is, hence, referred to hereafter as a seek-line approximation parallelogram for the sake of convenience.

The length of the lower base of the seek-line approximation parallelogram is referred to hereafter as a base time, and the horizontal distance from the origin to the right lower apex of the seek-line approximation parallelogram is referred to hereafter as a reference delay time. Thus, the seek-line approximation parallelogram approximating a media seek line $L_s$ can be represented by a small amount of information, which includes typically the virtual reproduction rate, the base time, the reference delay time and the end point of the media seek line $L_s$. In this case, the end point of the media seek line $L_s$ can be represented by either the x or y coordinate of the end point. It is to be noted that information representing a seek-line approximation parallelogram approximating a media seek line $L_s$ is not limited to the virtual reproduction rate, the base time, the reference delay time and the end point of the media seek line $L_s$. As an alternative, for example, information representing a seek-line approximation parallelogram approximating a media seek line $L_s$ can be the four apexes of a parallelogram enclosing the media seek line $L_s$.

By the way, a media read line $L_r$ can be found as a result of adding a no-seek read line $L_{ns}$ to a media seek line $L_s$ in the so-called time direction as described above. On the other hand, the media seek line $L_s$ is enclosed in a seek-line approximation parallelogram. Thus, by adding the no-seek read line $L_{ns}$ to the seek-line approximation parallelogram in the so-called time direction, it is possible to obtain a graphic form, which approximates the media read line $L_r$ by enclosing the media read line $L_r$ as shown in FIG. 29. This graphic form is referred to as the so-called line approximation graphic form.

The line approximation graphic form obtained as a result of adding the no-seek read line $L_{ns}$ to the seek-line approximation parallelogram in the time direction has the same lower base as the seek-line approximation parallelogram but has an upper base (an upper side) obtained as a result of shifting the upper base of the seek-line approximation parallelogram by a substantial read time in the time direction. The line approximation graphic form is drawn in FIG. 29 as a shadow parallelogram on the right side of the diagram. It is to be noted that the substantial read time is defined as the horizontal distance between the origin and the end point of the no-seek read line $L_{ns}$. Typically, the substantial read time is obtained as a quotient resulting from division of the amount of AV data stored in a file serving as an object of reproduction by the read rate $R_r$.

In this case, the reference delay time of the resulting line approximation graphic form is taken as the (reference) minimum reproduction delay time $T_w$ and the vertical-direction height of the line approximation graphic form at the end of the minimum reproduction delay time $T_w$ is taken as the (reference) minimum buffer data amount $B_{min}$.

It is to be noted that the parallelogram representing the line approximation graphic form obtained as a result of adding the no-seek read line $L_{ns}$ to the seek-line approximation parallelogram in the time direction prescribes a real-time reproduction line, a buffer-upper line and a virtual reproduction rate in the same way as a line approximation graphic form resembling the shape of a hockey stick prescribes a real-time reproduction line, a buffer-upper line and a virtual reproduction rate. To be more specific, the right and left sides of the parallelogram representing the line approximation graphic form represent a real-time reproduction line (or a virtual reproduction line) and a buffer-upper line respectively. The real-time reproduction line and the buffer-upper line have the same gradient representing the virtual reproduction rate. The real-time reproduction line, the buffer-upper line, and the virtual reproduction rate, which prescribe the parallelogram representing the line approximation graphic form, are shown in FIG. 29 as a post-synthesis virtual reproduction line, a post-synthesis buffer-upper line and a post-synthesis virtual reproduction rate respectively.

In the embodiment described above, a parallelogram is used as a graphic form approximating the media seek line $L_s$. However, the graphic form approximating the media seek line $L_s$ is not necessarily a parallelogram. For example, the graphic form approximating the media seek line $L_s$ can be the graphic form resembling the shape of a hockey stick as described above. If a parallelogram is used as a graphic form approximating the media seek line $L_s$, however, the resulting line approximation graphic form approximating the media read line $L_r$ is also a parallelogram obtained as a result of shifting the upper base of the parallelogram approximating the media seek line $L_s$ in the time direction as described above. Thus, the minimum buffer data amount prescribed by the resulting line approximation graphic form approximating the media read line $L_r$ is smaller than the minimum buffer data amount prescribed by the parallelogram approximating the media seek line $L_s$. If a graphic form resembling the shape of a hockey stick is used as a graphic form approximating the media seek line $L_s$, on the other hand, the minimum buffer data amount prescribed by the resulting line approximation graphic form approximating the media read line $L_r$ is basically equal to the minimum buffer data amount prescribed by the graphic form resembling the shape of a hockey stick approximating the media seek line $L_s$.

Figure 30:
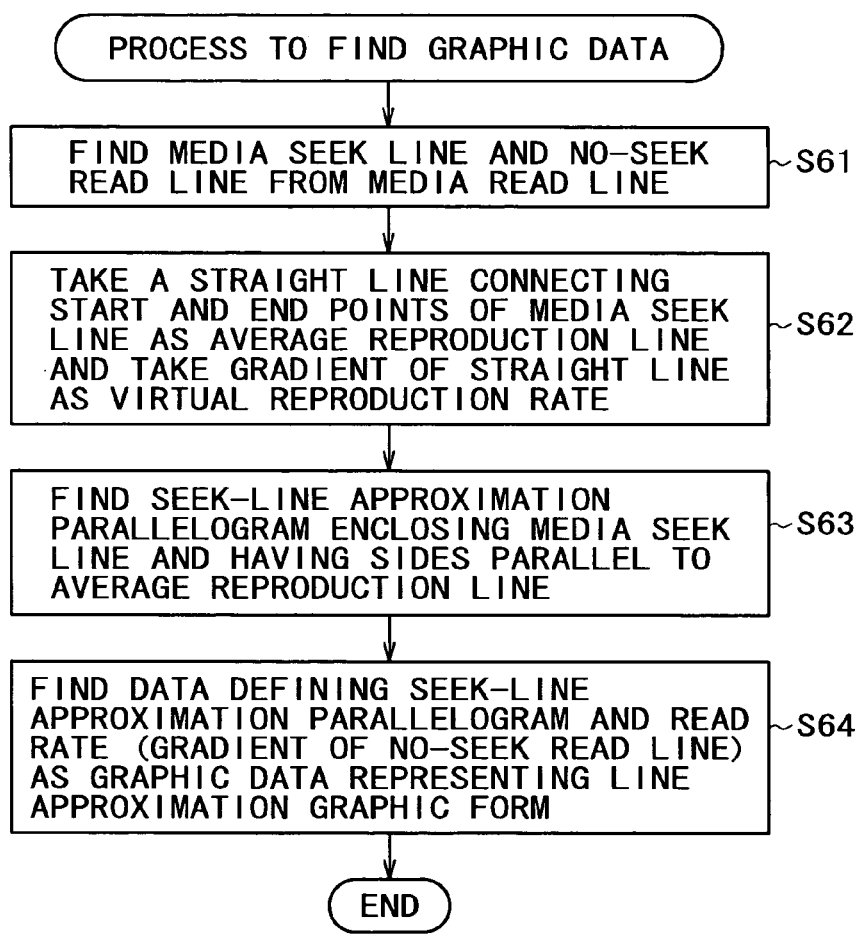
FIG. 30 shows a flowchart representing a process to find graphic data for a case in which a media read line is split into a no-seek read line and a media seek line.

By referring to a flowchart shown in FIG. 30, the following description explains details of the processing carried out at the step S2 of the flowchart shown in FIG. 2 to find graphic data representing a line approximation graphic form approximating a media read line $L_r$, wherein the line approximation graphic form is found by adding a no-seek read line $L_{ns}$ to a parallelogram approximating a media seek line $L_s$ in the time direction as described above.

The flowchart shown in FIG. 30 begins with a step S61 at which the graphic-data computation unit 13 finds a media seek line $L_s$ and a no-seek read line $L_{ns}$ from a media read line $L_r$. A media seek line $L_s$ and a no-seek read line $L_{ns}$ can be found from the media read line $L_r$ shown in the left diagram of FIG. 31 for example by adoption of a technique described by referring to the same figure as follows.

Figure 31:
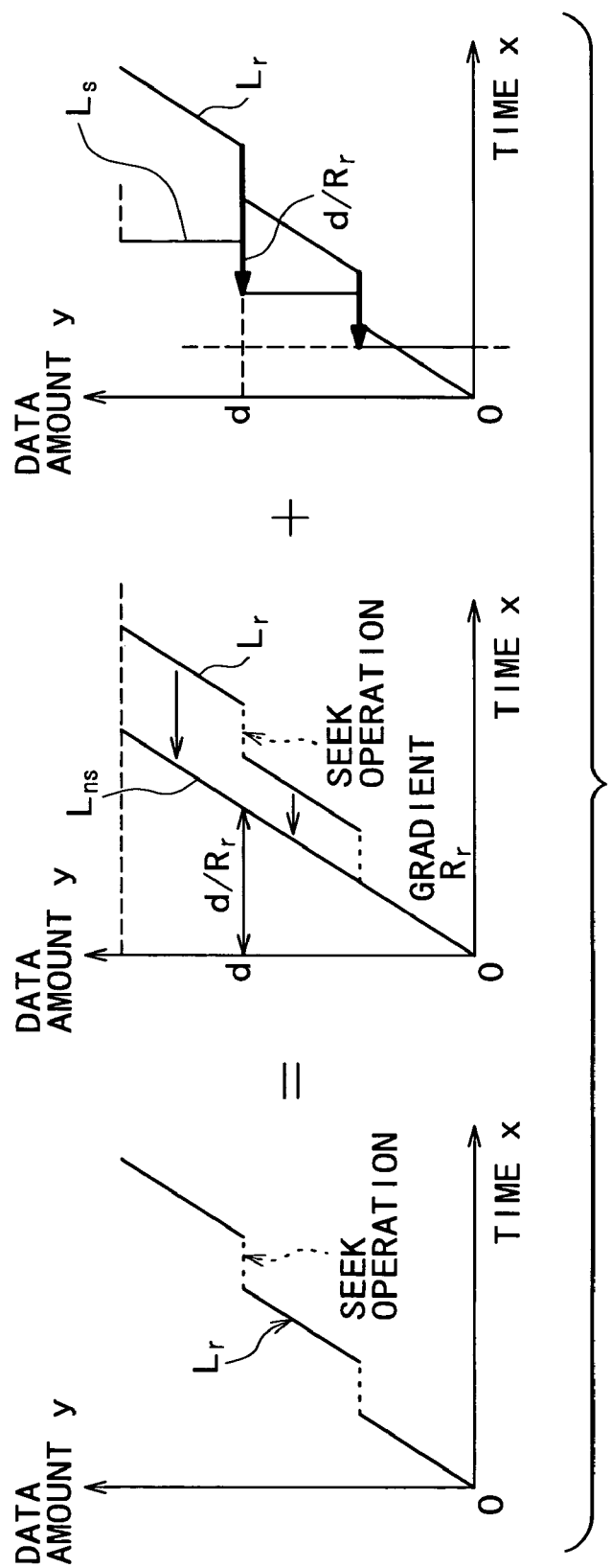
FIG. 31 is a diagram showing a method of splitting a media read line into a no-seek read line and a media seek line.

First of all, the no-seek read line $L_{ns}$ can be found as a straight line passing through the origin at a gradient equal to the reproduction rate $R_r$ as shown in the middle diagram of FIG. 31. On the other hand, the media seek line $L_s$ is obtained as a result of shifting each point on the media read line $L_r$ in the left direction opposite to the lapsing direction of time by a distance of $d/R_r$ as shown in the right diagram of FIG. 31, where symbol d denotes the cumulative amount of data read out from the optical disc 31 at a point of time corresponding to the point on the media read line $L_r$ and symbol $R_r$ denotes the read rate. Thus, the distance of $d/R_r$ represents the time it would take to read out data of the amount of d from the optical disc 31, should the data been read out from the optical disc 31 in accordance with the no-seek read line $L_{ns}$.

Referred back to the flowchart shown in FIG. 30. After the graphic-data computation unit 13 finds the media seek line $L_s$ and the no-seek read line $L_{ns}$ from the media read line $L_r$ at the step S61, the flow of the process goes on to a step S62. At this step, the graphic-data computation unit 13 finds an average reproduction line, which is a straight line connecting the start point of the media seek line $L_s$ to the end point thereof and takes the gradient of the average reproduction line as the virtual reproduction rate to be used as the reference reproduction rate.

Then, at the next step S63, the graphic-data computation unit 13 finds a seek-line approximation parallelogram having sides parallel to the average reproduction line. The seek-line approximation parallelogram is a parallelogram enclosing the media seek line $L_s$. To put it in detail, first of all, the graphic-data computation unit 13 finds a virtual reproduction line as a straight line brought into contact with the media seek line $L_s$ from the lower right side at a gradient equal to the virtual reproduction rate. The graphic-data computation unit 13 then finds a virtual buffer upper-limit line as a straight line brought into contact with the media seek line $L_s$ from the upper left side at a gradient equal to the virtual reproduction rate. Finally, the graphic-data computation unit 13 finds the seek-line approximation parallelogram as a parallelogram formed by four sides, i. e., the virtual buffer upper-limit line, the virtual reproduction line, the x axis and a straight line passing through the end point of the media seek line $L_s$ in parallel to the x axis.

Then, at the next step S64, the graphic-data computation unit 13 finds information representing the seek-line approximation parallelogram, using the information and the read rate $R_r$ represented by the gradient of the no-seek read line $L_{ns}$ as graphic data representing a line approximation graphic form approximating the media read line $L_r$. The information representing the seek-line approximation parallelogram includes typically the virtual reproduction rate, the base time, the reference delay time and the end point of the media seek line $L_s$. In this case, the end point of the media seek line $L_s$ can be represented by either the x or y coordinate of the end point. Finally, the execution of the processing to find a line approximation graphic form approximating a media read line $L_r$ is ended.

If the information representing the seek-line approximation parallelogram and the read rate $R_r$ represented by the gradient of the no-seek read line $L_{ns}$ are used as a substitute for graphic data representing a line approximation graphic form approximating the media read line $L_r$ as described above, then, at the step S14 of the flowchart shown in FIG. 3, it is necessary to find the line approximation graphic form from the seek-line approximation parallelogram and the read rate $R_r$.

Figure 32:
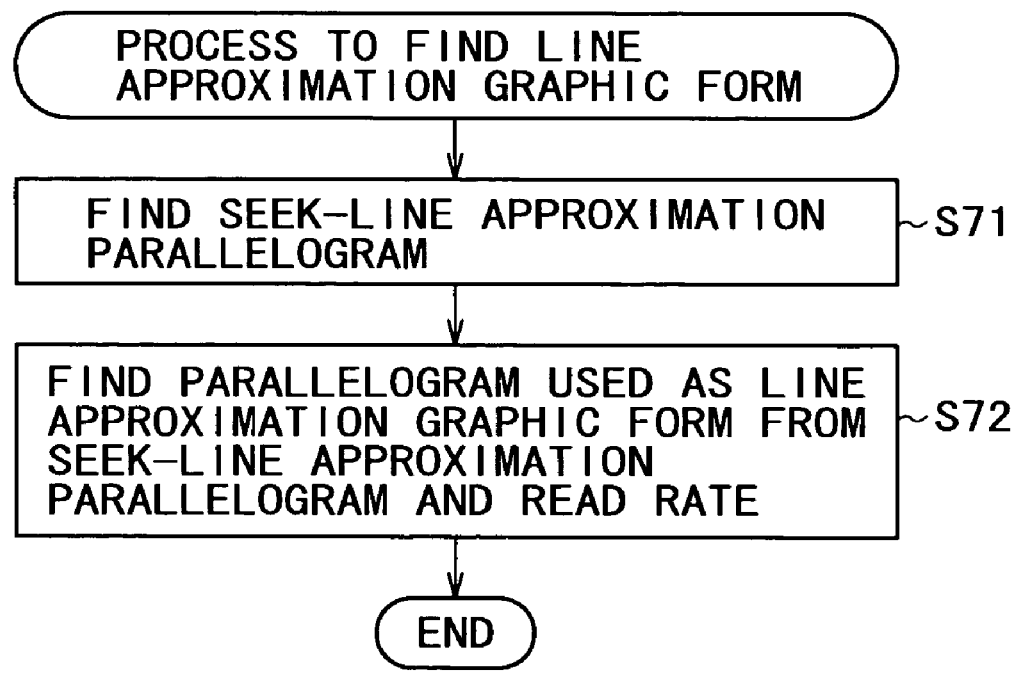
FIG. 32 shows a flowchart representing a process to find a line approximation graphic form from both a no-seek read line and a seek-line approximation parallelogram.

By referring to a flowchart shown in FIG. 32, the following description explains a method of finding a line approximation graphic form approximating the media read line $L_r$ for a case in which the line approximation graphic form is represented by graphic data comprising information representing the seek-line approximation parallelogram and the read rate $R_r$.

The flowchart begins with a step S71 at which the real-time reproducibility determination unit 15 finds a seek-line approximation parallelogram from the information representing the seek-line approximation parallelogram. Then, the method flow goes on to a step S72. At the step S72, the real-time reproducibility determination unit 15 finds a line approximation graphic form from the seek-line approximation parallelogram and the read rate $R_r$. To put it in detail, the real-time reproducibility determination unit 15 finds the line approximation graphic form as a parallelogram having the same lower base as the seek-line approximation parallelogram but an upper base (an upper side) obtained as a result of shifting the upper base of the seek-line approximation parallelogram by a substantial read time in the time direction as shown in FIG. 29. Finally, the execution of the method to find a line approximation graphic form approximating the media read line $L_r$ is ended.

Figure 33:
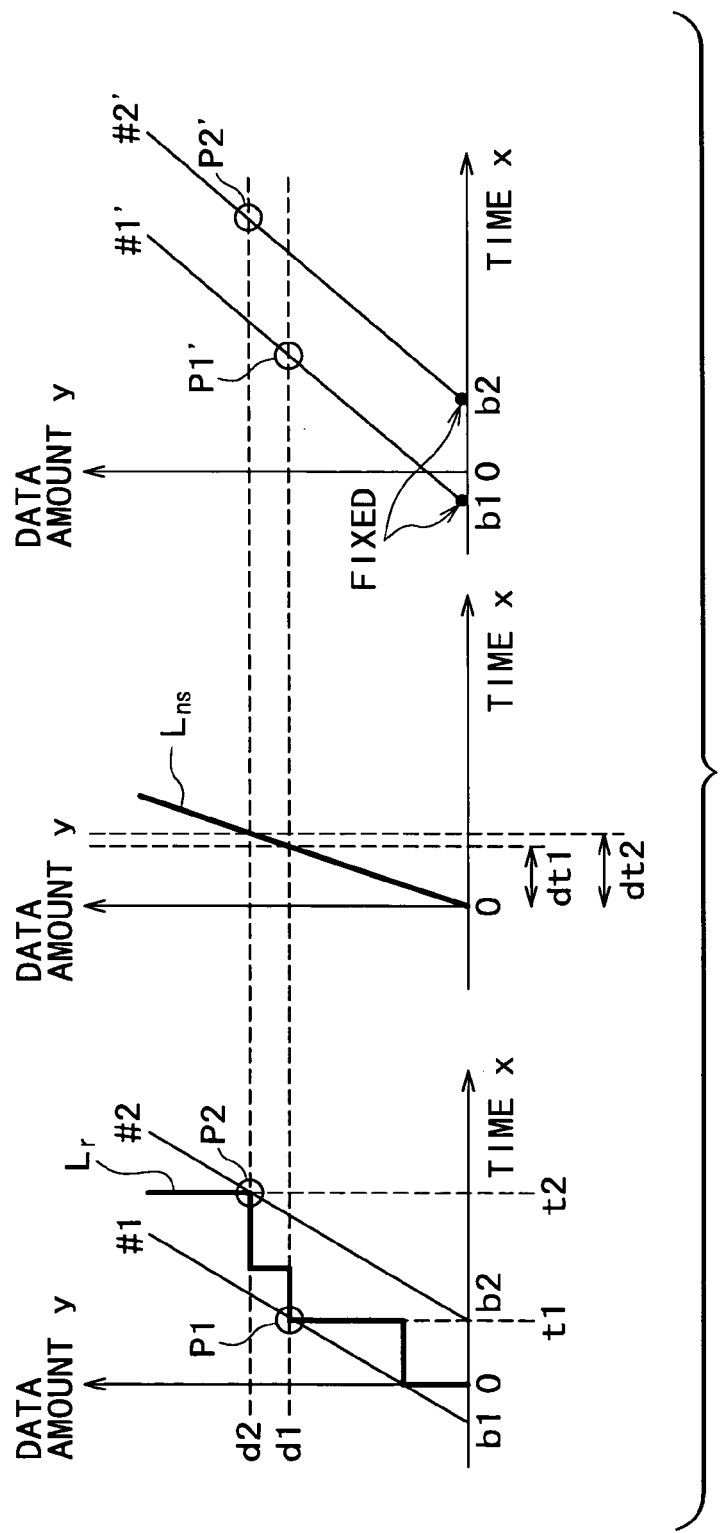
FIG. 33 is an explanatory diagram referred to in describing a method to find a line approximation graphic form from both a no-seek read line and a media seek line.

As an alternative, a line approximation graphic form can also be determined from another kind of graphic data by adopting another typical technique shown in FIG. 33.

Consider straight line #1 brought into contact with a media seek line $L_s$ from the upper left side at a gradient equal to the gradient of the average reproduction line and straight line #2 brought into contact with the media seek line $L_s$ from the lower right side at the same gradient. The coordinates of any point P1 on straight line #1 are expressed by (t1, d1) whereas the coordinates of any point P2 on straight line #2 are expressed by (t2, d2). Straight lines #1 and #2 intersect the x axis at points (b1, 0) and (b2, 0) respectively. It is to be noted that, as shown in FIG. 33, the point P1 (t1, d1) is a point on straight line #1 as well as a seek start point on the media seek line $L_s$. On the other hand, the point P2 (t2, d2) is a point on straight line #2 as well as a seek end point on the media seek line $L_s$.

Straight line #1 is expressed by the following equation:

$$y = -d1 \times (b1-t1) \times x + d1/(b1-t1)$$

On the other hand, straight line #2 is expressed by the following equation:

$$y = -d2 \times (b2-t2) \times x + d2/(b2-t2)$$

Let symbol dt1 denote the x coordinate of a point existing on the no-seek read line $L_{ns}$ as a point having a y coordinate of d1. By the same token, let symbol dt2 denote the x coordinate of a point existing on the no-seek read line $L_{ns}$ as a point having a y coordinate of d2.

The point P1 is shifted to the right in the lapsing direction of time in parallel to the x axis to the position of a point P1' by the distance dt1. By the same token, the point P2 is shifted to the right in the lapsing direction of time in parallel to the x axis to the position of a point P2' by the distance dt2. Straight line #1' connecting the point P1' to the point of intersection (b1, 0) of straight line #1 and the x axis is expressed by the following equation:

$$y = -d1 \times (b1-t1-dt1) \times x + d1/(b1-t1-dt1)$$

On the other hand, straight line #2' connecting the point P2' to the point of intersection (b2, 0) of straight line #2 and the x axis is expressed by the following equation:

$$y = -d2 \times (b2-t2-dt2) \times x + d2/(b2-t2-dt2)$$

The line approximation graphic form can be found as a parallelogram formed by four sides, i. e., straight line #1', straight line #2', the x axis and a straight line passing through the end point of the no-seek read line $L_{ns}$ in parallel to the x axis.

In this case, as graphic data representing the line approximation graphic form, it is possible to take the point P1, the point P2, the x coordinate of a point of intersection of the x axis and straight line #1 (or straight line #1'), the x coordinate of a point of intersection of the x axis and straight line #2 (or straight line #2'), at least the x or y coordinate of the end point of the no-seek read line $L_{ns}$, and the gradient of the no-seek read line $L_{ns}$ (or read rate $R_r$).

As described above, a minimum buffer data amount and a minimum reproduction delay time, which are required for reproducing AV data in a real-time manner at a requested reproduction rate, are found on the basis of a line approximation graphic data approximating a media read line. Thus, the minimum buffer data amount and the minimum reproduction delay time, which are required for reproducing AV data in a real-time manner at a requested reproduction rate, can be found with ease. In addition, the minimum buffer data amount and the minimum reproduction delay time are then used as a basis for determining whether or not the AV data can be reproduced in a real-time manner at a requested reproduction rate. As a result, it is possible to easily determine whether or not the AV data can be reproduced in a real-time manner at a requested reproduction rate.

The sequence of operations described above can be carried out in the recording/reproduction control unit 1 by using hardware or software. If the sequence of operations is carried out by using software, programs composing the software are installed in a general-purpose computer or the like.

FIG. 34 is a diagram showing a typical configuration of an embodiment implementing a computer for executing programs installed therein in order to carry out the sequence of operations described above.

Instead of installing the programs into the computer, the programs can be stored in advance in a recording medium embedded in the computer. Examples of the recording medium are a hard disc 105 and a ROM 103, which are both embedded in the computer.

As an alternative, the programs can also be temporarily or permanently stored (recorded) in a removable recording medium 111. Examples of the removable recording medium 111 are a flexible disk, a CD-ROM (Compact Disc Read Only Memory) disc, an MO (Magneto Optical) disc, a DVD (Digital Versatile Disc), a magnetic disc and a semiconductor memory. Programs stored in a removable recording medium 111 are then presented to the user as the so-called package software to be installed in the computer.

It is to be noted that, instead of installing programs into a computer from a removable recording medium 111 described above, the programs can also be transmitted from a download site to the computer through radio communication by way of an artificial satellite used for digital satellite broadcasting or through wired communication by way of a network such as a LAN (Local Area Network) or the Internet. A communication unit 108 employed in the computer receives a program transmitted to the computer as described above and is capable of installing the program into the hard disc 105.

The computer has a CPU (Central Processing Unit) 102 embedded therein. The CPU 102 is connected to an input/output interface 110 by a bus 101. The user enters a command by operating an input unit 107 typically comprising a keyboard, a mouse and a mike. The CPU 102 receives the command coming from the input unit 107 by way of the input/output interface 110, executing a program stored in the ROM (Read Only Memory) 103 in accordance with the command. As an alternative, the executed program can also be a program stored in advance in the hard disc 105 and loaded into a RAM (Random Access Memory) 104 prior to execution. The executed program can also be a program transmitted to the computer from a satellite or a network, received by the communication unit 108, installed in the hard disc 105 in advance and loaded into the RAM 104 prior to execution. The executed program can also be a program read out from a removable recording medium 111 mounted on a drive 109, installed in the hard disc 105 in advance and loaded into the RAM 104 prior to execution. The drive 109 functionally corresponds to the disc drive 2 shown in FIG. 1. The CPU 102 executes the program to carry out a process represented by any one of the flowcharts described above or a process in accordance with the configuration of any block diagram described earlier. Then, the CPU 102 outputs results of the executed process if necessary to an output unit 106 by way of the input/output interface 110. The output unit 106 typically comprises components including an LCD (Liquid Crystal Display) device and a speaker. As an alternative, the CPU 102 transmits the results to an external destination by way of the communication unit 108 or merely stores the results in the hard disc 105.

Steps composing each of programs executed to perform a variety of processes described in this specification are not necessarily carried out in accordance with an order set on a time base as a flowchart. Instead, a process may include pieces of processing to be carried out concurrently or individually. Pieces of processing to be carried out concurrently or individually are referred to as concurrent pieces of processing or processing implemented as objects.

A program can be carried out by one computer or a plurality of computers in a distributed-processing environment. In addition, a program may be transmitted to a remote computer to be executed thereby.

In the embodiments described above, the buffer 19 for buffering AV data read out from the optical disc 31 is provided in the recording/reproduction control unit 1. It is to be noted, however, that the buffer 19 can also be included in the disc drive 2 instead of being employed in the recording/reproduction control unit 1.

In addition, the present invention can be applied not only to reproduction of data recorded on a optical disc 31, but also to reproduction of data recorded on another recording medium such as an magneto-optical disc or a magnetic disc.

Furthermore, the present invention can also be applied to reproduction of data other than the AV data.

Moreover, in the embodiments described above, a seek operation occurring in an initial operation to read out data from the optical disc 31 in the disc drive 2 is not taken into consideration in a process of setting a media read line $L_r$. In implementing the disc apparatus shown in FIG. 1, however, a seek operation required in order to read out data from the optical disc 31 initially must be taken into consideration. For the sake of convenience, a seek operation required in order to read out data from the optical disc 31 initially is referred to hereafter simply as a preceding seek operation. To put it concretely, it is necessary to add the seek time of a preceding seek operation to a minimum reproduction delay time found on the basis of a line approximation graphic form at the step S14 of the flowchart shown in FIG. 3, and to use the sum of the seek time and the minimum reproduction delay time as an eventual minimum reproduction delay time in the determination process at the next step S15.

It is to be noted that, if the position of the pickup (the head) of the disc drive 2 prior to the start of an operation to reproduce AV data is known, by using the seek time function, the seek time of the preceding seek operation can be found on the basis of the position of the pickup. If the position of the pickup of the disc drive 2 prior to the start of an operation to reproduce AV data cannot be recognized, on the other hand, a maximum seek time can typically be used as a seek time of the preceding seek operation. The maximum seek time is defined as the time it takes to carry out a seek operation between the innermost and outermost circumferences of the optical disc 31.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An information-processing apparatus, which is used for determining whether or not reproduction of data from a recording medium in a real-time manner is possible if said reproduction is carried out by reading out said data recorded on said recording medium and buffering said data read out from said recording medium in a buffer, said information-processing apparatus comprising:

graphic-data acquisition means for acquiring graphic data representing a line approximation graphic form approximating a media read line expressing changes in cumulative amount of data read out from said recording medium;

requested reproduction rate acquisition means for acquiring a requested reproduction rate as a reproduction rate requested in a process to reproduce said data;

computation means for computing a minimum buffer data amount and a minimum reproduction delay time on the basis of said line approximation graphic form represented by said graphic data where said minimum buffer data amount is defined as a lower limit of the amount of data stored in said buffer as data required for reproduction of said stored data in a real-time manner at a requested reproduction rate whereas said minimum reproduction delay time is defined as a lower limit of a reproduction delay time from a start of an operation to read out data from said recording medium to a start of an operation to reproduce said data read out from said buffer;

determination means for determining whether or not reproduction of data in a real-time manner at said requested reproduction rate is possible on the basis of said minimum buffer data amount and said minimum reproduction delay time; and graphic-data computation means for finding said graphic data;

wherein said graphic-data computation means comprises:
line computation means for finding a media seek line and a no-seek read line on the basis of said media read line where said media seek line is defined as a line expressing changes in seek operations carried out by read means for reading out data from said recording medium whereas said no-seek read line is defined as a line expressing changes in cumulative amount of data read out by said read means from said recording medium with no seek operations carried out by said read means;

graphic-form computation means for finding a graphic form approximating said media seek line; and data computation means for finding information representing said graphic form approximating said media seek line, finding the gradient of said no-seek read line and taking said information and said gradient as said graphic data representing said line approximation graphic form approximating said media read line.

2. The information-processing apparatus according to claim 1, said information-processing apparatus further comprising information acquisition means for acquiring an allowable buffer data amount and acquiring an allowable reproduction delay time where said allowable buffer data amount is defined as a size that said buffer is allowed to have in a process to reproduce data at said requested reproduction rate whereas said allowable reproduction delay time is defined as said reproduction delay time allowed in a process to reproduce data at said requested reproduction rate, wherein said determination means determines whether or not reproduction of data in a real-time manner at said requested reproduction rate is possible on the basis of a result of comparing said allowable buffer data amount with said minimum buffer data amount and a result of comparing said allowable reproduction delay time with said minimum reproduction delay time.

3. The information-processing apparatus according to claim 1 wherein said graphic-data computation means finds said graphic data by execution of the steps of:

finding a real-time reproduction line expressing changes in cumulative amount of data read out from said buffer in an operation to reproduce said data in a real-time manner at a reference reproduction rate used as a reference rate of reproduction;

finding a buffer upper-limit line expressing changes in upper limit of a cumulative amount of data stored in said buffer in an operation to reproduce said data in a real-time manner at said reference reproduction rate;

taking a graphic form drawn by using said real-time reproduction line and said buffer upper-limit line as said line approximation graphic form; and finding information representing said line approximation graphic form as said graphic data.

4. The information-processing apparatus according to claim 3 wherein said graphic-data computation means sets said reference reproduction rate at such a value that a maximum amount of data stored in said buffer in a process to reproduce said data in a real-time manner is observed equally in the course of said process to reproduce said data in a real-time manner.

5. The information-processing apparatus according to claim 3 wherein said graphic-data computation means takes a reproduction rate making said reproduction delay time equal to 0 as said reference reproduction rate.

6. The information-processing apparatus according to claim 3 wherein said graphic-data computation means takes a reproduction rate making an end-preceding time equal to 0 as said reference reproduction rate where said end-preceding time is defined as a period of time between the end of an operation to read out said data from said recording medium and the end of an operation to reproduce a last piece of said data.

7. An information-processing method stored on a computer readable medium, which is used for determining whether or not reproduction of data from a recording medium in a real-time manner is possible if said reproduction is carried out by reading out said data recorded on said recording medium and buffering said data read out from said recording medium in a buffer, said information-processing method comprising the steps of:

acquiring graphic data representing a line approximation graphic form approximating a media read line expressing changes in cumulative amount of data read out from said recording medium;

acquiring requested reproduction rate as a reproduction rate requested in a process to reproduce said data;

computing a minimum buffer data amount and a minimum reproduction delay time on the basis of said line approximation graphic form represented by said graphic data where said minimum buffer data amount is defined as a lower limit of the amount of data stored in said buffer as data required for reproduction of said stored data in a real-time manner at a requested reproduction rate whereas said minimum reproduction delay time is defined as a lower limit of a reproduction delay time from a start of an operation to read out data from said recording medium to a start of an operation to reproduce said data read out from said buffer;

determining whether or not reproduction of data in a real-time manner at said requested reproduction rate is possible on the basis of said minimum buffer data amount and said minimum reproduction delay time;

outputting a result of said determining step; and a graphic-data computation step of finding said graphic data;

wherein said graphic-data computation step comprises the sub-steps of:

finding a media seek line and a no-seek read line on the basis of said media read line where said media seek line is defined as a line expressing changes in seek operations carried out at a read step of reading out data from said recording medium whereas said no-seek read line is defined as a line expressing changes in cumulative amount of data read out at said read step from said recording medium with no seek operations carried out at said read step;

finding a graphic form approximating said media seek line; and finding information representing said graphic form approximating said media seek line, finding the gradient of said no-seek read line and taking said information and said gradient as said graphic data representing said line approximation graphic form approximating said media read line.

8. The information-processing method according to claim 7, said information-processing method further comprising an information acquisition step for acquiring an allowable buffer data amount and acquiring an allowable reproduction delay time where said allowable buffer data amount is defined as a size that said buffer is allowed to have in a process to reproduce data at said requested reproduction rate whereas said allowable reproduction delay time is defined as said reproduction delay time allowed in a process to reproduce data at said requested reproduction rate, whereby a result of comparing said allowable buffer data amount with said minimum buffer data amount and a result of comparing said allowable reproduction delay time with said minimum reproduction delay time are used as a basis for determination of whether or not reproduction of data in a real-time manner at said requested reproduction rate is possible.

9. The information-processing method according to claim 1 whereby, at said graphic-data computation step, said graphic data is found by execution of the steps of:

finding a real-time reproduction line expressing changes in cumulative amount of data read out from said buffer in an operation to reproduce said data in a real-time manner at a reference reproduction rate used as a reference rate of reproduction;

finding a buffer upper-limit line expressing changes in upper limit of a cumulative amount of data stored in said buffer in an operation to reproduce said data in a real-time manner at said reference reproduction rate;

taking a graphic form drawn by using said real-time reproduction line and said buffer upper-limit line as said line approximation graphic form; and finding information representing said line approximation graphic form as said graphic data.

10. The information-processing method according to claim 9 whereby said graphic-data computation step is executed to set said reference reproduction rate at such a value that a maximum amount of data stored in said buffer in a process to reproduce said data in a real-time manner is observed equally in the course of said process to reproduce said data in a real-time manner.

11. The information-processing method according to claim 9 whereby, at said graphic-data computation step, a reproduction rate making said reproduction delay time equal to 0 is taken as said reference reproduction rate.

12. The information-processing method according to claim 9 whereby, at said graphic-data computation step, a reproduction rate making an end-preceding time equal to 0 is taken as said reference reproduction rate where said end-preceding time is defined as a period of time between the end of an operation to read out said data from said recording medium and the end of an operation to reproduce a last piece of said data.

13. A program, stored on a computer-readable medium, to be executed by a computer to implement an information-processing method, which is used for determining whether or not reproduction of data from a recording medium in a real-time manner is possible if said reproduction is carried out by reading out said data recorded on said recording medium and buffering said data read out from said recording medium in a buffer, said program executed by said computer to implement said information-processing method comprising the steps of:

acquiring graphic data representing a line approximation graphic form approximating a media read line expressing changes in cumulative amount of data read out from said recording medium;

acquiring requested reproduction rate as a reproduction rate requested in a process to reproduce said data;

computing a minimum buffer data amount and a minimum reproduction delay time on the basis of said line approximation graphic form represented by said graphic data where said minimum buffer data amount is defined as a lower limit of the amount of data stored in said buffer as data required for reproduction of said stored data in a real-time manner at a requested reproduction rate whereas said minimum reproduction delay time is defined as a lower limit of a reproduction delay time from a start of an operation to read out data from said recording medium to a start of an operation to reproduce said data read out from said buffer;

determining whether or not reproduction of data in a real-time manner at said requested reproduction rate is possible on the basis of said minimum buffer data amount and said minimum reproduction delay time;

outputting a result of said determining step; and a graphic-data computation step of finding said graphic data;

wherein said graphic-data computation step comprises the sub-steps of:

finding a media seek line and a no-seek read line on the basis of said media read line where said media seek line is defined as a line expressing changes in seek operations carried out at a read step of reading out data from said recording medium whereas said no-seek read line is defined as a line expressing changes in cumulative amount of data read out at said read step from said recording medium with no seek operations carried out at said read step;

finding a graphic form approximating said media seek line; and finding information representing said graphic form approximating said media seek line, finding the gradient of said no-seek read line and taking said information and said gradient as said graphic data representing said line approximation graphic form approximating said media read line.

\* \* \* \* \*